(12) United States Patent
Sun

(10) Patent No.: US 12,081,737 B2
(45) Date of Patent: Sep. 3, 2024

(54) ENCODING AND DECODING METHOD AND APPARATUS, AND DEVICE THEREFOR

(71) Applicant: HANGZHOU HIKVISION DIGITAL TECHNOLOGY CO., LTD., Zhejiang (CN)

(72) Inventor: Yucheng Sun, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 91 days.

(21) Appl. No.: 17/928,919

(22) PCT Filed: May 31, 2021

(86) PCT No.: PCT/CN2021/097472
§ 371 (c)(1),
(2) Date: Nov. 30, 2022

(87) PCT Pub. No.: WO2021/244496
PCT Pub. Date: Dec. 9, 2021

(65) Prior Publication Data
US 2023/0262211 A1    Aug. 17, 2023

(30) Foreign Application Priority Data

Jun. 1, 2020  (CN) .......................... 202010486400.3

(51) Int. Cl.
*H04N 19/00*   (2014.01)
*H04N 19/105*  (2014.01)
(Continued)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC ..................................................... H04N 19/00
See application file for complete search history.

(56) References Cited

U.S. PATENT DOCUMENTS

| 2010/0128803 | A1* | 5/2010 | Divorra Escoda ... H04N 19/154 |
| | | | 375/E7.194 |
| 2018/0288425 | A1 | 10/2018 | Panusopone et al. |

(Continued)

FOREIGN PATENT DOCUMENTS

| CN | 101502120 | 8/2009 |
| CN | 103533376 | 1/2014 |

(Continued)

OTHER PUBLICATIONS

International Search Report for PCT/CN2021/097472 mailed on Aug. 26, 2021 and its English translation provided by WIPO.
(Continued)

*Primary Examiner* — Maryam A Nasri
(74) *Attorney, Agent, or Firm* — Ladas & Parry, LLP

(57) ABSTRACT

Encoding and decoding methods and apparatuses, coder-side devices and decoder-side devices are provided, the method includes: obtaining a weighted prediction angle and weight configuration parameters of the current block; where the weight configuration parameters include a weight transform rate and a weight transform start position; configuring reference weight values for surrounding positions outside the current block according to the weight configuration parameters; determining a surrounding matching position to which the pixel position points from the surrounding positions outside the current block based on the weighted prediction angle; determining a target weight value of the (Continued)

pixel position based on the reference weight value associated with the surrounding matching position, determining an association weight value of the pixel position based on the target weight value of the pixel position; determining a first prediction value of the pixel position based on a first prediction mode, determining a second prediction value of the pixel position based on a second prediction mode; determining a weighted prediction value of the pixel position based on the first prediction value, the target weight value, the second prediction value and the association weight value.

20 Claims, 10 Drawing Sheets

(51) Int. Cl.
    *H04N 19/137*     (2014.01)
    *H04N 19/159*     (2014.01)
    *H04N 19/176*     (2014.01)

(56) References Cited

U.S. PATENT DOCUMENTS

| | | | |
|---|---|---|---|
| 2020/0036970 A1 | 1/2020 | Yoo et al. | |
| 2020/0396444 A1 | 12/2020 | Tsai et al. | |
| 2023/0267573 A1* | 8/2023 | Kettenis | G06T 5/20 382/168 |

FOREIGN PATENT DOCUMENTS

| | | |
|---|---|---|
| CN | 110121073 | 8/2019 |
| CN | 110225346 | 9/2019 |
| CN | 110312132 | 10/2019 |
| CN | 110832864 | 2/2020 |
| CN | 112543323 | 3/2021 |
| CN | 112584142 | 3/2021 |
| CN | 113099240 | 7/2021 |
| CN | 113766222 | 12/2021 |
| EP | 4109897 A1 | 12/2022 |
| RU | 2553085 C2 | 6/2015 |
| TW | 201919400 | 5/2019 |
| WO | 2019091292 A1 | 5/2019 |
| WO | 2021190515 A1 | 9/2021 |

OTHER PUBLICATIONS

Written Opinion of the International Searching Authority for PCT/CN2021/097472 mailed on Aug. 26, 2021 and its English translation provided by Google Translate.

Sun, Yucheng et al. "JVET-P0250: CE4-related: On simplification for GEO weight derivation" Joint Video Experts Team (JVET) of ITU-T SG 16 WP 3 and ISO/IEC JTC 1/SC 29/WG 11, 16th Meeting; Geneva, CH, 1-11, Oct. 9, 2019, 9 pages.

Bordes, P. et al."JVET-Q0364-v2: CE4.4-related: Combination of GEO or TPM and Weighted-Prediction", Joint Video Experts Team (JVET) of ITU-T SG 16 WP 3 and ISO/IEC JTC 1/SC 29/WG 11, 17th Meeting: Brussels, BE, Jan. 8, 2020 (Jan. 8, 2020), 6 pages.

Australian Patent Office, Office Action Issued in the corresponding Australian Application No. 2021286043, Nov. 9, 2023, 4 pages.

Japanese Patent Office , Office Action Issued in the corresponding Japanese Application No. 2022-573744, Jan. 15, 2024, 8 pages (Submitted with machine Translation).

Benjamin Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 1-24, 202, [JVET-R2001-vA] (version 10), pp. 171-173, 299-302, in total of 528 pages.

European Patent Office, Extended European Search Report Issued in the corresponding EP Application No. 21816692.4, Jul. 26, 2023.

Australian Patent Office, Office Action Issued in the corresponding Australian Application No. 2021286043, Jul. 19, 2023.

Russian Patent Office, Office Action Issued in the corresponding Russian Application No. 2022133310/07, Jul. 7, 2023 (Submitted with Machine Translation).

Chen J et al:"Algorithm description for Versatile Video Coding and Test Model 8 (VTM 8)", Joint Video Experts Team (JVET) of ITU-T SG 16 WP 3 and ISO/IEC JTC 1/SC 29/WG 11 17th Meeting: Brussels, BE, Jan. 7-17, 2020, Document: JVET-Q2002-v3, all pages.

Gao (Huawei) H et al:"CE4: CE4-1.1, CE4-1.2 and CE4-1.14: Geometric Merge Mode (GEO)", Joint VideoExperts Team (JVET) of ITU-T SG 16 WP 3 and ISO/IEC JTC 1/SC 29/WG 11, 16th Meeting: Geneva, CH, Oct. 1-11, 2019, Document: JVET-P0068-v1, all pages.

Chen J et al: "Algorithm description for Versatile Video Coding and Test Model 12 (VTM 12)", Joint Video Experts Team (JVET)of ITU-T SG 16 WP 3 and ISO/IEC JTC 1/SC 29 21st Meeting, by teleconference, Jan. 6-15, 2021, Document: JVET-U2002-v1, all pages.

* cited by examiner

ENCODING AND DECODING METHOD AND APPARATUS, AND DEVICE THEREFOR

CROSS-REFERENCE TO RELATED APPLICATION

The present application is a U.S. National Stage of International application No. PCT/CN2021/097472 filed on May 31, 2021, which claims a priority to the Chinese patent application No. 202010486400.3 filed on Jun. 1, 2020, all of which are incorporated herein by reference in their entirety for all purposes.

TECHNICAL FIELD

The present disclosure relates to coding and decoding technologies, in particular to coding and decoding methods and apparatuses, coder-side devices and decoder-side devices.

BACKGROUND

For achieving the purpose of saving spaces, videos or images are transmitted after being coded. A complete video coding process may include processes such as prediction, transform, quantization, entropy coding, filtering and so on. Prediction may include intra prediction and inter prediction. The inter prediction refers to an operation of utilizing a temporal correlation of a video to predict current pixels by using pixels of a neighbouring coded picture, so as to achieve the purpose of effectively reducing temporal redundancy of the video. The intra prediction refers to an operation of utilizing a spatial correlation of a video to predict current pixels by using pixels of one or more coded blocks of the current picture, so as to achieve the purpose of effectively reducing spatial redundancy of the video.

SUMMARY

In view of the above, the present application provides encoding (coding) and decoding methods and apparatuses, coder-side devices and decoder-side devices, which improves accuracy of prediction.

The present application provides a method for coding and decoding, the method includes: when determining to enable a weighted prediction for a current block, obtaining a weighted prediction angle and weight configuration parameters of the current block, where the weight configuration parameters include a weight transform rate and a weight transform start position; configuring reference weight values for surrounding positions outside the current block according to the weight configuration parameters; for each pixel position of the current block, a surrounding matching position which the pixel position points from the surrounding positions outside the current block based on the weighted prediction angle; determining a target weight value of the pixel position based on the reference weight value associated with the surrounding matching position, determining an association weight value of the pixel position based on the target weight value of the pixel position; determining a first prediction value of the pixel position based on a first prediction mode of the current block, determining a second prediction value of the pixel position based on a second prediction mode of the current block; determining a weighted prediction value of the pixel position based on the first prediction value, the target weight value, the second prediction value and the association weight value; determining the weighted prediction value of the current block based on the weighted prediction values of all pixel positions in the current block.

The present application provides an apparatus for coding and decoding, the apparatus includes: an obtaining module configured to, when determining to enable a weighted prediction for a current block, obtain a weighted prediction angle and weight configuration parameters of the current block; where the weight configuration parameters include a weight transform rate and a weight transform start position, a configuring module configured to configure reference weight values for surrounding positions outside the current block according to the weight configuration parameters; a determining module configured to, for each pixel position of the current block, determine a surrounding matching position which the pixel position points from the surrounding positions outside the current block based on the weighted prediction angle; determine a target weight value of the pixel position based on the reference weight value associated with the surrounding matching position, determine an association weight value of the pixel position based on the target weight value of the pixel position; determine a first prediction value of the pixel position based on a first prediction mode of the current block, determine a second prediction value of the pixel position based on a second prediction mode of the current block; determine a weighted prediction value of the pixel position based on the first prediction value, the target weight value, the second prediction value and the association weight value; determine the weighted prediction value of the current block based on the weighted prediction values of all pixel positions in the current block.

The present application provides a decoder-side device, including: a processor and a machine readable storage medium, where the machine readable storage medium stores machine executable instructions executable by the processor, and the processor is configured to execute the machine executable instructions to perform: when determining to enable a weighted prediction for a current block, obtaining a weighted prediction angle and weight configuration parameters of the current block; where the weight configuration parameters include a weight transform rate and a weight transform start position; configuring reference weight values for surrounding positions outside the current block according to the weight configuration parameters; for each pixel position of the current block, a surrounding matching position which the pixel position points from the surrounding positions outside the current block based on the weighted prediction angle; determining a target weight value of the pixel position based on the reference weight value associated with the surrounding matching position, determining an association weight value of the pixel position based on the target weight value of the pixel position; determining a first prediction value of the pixel position based on a first prediction mode of the current block, determining a second prediction value of the pixel position based on a second prediction mode of the current block; determining a weighted prediction value of the pixel position based on the first prediction value, the target weight value, the second prediction value and the association weight value; determining the weighted prediction value of the current block based on the weighted prediction values of all pixel positions in the current block.

The present application provides a coder-side device, including: a processor and a machine readable storage medium, where the machine readable storage medium stores machine executable instructions executable by the processor, and the processor is configured to execute the machine executable instructions to perform: when determining to enable a weighted prediction for a current block, obtaining a weighted prediction angle and weight configuration parameters of the current block: where the weight configuration parameters include a weight transform rate and a weight transform start position; configuring reference weight values for surrounding positions outside the current block according to the weight configuration parameters; for each pixel position of the current block, a surrounding matching position which the pixel position points from the surrounding positions outside the current block based on the weighted prediction angle; determining a target weight value of the pixel position based on the reference weight value associated with the surrounding matching position, determining an association weight value of the pixel position based on the target weight value of the pixel position; determining a first prediction value of the pixel position based on a first prediction mode of the current block, determining a second prediction value of the pixel position based on a second prediction mode of the current block; determining a weighted prediction value of the pixel position based on the first prediction value, the target weight value, the second prediction value and the association weight value; determining the weighted prediction value of the current block based on the weighted prediction values of all pixel positions in the current block.

As described in the above technical solutions, in the embodiments of the present disclosure, an effective manner of configuring weight values is provided, in which a reasonable target weight value is configured for each pixel position of the current block, such that the prediction values of the current block are more approximate to raw pixels, thereby improving the prediction accuracy, prediction performance and coding performance.

DETAILED DESCRIPTION OF THE EMBODIMENTS

Figure 1:
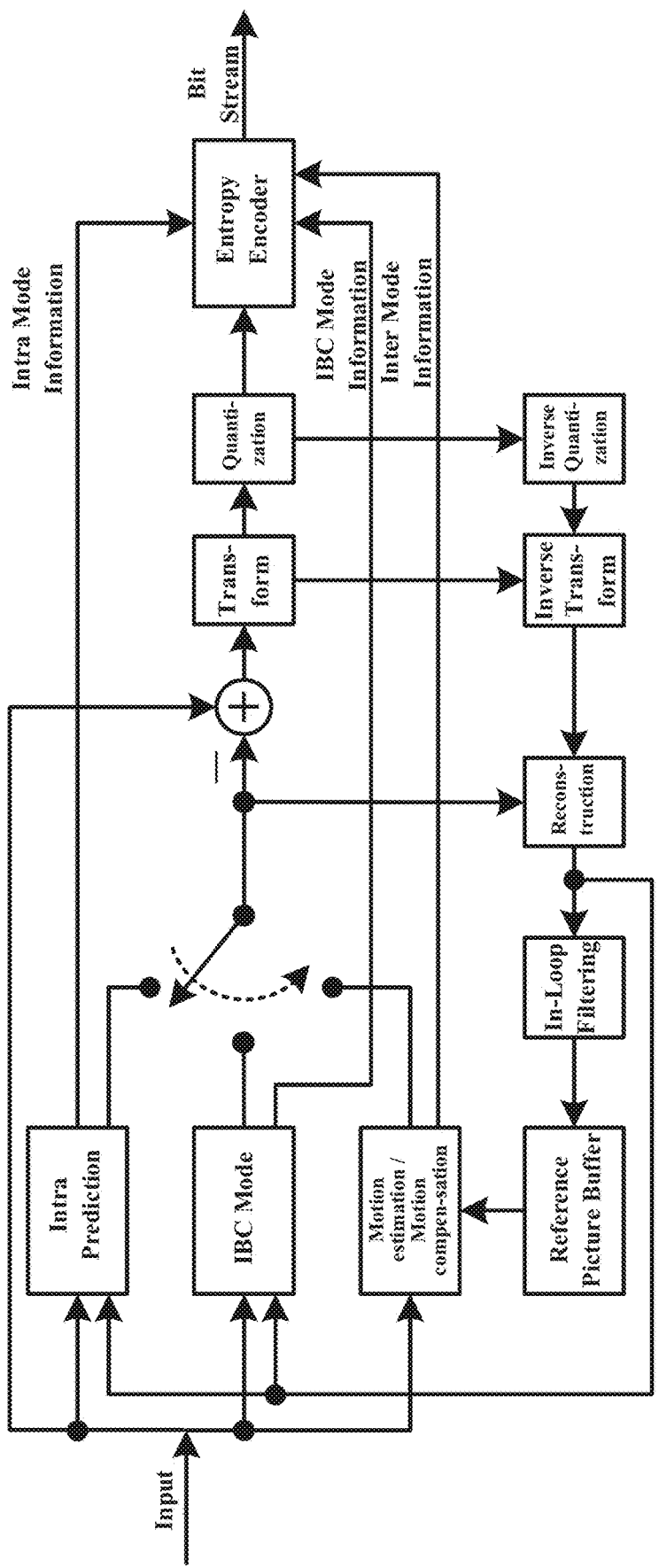
FIG. 1 is a schematic diagram of a framework of a video coding system.

Terms used herein are used to only describe a particular embodiment rather than limit the present disclosure. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items. It is noted that, although the terms "first," "second," "third," and the like may be used in the present disclosure to describe various information, such information should not be limited to these terms. These terms are only used to distinguish one category of information from another. For example, without departing from the range of the present disclosure, first information may be referred as second information; and similarly, the second information may also be referred as the first information, which is depended on the context. In addition, the term "if" as used herein may be interpreted as "when" or "upon" or "in response to determining".

The present disclosure provides coding and decoding methods and apparatuses, and devices therefor, which may involve following concepts: intra prediction, inter prediction, Intra Block Copy (IBC) prediction, and so on.

Intra prediction predicts a pixel of a current block by using pixels of one or more coded blocks of a current picture based on a spatial correlation of a video, so as to reduce spatial redundancy of the video. The intra prediction specifies multiple prediction modes, each of the prediction modes corresponds to one texture direction (except for a Direct Current (DC) mode). For example, if the texture of the picture is in horizontal direction, using a horizontal prediction mode may better predict picture information.

Inter prediction uses pixels of neighbouring coded icture(s) to predict pixels of a current picture based on temporal correlation of a video due to strong temporal correlation included in a video sequence, so as to effectively reduce temporal redundancy of the video.

The intra block copy allows referencing a same slice, where reference data of a current block comes from the same slice. In the intra block copy technology, a prediction value of the current block may be obtained by using a block vector of the current block. Illustratively, based on a characteristic that a large number of recurring textures within a same slice in a screen content, when the prediction value of the current block is obtained by using the block vector, the compression efficiency of the screen content sequence can be improved.

Prediction pixel refers to a pixel value derived from a coded/decoded pixel, and a residual is obtained based on a difference between a raw pixel and a prediction pixel, and then a residual transform, quantization as well as coefficient coding are carried out. Inter prediction pixel refers to, for a current block, a pixel value derived from a reference picture, and since the pixel positions are discrete, interpolation operation is needed to obtain a final prediction pixel. The closer the prediction pixel is to the raw pixel, the smaller residual energy obtained by performing subtraction for both is, and the higher coding compression performance is.

Motion Vector (MV). In inter prediction, a motion vector is used to represent a relative displacement between a current block of a current slice and a reference block of a reference slice. Each of divided blocks has a corresponding motion vector to be transmitted to a decoder-side. If the motion vector of each block is coded and transmitted independently, especially when there are a large number of smaller-sized blocks, more bits have to be consumed. To reduce the number of bits used to code the motion vector, spatial correlation among neighbouring blocks can be used to predict the motion vector of the current block based on the motion vector(s) of neighbouring coded block(s), and then a prediction difference is coded. Thus, the number of bits representing the motion vectors can be effectively reduced. In the process of coding a motion vector of a current block, one or more motion vectors of one or more neighbouring coded blocks are firstly used to predict the motion vector of the current block, and then a Motion Vector Difference (MVD) between a Motion Vector Prediction (MVP) value and a real estimation value of the motion vector is coded.

Motion Information. Since a motion vector represents a position offset from a current block to a reference block, in order to accurately obtain information on an indicated block, in addition to the motion vector, index information on a reference picture is also needed to indicate which reference picture is used for the current block. In a video coding technology, for a current slice, a reference picture list can be established, and the index information on the reference picture indicates which reference picture listed in the reference picture list is used for the current block. In addition, many coding technologies also support multiple reference picture lists, so an index may also be used to indicate which reference picture list is used, and the index can be referred to as a reference direction. To sum up, in a video coding technology, information related to motion, such as the motion vector, the reference picture index information, and the reference direction, can be collectively referred to as motion information.

Block vector (BV) is applied in the intra block copy technology, which uses block vector for motion compensation, e.g., a prediction value of a current block is obtained by using the block vector. The block vector represents a relative displacement between the current block and a best matching block in coded block(s) of a current slice, which is different from the motion vector. Based on the characteristic that a large number of repeated textures are present in a same slice, when the prediction value of the current block is obtained by using the block vector, the compression efficiency can be improved.

Intra prediction mode. In the intra prediction, the intra prediction mode is used to perform motion compensation, e.g., a prediction value of a current block is obtained by using the intra prediction mode. For example, the intra prediction mode may include but not limited to a Planar mode, a DC mode, and multiple angle modes. The Planar mode is applicable to an area where pixel values change slowly, and uses two linear filters in the horizontal and vertical directions to take an average value of pixels in the two directions as a prediction value of the pixels of the current block. The DC mode is applicable to a large flat area, and takes an average value of surrounding pixels of the current block as a prediction value of the current block. The angle modes include 33 angle modes or 65 angle modes.

Palette mode. In the palette mode, pixel values of a current block are represented by a small set of pixel values, that is, a palette. When a pixel value of a pixel position in the current block is close to a colour in the palette, the pixel position is coded with an index value of the corresponding colour in the palette. When the pixel value of the pixel position in the current block is not similar to all colours in the palette, the pixel position is to be coded with an "escape pixel" and the escape pixel is directly quantized and then coded into a bit stream. In a decoder-side, one palette is firstly obtained, for example, a palette storing {colour A, colour B, colour C}, and then whether each pixel position is coded as an escape pixel is determined. If a pixel position is not the escape pixel, an index of the pixel position is obtained from the bit stream and then a colour is obtained from the palette based on the index of the pixel position and assigned to the pixel position; otherwise, the escape pixel is parsed.

Rate-Distortion Optimization (RDO). There are two indicators for evaluating coding efficiency: bit rate and Peak Signal to Noise Ratio (PSNR). The smaller the bit stream is, the higher the compression rate is; and the higher the PSNR is, the better the quality of the reconstructed picture is. In a mode selection, a decision method is actually a comprehensive evaluation for both of them. For example, the cost corresponding to a mode can be calculated according to the following formula: $J(mode)=D+\lambda*R$, where D represents Distortion, usually measured by a Sum of Squared Errors (SSE), where SSE refers to a mean sum of square of differences between a reconstructed picture block and a source picture; $\lambda$ represents a Lagrangian multiplier; and R represents an actual number of bits needed for coding a picture block in this mode, including a total number of bits needed for coding mode information, motion information, residuals and the like. In the mode selection, if the RDO is used to make a comparative decision on coding modes, best coding performance can usually be guaranteed.

Framework of the video coding system. The framework of the video coding system shown in FIG. 1 may be used to perform the coder-side process in the embodiments of the present disclosure, and the framework of the video decoding system is similar to FIG. 1 and will not be repeated herein. The framework of the video decoding system may be used to perform the decoder-side process in the embodiments of the present disclosure. Illustratively, the framework of the video coding system and the framework of the video decoding system can include but not limited to an intra prediction module/inter prediction module, a motion estimation/motion compensation module, a reference picture buffer, an in-loop filtering module, a reconstruction module, a transform module, a quantization module, an inverse transform module, an inverse quantization module, an entropy coder and the like. An encoder can perform the coder-side process through cooperation of these modules, and a decoder can perform the decoder-side process through cooperation of these modules.

Illustratively, a current block may be rectangular, while an edge of an object usually is not rectangular in practical situations. Therefore, for the edge of the object, there are usually two different entities (for example, the object presented in a foreground and a background and so on). When the motions of the two entities are inconsistent, the two entities cannot be well split based on rectangular partition. Therefore, the current block may be partitioned into two non-rectangular sub-blocks and a weighted prediction is performed on the two non-rectangular sub-blocks. Illustratively, the weighted prediction is to perform weighted operation based on multiple prediction values to obtain one or more final prediction values. The weighted prediction may include: Combined inter/intra Prediction, Combined inter/inter Prediction, Combined intra/intra Prediction, and so on. For the weight value(s) of the weighted prediction, the same weight value or different weight values may be set for different pixel positions of the current block.

Figure 2A:
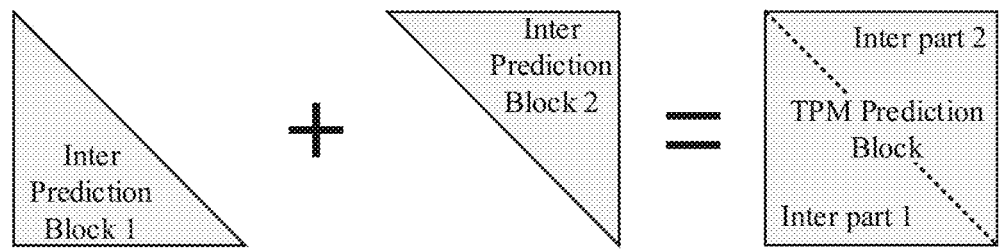
FIGS. 2A to 2C are schematic diagrams of a weighted prediction.

FIG. 2A is a schematic diagram illustrating a Triangular Partition Mode (TPM) of inter weighted prediction.

A TPM prediction block is obtained by combining an inter prediction block 1 (e.g., an inter prediction value 1 of multiple pixel positions is obtained by using an inter prediction mode 1) and an inter prediction block 2 (e.g., an inter prediction value 2 of multiple pixel positions is obtained by using an inter prediction mode 2). The TPM prediction block may be partitioned into two areas/parts, one area of which may be an inter area 1 and the other may be an inter area 2. The TPM prediction block may be rectangular and the two inter areas of the TPM prediction block may be non-rectangular and a boundary line between the two inter areas (as shown by a dotted line in FIG. 2A) may be a main diagonal or sub diagonal of the TPM prediction block.

Each pixel position of the inter area 1 is mainly determined based on the inter prediction value 1 of the inter prediction block 1. For example, an inter prediction value 1 of the inter prediction block 1 of the pixel position and an inter prediction value 2 of the inter prediction block 2 of the pixel position are weighted to obtain a combined prediction value of the pixel position, where the inter prediction value 1 has a larger weight value and the inter prediction value 2 has a smaller weight value or even 0. Each pixel position of the inter area 2 is mainly determined based on the inter prediction value 2 of the inter prediction block 2. For example, an inter prediction value 1 of the inter prediction block 1 of the pixel position and an inter prediction value 2 of the inter prediction block 2 of the pixel position are weighted to obtain a combined prediction value of the pixel position, where the inter prediction value 2 has a larger weight value and the inter prediction value 1 has a smaller weight value or even 0. Finally, the combined prediction values of the pixel positions are combined to form the TPM prediction block.

Figure 2B:
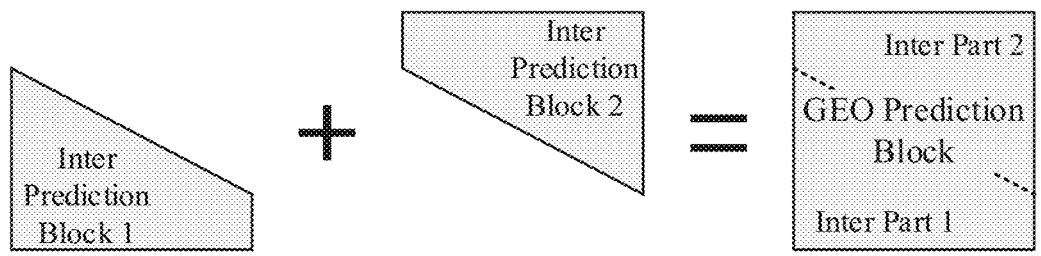

FIG. 2B is a schematic diagram illustrating a Geometrical partitioning for inter blocks (GEO) mode. The GEO mode is used to partition an inter prediction block into two sub-blocks by using one partition line. The GEO mode may adopt more partition directions, which is different from the TPM mode. The GEO mode is similar to the TPM mode in a weighted prediction process.

A GEO prediction block is obtained by combining an inter prediction block 1 (e.g., an inter prediction value 1 of multiple pixel positions is obtained by using an inter prediction mode 1) and an inter prediction block 2 (e.g., an inter prediction value 2 of multiple pixel positions is obtained by using an inter prediction mode 2). The GEO prediction block may be partitioned into two areas/parts, one area of which may be an inter area 1 and the other may be an inter area 2.

Each pixel position of the inter area 1 is mainly determined based on the inter prediction value 1 of the inter prediction block 1. For example, when an inter prediction value 1 of the inter prediction block 1 of the pixel position and an inter prediction value 2 of the inter prediction block 2 of the pixel position are weighted, the inter prediction value 1 has a larger weight value and the inter prediction value 2 has a smaller weight value. Each pixel position of the inter area 2 is mainly determined based on the inter prediction value 2 of the inter prediction block 2. For example, when an inter prediction value 1 of the inter prediction block 1 of the pixel position and an inter prediction value 2 of the inter prediction block 2 of the pixel position are weighted, the inter prediction value 2 has a larger weight value and the inter prediction value 1 has a smaller weight value.

Figure 2C:
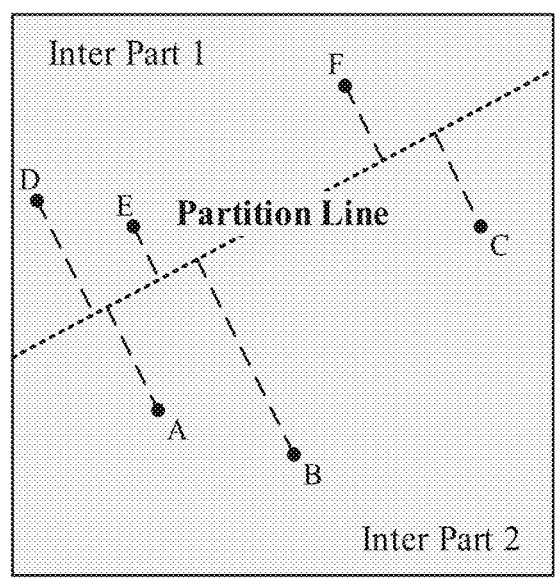

Illustratively, the weight values of the GEO prediction block are configured with respect to a distance of the pixel position from the partition line. As shown in FIG. 2C, a pixel position A, a pixel position B and a pixel position C are located in a lower right side of the partition line, and a pixel position D, a pixel position E and a pixel position F are located in an upper left side of the partition line. For the pixel positions A, the pixel position B and the pixel position C, the weight values of the inter prediction block 2 are ranked as B≥A≥C and the weight values of the inter prediction block 1 are ranked as C≥A≥B. For the pixel positions D, the pixel position E and the pixel position F, the weight values of the inter prediction block 1 are ranked as D≥F≥E and the weight values of the inter prediction block 2 are ranked as E≥F≥D. The above manner needs to calculate the distance between the pixel position and the partition line and then determine the weight value of the pixel position.

For the above examples, to achieve a weighted prediction, one or more weight values of a prediction block corresponding to each pixel position of a current block is expected to be determined and the weighted prediction is performed based on the one or more weight values corresponding to a pixel position. But the setting of the one or more weight values depends on a partition line, if the one or more weight values are set unreasonably, poor prediction effect and poor coding performance may be resulted.

In view of this, embodiments of the present disclosure provide a manner of deriving one or more weight value. In this manner, based on reference weight values of surrounding positions outside the current block, a target weight value of each pixel position of the current block is determined, thus a more reasonable target weight value can be configured for each pixel position. In this case, prediction values may be more approximate to raw pixels, thereby improving prediction accuracy, prediction performance and coding performance.

The coding and decode method of the embodiments of the present disclosure will be detailed below in combination with several specific embodiments.

Figure 3:
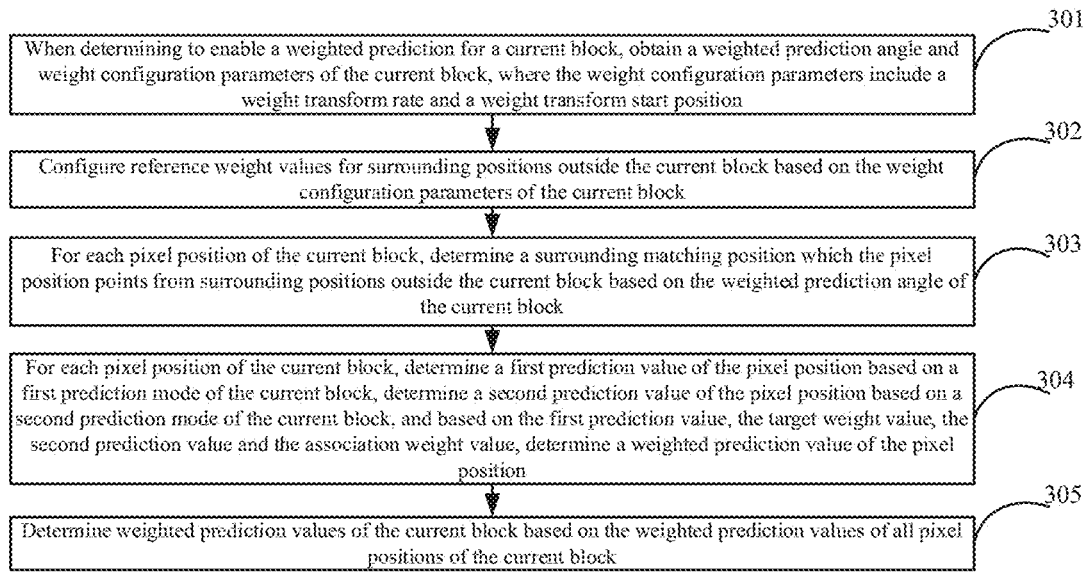
FIG. 3 is a flowchart illustrating a coding and decoding method according to an embodiment of the present disclosure.

Embodiment 1. FIG. 3 is a flowchart illustrating a coding and decoding method. The method may be applied to a decoder-side (may also be called video decoder) or a coder-side (may also be called video encoder). The method includes the following steps.

At step 301, w % ben determining to enable a weighted prediction for a current block, a weighted prediction angle and weight configuration parameters of the current block are obtained, where the weight configuration parameters include a weight transform rate and a weight transform start position. The weight transform start position may be determined by at least one of the following parameters: a weighted prediction angle of the current block, a weighted prediction position of the current block, or a size of the current block.

Illustratively, when a prediction is expected to be made for the current block, the decoder-side or coder-side firstly determines whether to enable the weighted prediction for the current block. If it is determined to enable the weighted prediction for the current block, the coding and decoding method of the embodiments of the present disclosure is applied, that is, the step 301 and following steps are performed. If it is determined not to enable the weighted prediction for the current block, no limitation is made to related implementations in the embodiments of the present disclosure.

Illustratively, when determining to enable a weighted prediction for a current block, the weighted prediction angle of the current block, the weighted prediction position of the current block and the weight transform rate of the current block may be obtained. Then, based on at least one of the weighted prediction angle of the current block, the weighted prediction position of the current block or the size of the current block, the weight transform start position of the current block can be determined. In this way, the weighted prediction angle of the current block, the weighted transform rate of the current block and the weight transform start position of the current block can be obtained.

At step 302, reference weight values are configured for surrounding positions outside the current block based on the weight configuration parameters of the current block.

Illustratively, a number of the surrounding positions outside the current block can be determined based on the size of the current block and/or the weighted prediction angle of the current block. For example, if the number of the surrounding positions outside the current block is determined to be M based on the size of the current block and/or the weighted prediction angle of the current block, reference weight values are configured for M surrounding positions according to the weight configuration parameters of the current block.

Illustratively, the reference weight values of the surrounding positions outside the current block may be monotonically increased; or, the reference weight values of the surrounding positions outside the current block may be monotonically decreased. For example, the reference weight values of the surrounding positions outside the current block may be 0 0 . . . 0 0 2 4 6 8 8 . . . 8 8, or the reference weight value of the surrounding positions outside the current block may be 8 8 . . . 8 8 6 4 2 0 0 . . . 0 0.

Illustratively, the surrounding positions outside the current block may include integer pixel positions, or sub-pixel positions, or both the integer pixel positions and the sub-pixel positions. The surrounding positions outside the current block may include but are not limited to surrounding positions at a row on the upper outside of the current block, or surrounding positions at a column on the left outside of the current block, or surrounding positions at a row on the lower outside of the current block, or surrounding positions at a column on the right outside of the current block. The above is only examples of surrounding positions and there are no limitation on this.

In a possible embodiment, the reference weight values of the surrounding positions outside the current block include one or more reference weight values of target positions (area), one or more reference weight values of first neighbouring positions (area) of the target positions and one or more reference weight values of second neighbouring positions (area) of the target positions. That is, the surrounding positions outside the current block can be divided into the target positions, the first neighbouring positions of the target positions and the second neighbouring positions of the target positions.

Illustratively, the reference weight values of the first neighbouring positions are all a first reference weight value, and the reference weight values of the second neighbouring positions increase monotonously. Or, the reference weight values of the first neighbouring positions are all the first reference weight value, and the reference weight values of the second neighbouring positions decrease monotonously.

Or, the reference weight values of the first neighbouring positions are all a second reference weight value, and the reference weight values of the second neighbouring positions are all a third reference weight value, and the second reference weight value is different from the third reference weight value. Or, the reference weight values of the first neighbouring positions increase monotonously, and the reference weight values of the second neighbouring positions increase monotonously. Or, the reference weight values of the first neighbouring positions decrease monotonously, and the reference weight values of the second neighbouring positions decrease monotonously.

Illustratively, the target positions include one or at least two reference weight values, and if the target positions include at least two reference weight values, the at least two reference weight values of the target positions increase or decrease monotonically.

At step 303, for each pixel position of the current block, a surrounding matching position pointed by the pixel position is determined from surrounding positions outside the current block based on the weighted prediction angle of the current block; a target weight value of the pixel position is determined based on a reference weight value associated with the surrounding matching position; and an association weight value of the pixel position is determined based on the target weight value of the pixel position.

Illustratively, the weighted prediction angle refers to an angle direction to which a pixel position inside the current block points, for example, based on a certain weighted prediction angle, an angle direction corresponding to the weighted prediction angle points to a surrounding position outside the current block. Based on this, for each pixel position of the current block, an angle direction to which the pixel position points is determined based on the weighted prediction angle, and then, a surrounding matching position to which the pixel position points is determined from the surrounding positions outside the current block based on the angle direction.

For each pixel position of the current block, after the surrounding matching position to which the pixel position points is determined, based on the reference weight value associated with the surrounding matching position, the target weight value of the pixel position is determined, for example, the reference weight value associated with the surrounding matching position may be determined as the target weight value of the pixel position. Then, an association weight value of the pixel position may be determined based on the target weight value of the pixel position. For example, for each pixel position, a sum of the target weight value of the pixel position and the association weight value of the pixel position may be a fixed preset value. Therefore, the association weight value may be the difference between the preset value and the target weight value. Assuming that the preset value is 8, if the target weight value of a pixel position is 0, the association weight value of the pixel position is 8; if the target weight value of a pixel position is 1, the association weight value of the pixel position is 7, and so on, as long as the sum of the target weight value and the association weight value is equal to 8.

At step 304, for each pixel position of the current block, a first prediction value of the pixel position is determined based on a first prediction mode of the current block, a second prediction value of the pixel position is determined based on a second prediction mode of the current block; and based on the first prediction value, the target weight value, the second prediction value and the association weight value, a weighted prediction value of the pixel position is determined.

Illustratively, if the target weight value is a weight value corresponding to the first prediction mode and the association weight value is a weight value corresponding to the second prediction mode, the weighted prediction value of the pixel position may be: (the first prediction value of the pixel position*the target weight value of the pixel position+ the second prediction value of the pixel position*the association weight value of the pixel position)/the fixed preset value.

In addition, if the target weight value is a weight value corresponding to the second prediction mode, and the association weight value is a weight value corresponding to the first prediction mode, the weighted prediction value of the pixel position may be: (the second prediction value of the pixel position*the target weight value of the pixel position+ the first prediction value of the pixel position*the association weight value of the pixel position)/the fixed preset value.

At step 305, weighted prediction values of the current block are determined based on the weighted prediction values of all pixel positions in the current block.

For example, the weighted prediction values of all pixel positions in the current block are formed into the weighted prediction values of the current block.

As described in the above technical solutions, in the embodiments of the present disclosure, an effective manner of configuring weight values is provided, in which a reasonable target weight value is configured for each pixel position of the current block, such that the prediction values of the current block are more approximate to raw pixels, thereby improving the prediction accuracy, prediction performance and coding performance.

Figure 4A:
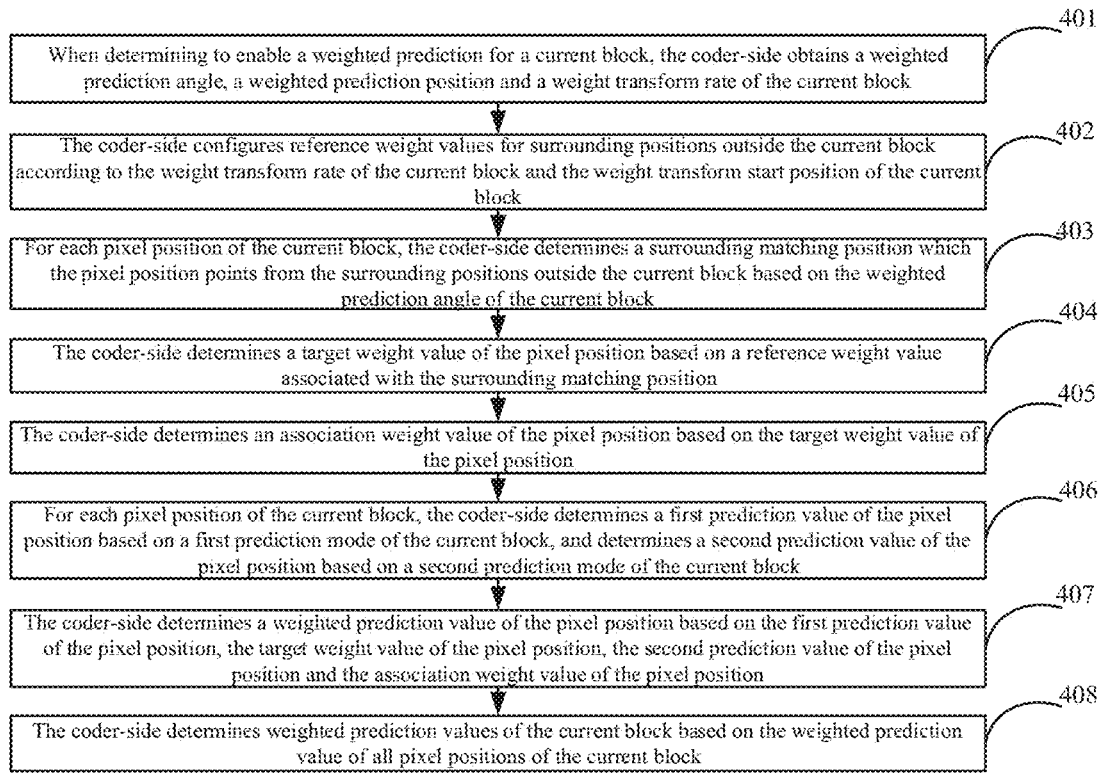
FIG. 4A is a flowchart illustrating a coding method according to an embodiment of the present disclosure.

Embodiment 2. Based on the embodiment 1, another coding and decoding method is provided in the embodiments of the present disclosure, as shown in FIG. 4A, which is a schematic diagram illustrating a flowchart of the coding and decoding method. The method may be applied to a coder-side and include the following steps.

At step 401, when determining to enable a weighted prediction for a current block, the coder-side obtains a weighted prediction angle of the current block, a weighted prediction position of the current block and a weight transform rate of the current block. Illustratively, the coder-side determines whether to enable the weighted prediction for the current block. If the coder-side determines to enable the weighted prediction for the current block, step 401 and the following steps are performed, otherwise, the processing method is not limited in the present disclosure.

In a possible implementation, if the current block satisfies a condition for enabling the weighted prediction, the coder-side may determine to enable the weighted prediction for the current block. If the current block does not satisfy the condition for enabling the weighted prediction, the weighted prediction is not to be enabled for the current block may be determined. For example, the coder-side may determine whether feature information of the current block satisfies a specific condition. If the feature information of the current block satisfies the specific condition, it is determined to enable the weighted prediction for the current block, and if not, it is determined not to enable the weighted prediction for the current block. The feature information includes but not limited to one or any combination of the followings: a slice type of a current slice where the current block is located, size information of the current block, and switching control information. The switching control information may include but not limited to: sequence level (e.g., Sequence Parameter Set (SPS) and Sequence Header (SH)) switching control information, picture level (e.g., Picture Parameter Set (PPS) and Picture Header (PH)) switching control information, slice level (e.g., Slice, Tile and Patch) switching control information, or Largest Coding Unit level (e.g., Largest Coding Unit (LCU) and Coding Tree Unit (CTU)) switching control information, or block level (e.g., Coding Unit (CU), Prediction Unit (PU), Transform Unit (TU)) switching control information.

For example, if the feature information is the slice type of the current slice where the current block is located, the slice type of the current slice where the current block is located satisfying the specific condition includes but not limited to: if the slice type of the current slice where the current block is located is a B slice, it is determined that the slice type satisfies the specific condition; or, if the slice type of the current slice where the current block is located is an I slice, it is determined that the slice type satisfies the specific condition.

For example, if the feature information is the size information of the current block, for example, width and height of the current block, the size information of the current block satisfying the specific condition includes but not limited to: if the width is greater than or equal to a first width value and the height is greater than or equal to a second height value, it is determined that the size information of the current block satisfies the specific condition; or, if the width is greater than or equal to a third width value, the height is greater than or equal to a fourth height value, the width is less than or equal to a fifth width value and the height is less than or equal to a sixth height value, it is determined that the size information of the current block satisfies the specific condition; or, if a product of the width and the height is greater than or equal to a product value, it is determined that the size information of the current block satisfies the specific condition. The above values may be configured based on experience, for example, configured as 8, 16, 32, 64 or 128 or the like. For example, the first width value may be 8, the second height value may be 8, the third width value may be 8, the fourth height value may be 8, the fifth width value may be 64, the sixth height value may be 64 and the product value may be 64. In this case, if the width is greater than or equal to 8 and the height is greater than or equal to 8, it is determined that the size information of the current block satisfies the specific condition; or, if the width is greater than or equal to 8, the height is greater than or equal to 8, the width is less than or equal to 64 and the height is less than or equal to 64, it is determined that the size information of the current block satisfies the specific condition; or, if the product of the width and the height is greater than or equal to 64, it is determined that the size information of the current block satisfies the specific condition. The above examples are only illustrative and not a limitation of the present disclosure.

For example, if the feature information is the size information of the current block, such as the width and the height of the current block, the size information of the current block satisfying the specific condition includes but not limited to: the width is not less than a and not greater than b, the height is not less than a and not greater than b, where a may be less than or equal to 16, and b may be greater than or equal to 16. For example, a is equal to 8 and b is equal to 64 or 32.

For example, if the feature information is the switching control information, the switching control information satisfying the specific condition includes but not limited to: if the switching control information is allowing the weighted prediction to be enabled for the current block, it is determined that the switching control information satisfies the specific condition.

For example, if the feature information is the slice type of the current slice where the current block is located and the size information of the current block, when the slice type satisfies the specific condition and the size information satisfies the specific condition, it is determined that the feature information of the current block satisfies the specific condition. Or, if the feature information is the slice type of the current slice where the current block is located and the switching control information, when the slice type satisfies the specific condition and the switching control information satisfies the specific condition, it is determined that the feature information of the current block satisfies the specific condition. Or, if the feature information is the size information of the current block and the switching control information, when the size information satisfies the specific condition and the switching control information satisfies the specific condition, it is determined that the feature information of the current block satisfies the specific condition. Or, if the feature information is the slice type of the current slice where the current block is located, the size information of the current block and the switching control information, when the slice type, the size information and the switching control information all satisfy the specific conditions respectively, it is determined that the feature information of the current block satisfies the specific condition.

In a possible implementation, when determining to enable the weighted prediction for the current block, the coder-side may obtain the weighted prediction angle of the current block, the weighted prediction position of the current block and the weight transform rate of the current block.

Figure 4B:
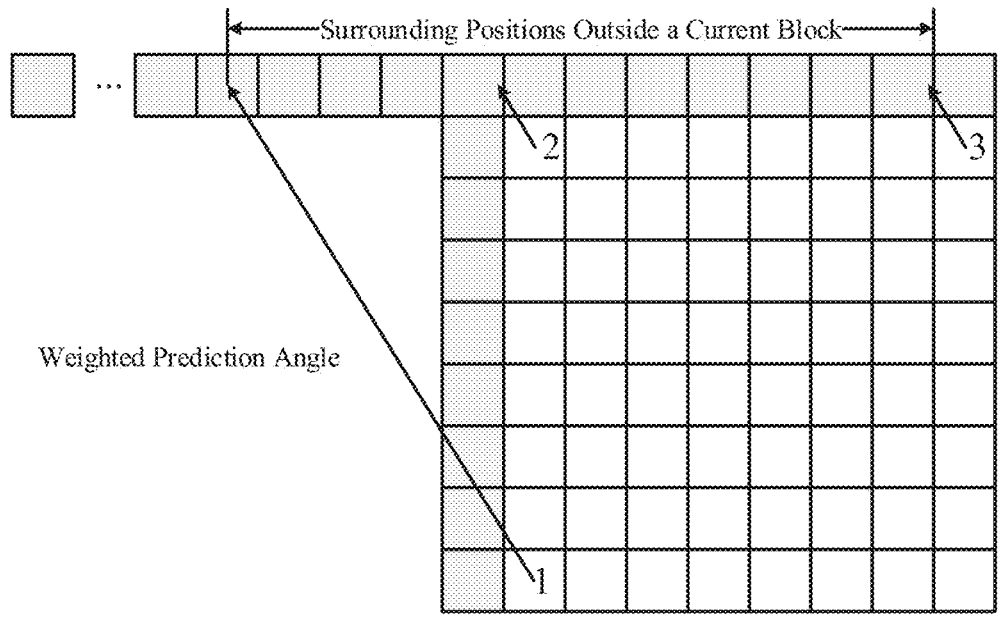
FIGS. 4B to 4E are schematic diagrams illustrating surrounding positions outside a current block.
Figure 4C:
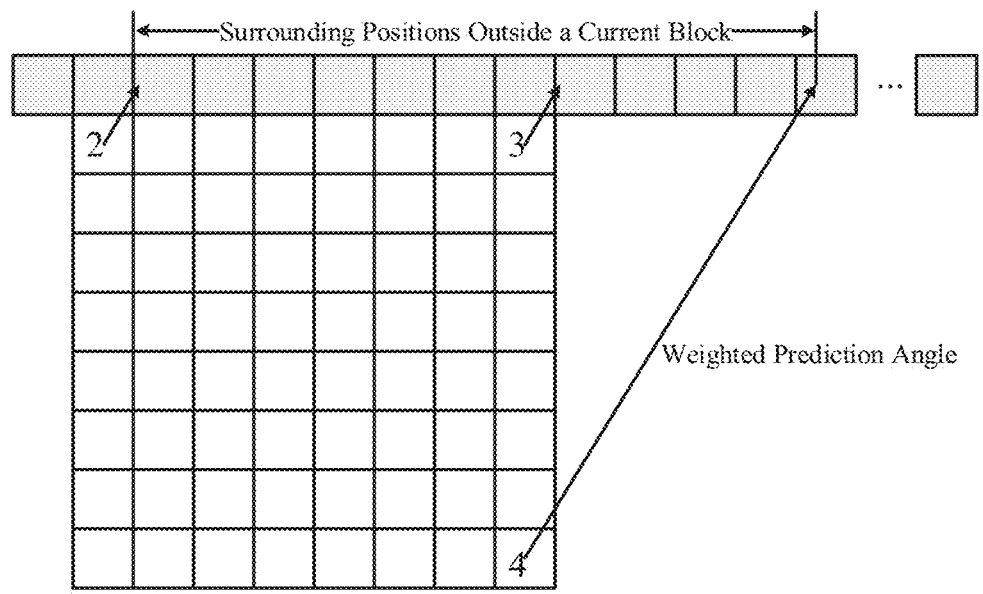

Illustratively, the weighted prediction angle refers to an angle direction to which a pixel position inside the current block points. As shown in FIG. 4B, based on a weighted prediction angle, an angle direction pointed by a pixel position (e.g., the pixel position 1, the pixel position 2 and the pixel position 3) inside the current block is shown, where the angle direction points to a surrounding position outside the current block. As shown in FIG. 4C, based on another weighted prediction angle, an angle direction pointed by a pixel position (e.g., the pixel position 2, the pixel position 3 and the pixel position 4) inside the current block is shown, where the angle direction points to a surrounding position outside the current block.

Illustratively, the weighted prediction position (also called a distance parameter) is used to configure a reference weight value of a surrounding position outside the current block. For example, based on parameters such as the weighted prediction angle of the current block, a size of the current block and so on, a range of the surrounding positions outside the current block is determined (e.g., a number of the surrounding positions outside the current block), which is shown in FIG. 4B or 4C.

Then, the range of the surrounding positions is equally divided into N parts where a value of N may be set arbitrarily, for example, may be set to 4, 6, or 8 or the like. Take 8 as an example, the weighted prediction position is used to represent which surrounding position is used as a weight transform start position of the current block, such that the reference weight values of the surrounding positions outside the current block are configured based on the weight transform start position.

Figure 4D:
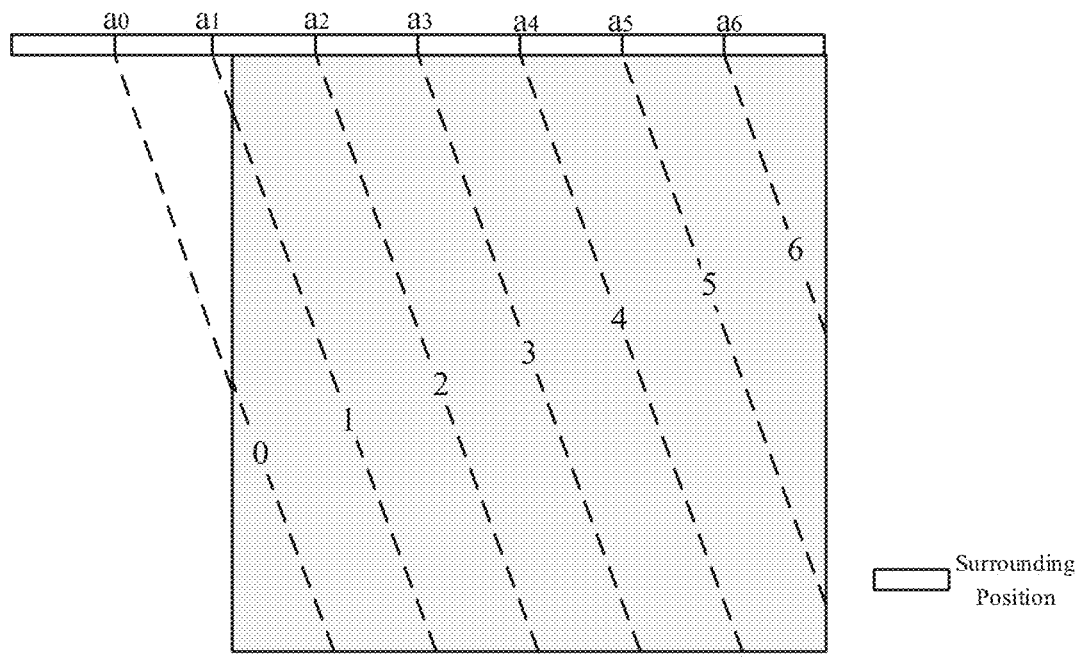

As shown in FIG. 4D, after all surrounding positions are partitioned into eight equal parts, seven weighted prediction positions can be obtained. On this basis, when the weighted prediction position is 0, it may indicate that the surrounding position a0 (i.e., the surrounding position pointed by a dotted line 0. In practice, no dotted line 0 exists, and the dotted line 0 is used only to help understand the given examples. The dotted lines 0 to 6 are used to equally partition all surrounding positions into eight parts) serves as the weight transform start position of the surrounding positions outside the current block. By analogy, when the weighted prediction position is 6, it means that the surrounding position a6 is used as the weight transform start position of the surrounding positions outside the current block.

For different weighted prediction angles, values of N may be different. For example, for a weighted prediction angle A, the value of N may be 6, which indicates that the range of the surrounding positions determined based on the weighted prediction angle A is equally partitioned into six parts. For a weighted prediction angle B, the value of N may be 8, which indicates that the range of the surrounding positions determined based on the weighted prediction angle B is equally partitioned into eight parts.

For different weighted prediction angles, the values of N may be same. In a case of the same value of N, numbers of weighted prediction positions may be different. For example, for the weighted prediction angle A, the value of N is 8, which indicates that the range of the surrounding positions determined based on the weighted prediction angle A is equally partitioned into eight parts; and for the weighted prediction angle B, the value of N is 8 which indicates that the range of the surrounding positions determined based on the weighted prediction angle B is equally partitioned into eight parts. While, the weighted prediction positions corresponding to the weighted prediction angle A are selected for a total of five positions from a1 to a5, and the weighted prediction positions corresponding to the weighted prediction angle B are selected for a total of seven positions from b0 to b6.

The above is an example of equally partitioning the range of the surrounding positions into N parts. In practice, an unequal division manner may also be adopted, for example, the range of the surrounding positions is partitioned into N parts rather than into N equal parts, which is not limited in the present disclosure.

After all surrounding positions are equally partitioned into eight parts, seven weighted prediction positions may be obtained. At step 401, the coder-side may obtain one weighted prediction position from the seven weighted prediction positions, or select some weighted prediction positions (e.g., five weighted prediction positions) from the seven weighted prediction positions and then obtain one weighted prediction position from the five weighted prediction positions.

Illustratively, the weight transform rate represents a transformation rate of the reference weight values of the surrounding positions outside the current block, which is used to represent a change speed of the reference weight values. The weight transform rate may be any number that is not 0, for example, the weight transform rate may be −4, −2, −1, 1, 2, 4, 0.5, 0.75, 1.5, and the like. When an absolute value of the weight transform rate is 1, that is, when the weight transform rate is −1 or 1, it is used to indicate that the change speed of the reference weight values is 1. In this case, the reference weight values from 0 to 8 need to pass through 0, 1, 2, 3, 4, 5, 6, 7, 8, and the reference weight values from 8 to 0 need to pass through 8, 7, 6, 5, 4, 3, 2, 1, 0. When an absolute value of the weight transform rate is 2, that is, when the weight transform rate is −2 or 2, it is used to indicate that the change speed of the reference weight values is 2. In this case, the reference weight values from 0 to 8 need to pass through 0, 2, 4, 6, 8, and the reference weight values from 8 to 0 need to pass through 8, 6, 4, 2, 0. When an absolute value of the weight transform rate is 0.5, that is, when the weight transform rate is −0.5 or 0.5, it is used to indicate that the change speed of the reference weight values is 0.5. In this case, the reference weight values from 0 to 8 need to pass through 0, 0, 1, 1, 2, 2, 3, 3, 4, 4, 5, 5, 6, 6, 7, 7, 8, 8, and the reference weight values from 8 to 0 need to pass through 8, 8, 7, 7, 6, 6, 5, 5, 4, 4, 3, 3, 2, 2, 1, 1, 0, 0. The above examples are from 0 to 8, and 0 and 8 can be replaced with any number.

At step 402, the coder-side configures reference weight values for surrounding positions outside the current block according to the weight transform rate of the current block and the weight transform start position of the current block.

Illustratively, the weight transform start position can be determined by at least one of the following parameters: the weighted prediction angle of the current block, the weighted prediction position of the current block, or the size of the current block. Therefore, the weight transform start position of the current block can be determined based on at least one of the weighted prediction angle of the current block, the weighted prediction position of the current block, or the size of the current block. Then, the reference weight values are configured for the surrounding positions outside the current block according to the weight transform rate of the current block and the weight transform start position of the current block.

At step 403, for each pixel position of the current block, the coder-side determines a surrounding matching position which the pixel position points from the surrounding positions outside the current block based on the weighted prediction angle of the current block. For conveniences of distinguishing, in this embodiment, a surrounding position outside the current block pointed by the pixel position may be referred to as the surrounding matching position of the pixel position.

Illustratively, since the weighted prediction angle refers to an angle direction pointed by a pixel position inside the current block, for each pixel position of the current block, an angle direction pointed by the pixel position is determined based on the weighted prediction angle, and then a surrounding matching position pointed by the pixel position is determined from the surrounding positions outside the current block based on the angle direction.

The surrounding positions outside the current block may include surrounding positions at a row on the upper outside of the current block, for example, surrounding positions at a n1-st row on the upper outside of the current block, n1 may be 1 or 2, 3, etc., which is not limited herein; or, may include surrounding positions at a column on the left outside of the current block, for example, surrounding positions at a n2-nd column on the left outside of the current block, n2 may be 1, or 2, 3, etc., which is not limited herein; or, may include surrounding positions at a row on the lower outside of the current block, for example, surrounding positions at a n3-rd row on the lower outside of the current block, n3 may be 1, or 2, 3, etc., which is not limited herein; or, may include surrounding positions at a column on the right outside of the current block, for example, surrounding positions at a n4-th column on the right outside of the current block, n4 may be 1, or 2, 3 etc., which is not limited herein.

Above examples of surrounding positions are illustrative and not limited herein. In practice, in addition to the surrounding positions outside the current block, internal positions of the current block may also be used, that is, the internal positions of the current block are used to replace the above surrounding positions outside the current block, for example, the internal positions may include internal positions at a n5-th row inside the current block, n5 may be 1, or 2, 3, etc., or internal positions at a n6-th column inside the current block, where n6 may be 1, or 2, 3, etc. The length of the internal positions may exceed a range of the current block, for example, positions of a n7-th row may exceed the range of the current block, that is, extend outwardly from two sides of the current block. Both the internal positions of the current block and the surrounding positions outside the current block may be used at same time.

For using the internal positions of the current block, or using both the internal positions of the current block and the surrounding positions outside the current block, the current block may be partitioned into two small blocks, upper and lower, based on the row where the internal positions are located, or into two small blocks, left and right, based on the column where the internal positions are located. At this time, the two small blocks have a same weighted prediction angle and a same weighted prediction position.

Illustratively, the surrounding positions outside the current block may be located between pixel positions. e.g., at one or more sub-pixel positions, and for the case, the position of the current block cannot be simply described as the x-th row, but rather a sub-pixel position row located between the x-th row and the y-th row.

For convenience of description, in subsequent embodiments, the surrounding positions at the first row on the upper outside of the current block or the surrounding positions at the first column on the left outside of the current block are adopted as an example to describe, and other surrounding positions may be implemented in a similar way.

Illustratively, for the range of the surrounding positions outside the current block, a range may be pre-designated as the range of the surrounding positions outside the current block. Or, the range of the surrounding positions outside the current block may be determined based on the weighted prediction angle, for example, a surrounding position pointed by each of the pixel positions inside the current block is determined based on the weighted prediction angle, and a boundary of the surrounding positions pointed by all pixel positions may be the range of the surrounding positions outside the current block. The range of the surrounding positions is not limited herein.

The surrounding positions outside the current block may include one or more integer pixel positions and/or one or more non-integer pixel positions. The non-integer pixel position may be a sub-pixel position, for example, ½ sub-pixel position, or ¼ sub-pixel position, or ¾ sub-pixel position or the like, which is not limited herein.

Illustratively, two surrounding positions outside the current block may correspond to one integer pixel position; or, four surrounding positions outside the current block may correspond to one integer pixel position; or, one surrounding position outside the current block may correspond to one integer pixel position; or, one surrounding position outside the current block may correspond to two integer pixel positions. The above are only several examples and not limited herein. A relationship between the surrounding position and the integer pixel position can be configured arbitrarily.

Figure 4E:
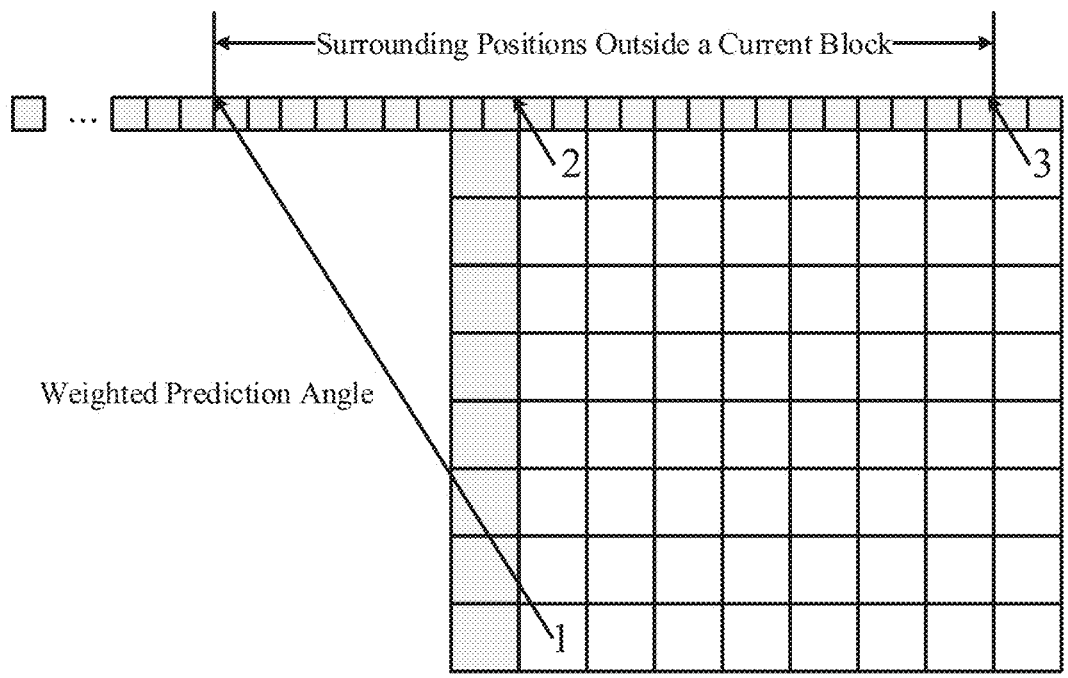

As shown in FIGS. 4B and 4C, one surrounding position corresponds to one integer pixel position, and as shown in FIG. 4E, two surrounding positions correspond to one integer pixel position. Other examples will not be redundantly described in this embodiment.

At step 404, the coder-side determines a target weight value of the pixel position based on a reference weight value associated with the surrounding matching position.

For each pixel position of the current block, after determining the surrounding matching position pointed by the pixel position, the coder-side determines the reference weight value associated with the surrounding matching position and determines the target weight value of the pixel position based on the reference weight value associated with the surrounding matching position, for example, determines the reference weight value associated with the surrounding matching position as the target weight value of the pixel position.

In a possible implementation, the coder-side determines the target weight value of the pixel position based on the reference weight value associated with the surrounding matching position may include the following several cases.

Case 1. If the surrounding matching position is an integer pixel position and the integer pixel position is configured with a reference weight value, the target weight value of the pixel position may be determined based on the reference weight value of the integer pixel position.

Case 2. If the surrounding matching position is an integer pixel position and the integer pixel position is not configured with a reference weight value, the target weight value of the pixel position may be determined based on reference weight value(s) of neighbouring position(s) of the integer pixel position. For example, an upward rounding operation may be performed for a reference weight value of a neighbouring position to obtain the target weight value of the pixel position; or, a downward rounding operation is performed for a reference weight value of a neighbouring position to obtain the target weight value of the pixel position; or, the target weight value of the pixel position is determined based on the interpolation of the reference weight values of the neighbouring positions of the integer pixel position. The determination manner is not limited herein.

Case 3. If the surrounding matching position is a sub-pixel position and the sub-pixel position is configured with a reference weight value, the target weight value of the pixel position is determined based on the reference weight value of the sub-pixel position.

Case 4. If the surrounding matching position is a sub-pixel position and the sub-pixel position is not configured with a reference weight value, the target weight value of the pixel position is determined based on one or more reference weight values of one or more neighbouring positions of the sub-pixel position. For example, an upward rounding operation may be performed for a reference weight value of a neighbouring position to obtain the target weight value of the pixel position; or, a downward rounding operation is performed for a reference weight value of a neighbouring position to obtain the target weight value of the pixel position; or, the target weight value of the pixel position is determined based on the interpolation of the reference weight values of the neighbouring positions of the sub-pixel position. The determination manner is not limited herein.

Case 5, the target weight value of the pixel position is determined based on multiple reference weight values associated with the surrounding matching position. For example, when the surrounding matching position is an integer pixel position or a sub-pixel position, reference weight values of multiple neighbouring positions of the surrounding matching position can be obtained. If the surrounding matching position is configured with a reference weight value, a weighted operation is performed based on the reference weight value of the surrounding matching position and the reference weight values of multiple neighbouring positions to obtain the target weight value of the pixel position. If the surrounding matching position is not configured with a reference weight value, a weighted operation is performed based on the reference weight values of multiple neighbouring positions to obtain the target weight value of the pixel position.

At step 405, the coder-side determines an association weight value of the pixel position based on the target weight value of the pixel position.

Illustratively, for each pixel position, a sum of the target weight value of the pixel position and the association weight value of the pixel position can be a fixed preset value, that is, the association weight value can be a difference between the preset value and the target weight value. Based on this, it is assumed that the preset value is 8. If the target weight value of the pixel position is 2, the association weight value of the pixel position is 6.

At step 406, for each pixel position of the current block, the coder-side determines a first prediction value of the pixel position based on a first prediction mode of the current block, and determines a second prediction value of the pixel position based on a second prediction mode of the current block.

Illustratively, the first prediction mode may be any one of: an intra block copy prediction mode, an intra prediction mode, an inter prediction mode and a palette mode; and the second prediction mode may be any one of: the intra block copy prediction mode, the intra prediction mode, the inter prediction mode and the palette mode. For example, the first prediction mode may be the intra block copy prediction mode and the second prediction mode may be the intra block copy prediction mode; or the first prediction mode may be the intra block copy prediction mode and the second prediction mode may be the intra prediction mode; or the first prediction mode may be the intra block copy prediction mode and the second prediction mode may be the inter prediction mode; or the first prediction mode may be the intra block copy prediction mode and the second prediction mode may be the palette mode. By analogy, there is no limitation on the first prediction mode and the second prediction mode.

A process of determining the prediction values based on the first prediction mode and the second prediction mode can be referred to the subsequent embodiments.

At step 407, the coder-side determines a weighted prediction value of the pixel position based on the first prediction value of the pixel position, the target weight value of the pixel position, the second prediction value of the pixel position and the association weight value of the pixel position.

For example, the weighted prediction value of the pixel position may be: (the first prediction value of the pixel position*the target weight value of the pixel position+the second prediction value of the pixel position*the association weight value of the pixel position)/a fixed preset value.

At step 408, the coder-side determines weighted prediction values of the current block based on the weighted prediction values of all pixel positions in the current block.

As described in the above technical solutions, in the embodiments of the present disclosure, an effective manner of configuring weight values is provided, in which a reasonable target weight value is configured for each pixel position of the current block, such that the prediction values of the current block are more approximate to values of raw pixels, thereby improving the prediction accuracy, prediction performance and coding performance.

Figure 4F:
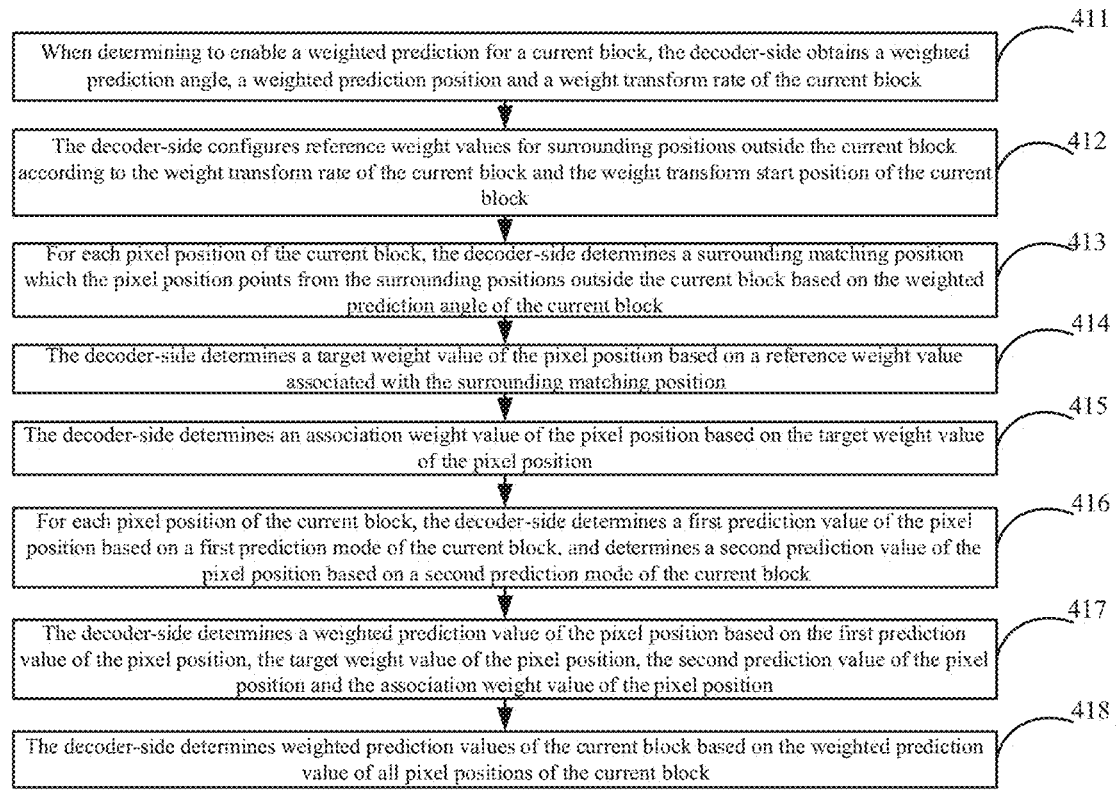
FIG. 4F is a flowchart illustrating a decoding method according to an embodiment of the present disclosure.

Embodiment 3. Based on the embodiment 1, another coding and decoding method is provided in the embodiments of the present disclosure, as shown in FIG. 4F, which is a schematic diagram illustrating a flowchart of the coding and decoding method. The method may be applied to a decoder-side and include the following steps.

At step 411, when determining to enable a weighted prediction for a current block, the decoder-side obtains a weighted prediction angle of the current block, a weighted prediction position of the current block and a weight transform rate of the current block. Illustratively, the decoder-side determines whether to enable the weighted prediction for the current block. If the decoder-side determines to enable the weighted prediction for the current block, step 411 and the following steps are performed, otherwise, the processing method is not limited in the present disclosure.

In a possible implementation, a coder-side determines whether feature information of the current block satisfies a specific condition, and if the feature information satisfies the specific condition, the coder-side determines to enable the weighted prediction for the current block. The decoder-side also determines whether the feature information of the current block satisfies the specific condition, and if the feature information satisfies the specific condition, the decoder-side determines to enable the weighted prediction for the current block, otherwise, the decoder-side determines not to enable the weighted prediction for the current block. A manner in which the decoder-side determines whether to enable the weighted prediction for the current block based on the feature information can be referred to the step 401 and will not be repeated herein.

In another possible implementation, the coder-side determines whether the current block supports the weighted prediction based on the feature information of the current block. When the current block supports the weighted prediction, another strategy may also be adopted to determine whether to enable the weighted prediction for the current block, for example, an RDO is adopted to determine whether to enable the weighted prediction for the current block. After determining whether to enable the weighted prediction for the current block or not, when the coder-side transmits a coded bit stream of the current block, the coded bit stream may include a syntax for whether to enable the weighted prediction for the current block, where the syntax represents whether to enable the weighted prediction for the current block. The decoder-side determines whether the current block supports the weighted prediction based on the feature information of the current block, when determining the current block supports the weighted prediction, the decoder-side may decode the syntax for whether to enable the weighted prediction from the coded bit stream and determine whether to enable the weighted prediction for the current block based on the syntax.

Illustratively, when determining to enable the weighted prediction for the current block, the decoder-side may also obtain the weighted prediction angle of the current block, the weighted prediction position of the current block and the weight transform rate of the current block, where the relevant description of the weighted prediction angle, the weighted prediction position and the weight transform rate can be referred to the step 401 and will not be repeated herein.

At step 412, the decoder-side configures reference weight values for surrounding positions outside the current block according to the weight transform rate of the current block and the weight transform start position of the current block.

Illustratively, the decoder-side may determine the weight transform start position of the current block based on at least one of the weighted prediction angle of the current block, the weighted prediction position of the current block, or the size of the current block. Then, the decoder-side configures the reference weight values for the surrounding positions outside the current block according to the weight transform rate of the current block and the weight transform start position of the current block.

At step 413, for each pixel position of the current block, the decoder-side determines a surrounding matching position which the pixel position points from the surrounding positions outside the current block based on the weighted prediction angle of the current block.

At step 414, the decoder-side determines a target weight value of the pixel position based on a reference weight value associated with the surrounding matching position.

At step 415, the decoder-side determines an association weight value of the pixel position based on the target weight value of the pixel position.

At step 416, for each pixel position of the current block, the decoder-side determines a first prediction value of the pixel position based on a first prediction mode of the current block, and determines a second prediction value of the pixel position based on a second prediction mode of the current block.

At step 417, the decoder-side determines a weighted prediction value of the pixel position based on the first prediction value of the pixel position, the target weight value of the pixel position, the second prediction value of the pixel position and the association weight value of the pixel position.

At step 418, the decoder-side determines weighted prediction values of the current block based on the weighted prediction values of all pixel positions in the current block.

Illustratively, implementation processes of steps 412 to 418 can be referred to that of the steps 402 to 408, with difference being that the steps 412 to 418 are the processes at the decoder-side rather than the processes at the coder-side, and will not be repeated herein.

As described in the above technical solutions, in the embodiments of the present disclosure, an effective manner of configuring weight values is provided, in which a reasonable target weight value is configured for each pixel position of the current block, such that the prediction values of the current block are more approximate to raw pixels, thereby improving the prediction accuracy, prediction performance and coding and decoding performance.

Embodiment 4. In the embodiments 1 to 3, a weighted processing is expected to be performed based on a weighted prediction angle, and the weighted processing method can be denoted as a inter Angular Weighted Prediction (AWP) mode. That is, when a current block supports the AWP mode, the current block is predicted using the embodiments 1 to 3 to obtain prediction values of the current block.

The embodiments 1 to 3 involve a weighted prediction angle. The weighted prediction angle may be any angle, for example, any angle within 180 degrees, or any angle within 360 degrees, such as 10 degrees, 20 degrees, 30 degrees or the like, which is not limited herein.

In a possible implementation, the weighted prediction angle may be a horizontal angle (e.g., angle 2 in FIG. 7B); or, the weighted prediction angle may be a vertical angle (e.g., angle 6 in FIG. 7B); or, an absolute value of a slope of the weighted prediction angle (the absolute value of the slope of the weighted prediction angle is a tangent value of the weighted prediction angle) may be n-th power of 2, where n is an integer, such as a positive integer, 0 and a negative integer.

Figure 5:
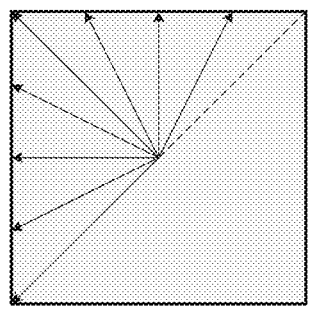
FIG. 5 is a schematic diagram illustrating a weighted prediction angle according to an embodiment of the present disclosure.

For example, the absolute value of the slope of the weighted prediction angle may be 1 (i.e., a value of 0-th power of 2), 2 (i.e., a value of $1^{st}$ power of 2), ½ (i.e., a value of $-1^{st}$ power of 2), 4 (i.e., a value of $2^{nd}$ power of 2), ¼ (i.e., a value of $-2^{nd}$ power of 2), 8 (i.e., a value of $3^{rd}$ power of 2), or ⅛ (i.e., a value of $-3^{rd}$ power of 2) and the like. Illustratively, as shown in FIG. 5, eight weighted prediction angles are shown, where absolute values of slopes of the weighted prediction angles are values of n-th power of 2.

In the embodiments of the present disclosure, a shift operation may be performed for the weighted prediction angle. See subsequent embodiments for examples of the shift operation of the weighted prediction angle. Therefore, when the absolute value of the slope of the weighted prediction angle is n-th power of 2, a division operation may be avoided during the shift operation for the weighted prediction angle, thereby facilitating the shift implementation.

Illustratively, the numbers of the weighted prediction angles supported by different block sizes (e.g., the size of the current block) may be same or different. For example, a block size A supports 8 weighted prediction angles, a block size B and a block size C supports 6 weighted prediction angles and so on.

Embodiment 5. In the embodiments 1 to 3, the coder-side/decoder-side needs to configure reference weight values for surrounding positions outside the current block according to the weight transform rate of the current block and the weight transform start position of the current block. In a possible implementation, the following manner can be adopted: for each surrounding position outside the current block, a reference weight value of the surrounding position is configured based on coordinate values of the surrounding position, coordinate values of the weight transform start position and the weight transform rate.

Illustratively, for each surrounding position outside the current block, if the surrounding position is a surrounding position at one row on the upper outside or one row on the lower outside of the current block, the coordinate value of the surrounding position may be an abscissa value and the coordinate value of the weight transform start position may be an abscissa value. Or, if the surrounding position is a surrounding position at one column on the left outside or one column on the right outside of the current block, the coordinate value of the surrounding position may be an ordinate value and the coordinate value of the weight transform start position may be an ordinate value.

Illustratively, a pixel position at an upper left corner of the current block (e.g., a first pixel position of the upper left corner) may be used as a coordinate origin, and the coordinate value of the surrounding position of the current block (e.g., abscissa value or ordinate value) and the coordinate value of the weight transform start position (e.g., abscissa value or ordinate value) both are the coordinate values relative to the coordinate origin. Another pixel position of the current block may also be taken as a coordinate origin and the implementation manner is similar to that of using the pixel position at the upper left corner as the coordinate origin.

In a possible implementation, a difference between the coordinate value of the surrounding position and the coordinate value of the weight transform start position is first determined, and a product value of the difference and the weight transform rate of the current block is determined. If the product value is less than a first value (e.g., a minimum value of the reference weight value, such as 0), the reference weight value associated with the surrounding position is determined to be the first value. If the product value is greater than a second value (e.g., a maximum value of the reference weight value, such as 8), the reference weight value associated with the surrounding position is determined to be the second value. If the product value is not less than the first value and not greater than the second value, the reference weight value associated with the surrounding position is determined to be the product value. In another possible implementation, the reference weight value associated with the surrounding position can also be determined directly based on a size relationship between the coordinate value of the surrounding position and the coordinate value of the weight transform start position. For example, if the coordinate value of the surrounding position is less than the coordinate value of the weight transform start position, the reference weight value associated with the surrounding position is determined as the first value; and if the coordinate value of the surrounding position is not less than the coordinate value of the weight transform start position, the reference weight value associated with the surrounding position is determined as the second value. For another example, if the coordinate value of the surrounding position is less than the coordinate value of the weight transform start position, the reference weight value associated with the surrounding position is determined as the second value; and if the coordinate value of the surrounding position is not less than the coordinate value of the weight transform start position, the reference weight value associated with the surrounding position is determined as the first value.

Illustratively, the first value and the second value may be configured based on experience and the first value is less than the second value. The first value and the second value are not limited herein. In some examples, the first value may be a minimum value of pre-agreed reference weight values, for example, 0, and the second value may be a maximum value of the pre-agreed reference weight values, for example, 8, where 0 and 8 are only examples.

Illustratively, as shown in FIG. 4D, after all the surrounding positions are equally divided into eight parts, seven weighted prediction positions are obtained. When the weighted prediction position is 0, it indicates a surrounding position a0, and the coordinate value of the weight transform start position is a coordinate value of the surrounding position a0. When the weighted prediction position is 1, it indicates a surrounding position a1, and the coordinate value of the weight transform start position is a coordinate value of the surrounding position a1, and so on. The manner of determining the coordinate value of the weight transform start position will not be repeated herein.

Embodiment 6. In the embodiments 1 to 3, the coder-side/decoder-side needs to configures reference weight values for surrounding positions outside the current block according to the weight transform rate of the current block and the weight transform start position of the current block. In a possible implementation, the following manner can be adopted: the weighted prediction angle of the current block, the weight transform rate of the current block and the weighted prediction position of the current block are obtained, the weight transform start position of the current block is determined based on the weighted prediction position of the current block, and the weight configuration parameters are determined based on the weight transform start position and the weight transform rate. The weight configuration parameters include the weight transform start position and the weight transform rate. Then, the reference weight values of the surrounding positions outside the current block are determined based on the weight configuration parameters.

The process of configuring the reference weight values for surrounding positions outside the current block is described below in combination with specific implementation methods.

First, a valid number of reference weight values are obtained, and then the reference weight values of the surrounding positions outside the current block are configured according to the valid number of reference weight values.

Illustratively, a number of the surrounding positions outside the current block is a valid number, and the valid number of reference weight values need to be obtained, where the valid number may be determined based on a size of the current block and/or the weighted prediction angle of the current block. For example, the valid number ValidLength can be determined in the following manner: ValidLength=(N+(M>>X))<<1, where N represents a height of the current block, M represents a width of the current block, X represents a log 2 logarithmic value of an absolute value of a slope of the weighted prediction angle of the current block, such as 0 or 1, << refers to arithmetic left shift, and >> refers to arithmetic right shift.

In the present disclosure, a<<b can be understood as arithmetic left shift of a two's complement integer representation of a by b binary digits, and this operation is defined at the time of b being a positive number. Simply speaking, a<<b can be understood as multiplying a by 2 to the b-th power. In the present disclosure, a>>b can be understood as arithmetic right shift of a two's complement integer representation of a by b binary digits, and this operation is defined at the time of b being a positive number. Simply speaking, a>>b can be understood as dividing a by 2 to the b-th power.

In a possible implementation, the valid number of reference weight values may monotonically increase or monotonically decrease. Optionally, the valid number of reference weight values may firstly include a plurality of first reference weight values and then include a plurality of second reference weight values, or firstly include the plurality of second reference weight values and then include the plurality of first reference weight values. Descriptions will be made below in combination with several circumstances.

Circumstance 1: the valid number of reference weight values may monotonically increase or monotonically decrease. For example, the valid number of reference weight values can be [8 8 . . . 8 8 7 6 5 4 3 2 1 0 0 . . . 0 0], i.e., monotonically decreasing. For another example, the valid number of reference weight values can be [0 0 . . . 0 0 1 2 3 4 5 6 7 8 . . . 8 8], i.e., monotonically increasing. The above examples are only illustrative and not a limitation of the present disclosure.

Illustratively, the reference weight values may be configured based on weight configuration parameters. The weight configuration parameters may include a weight transform rate and a weight transform start position. See the subsequent embodiments for the method of obtaining the weight transformation rate. The weight transform start position may be a value set based on experience, or the weight transform start position may also be determined based on the weighted prediction position, or determined based on the weighted prediction angle and the weighted prediction position, which is not limited.

The valid number of reference weight values may monotonically increase or decrease from the first to the last. For example, if a maximum value of the reference weight values is M1 and a minimum value of the reference weight values is M2, the valid number of reference weight values monotonically decrease from the maximum value M1 to the minimum value M2, or monotonically increase from the minimum value M2 to the maximum value M1. If M1 is 8 and M2 is 0, a plurality of reference weight values monotonically decrease from 8 to 0 or monotonically increase from 0 to 8.

Illustratively, the weight transform rate and the weight transform start position can be obtained first, and then, based on the weight transform rate and the weight transform start position, the plurality of reference weight values can be determined. For example, the reference weight values can be determined in the following manner: y(x)=Clip3 (minimum, maximum, a*(x−s)), where x represents an index of a surrounding position, which ranges from 1 to the valid number value, for example, x being 1 indicating the first surrounding position; y(x) represents a reference weight value of an x-th surrounding position, "a" represents a weight transform rate, and s represents a weight transform start position. A Clip3 function is used to limit the reference weight values to be between a minimum value and a maximum value. The maximum value and the minimum value can be configured based experience. For ease of descriptions, subsequent descriptions are given by taking the minimum value being 0 and the maximum value being 8 as an example.

"a" represents a weight transform rate, and "a" may be a non-zero integer, for example, "a" may be −4, −2, −1, 1, 2, 4 or the like. There is no limitation on the value of a. If an absolute value of "a" is 1, the reference weight values from 0 to 8 need to pass through 0, 1, 2, 3, 4, 5, 6, 7, 8, or, the reference weight values from 8 to 0 need to pass through 8, 7, 6, 5, 4, 3, 2, 1, 0.

s may represent a weight transform start position, which can be determined based on the weighted prediction position. For example, s=f(weighted prediction position), that is, s is a function relating to the weighted prediction position. For example, after a range of the surrounding positions outside the current block is determined, a valid number of the surrounding positions is determined, and all the surrounding positions are equally divided into N parts, where a value of N may be configured arbitrarily, such as 4, 6, 8 or the like. The weighted prediction position is used to represent which surrounding position outside the current block is adopted as one of target surrounding positions of the current block, and a surrounding position corresponding to the weighted prediction position is the weight transform start position. Optionally, s may be determined based on the weighted prediction angle and the weighted prediction position, for example, s=f(weighted prediction angle, weighted prediction position), that is, s is a function relating to the weighted prediction angle and the weighted prediction position. For example, a range of the surrounding positions outside the current block may be determined based on the weighted prediction angle. After the range of the surrounding positions outside the current block is determined, the valid number of the surrounding positions may be determined and all the surrounding positions are equally divided into N parts. The weighted prediction position is used to represent which surrounding position outside the current block is adopted as one of the target surrounding positions of the current block and a surrounding position corresponding to the weighted prediction position is the weight transform start position.

To sum up, in the y(x)=Clip3 (minimum, maximum, a*(x−s)), the weight transform rate "a" and the weight transform start position s both are known values. For each of the surrounding positions x outside the current block, the reference weight value y(x) of the surrounding position can be determined based on the functional relationship. For example, if the weight transform rate "a" is 2 and the weight transform start position s is 2, the functional relationship may be y(x)=Clip3(minimum, maximum, 2*(x−2)). For each surrounding position x outside the current block, a reference weight value y(x) can be obtained.

To sum up, the valid number of reference weight values of the current block can be obtained and these reference weight values may monotonically increase or monotonically decrease. In a possible embodiment, the reference weight values of the surrounding positions outside the current block include one or more reference weight values of target positions, one or more reference weight values of first neighbouring positions of the target positions, and one or more reference weight values of second neighbouring positions of the target positions.

Illustratively, the target positions include one reference weight value or at least two reference weight values. For example, a reference weight value is determined based on the weight transform start position, and positions corresponding to the reference weight value are taken as the target positions. For another example, at least two reference weight values are determined based on the weight transform start position, and positions corresponding to the at least two reference weight values are taken as the target positions.

If the target positions include at least two reference weight values, the at least two reference weight values of the target positions monotonically increase or monotonically decrease. The monotonically increasing may be strictly monotonically increasing (the at least two reference weight values of the target positions strictly monotonically increase); and the monotonically decreasing may be strictly monotonically decreasing (the at least two reference weight values of the target positions strictly monotonically decrease). For example, the reference weight values of the target positions monotonically increase from 1 to 7, or, the reference weight values of the target positions monotonically decrease from 7 to 1.

Illustratively, the reference weight values of the first neighbouring positions may all be a first reference weight value, and the reference weight values of the second neighbouring positions may increase monotonously. For example, the reference weight values of the first neighboring positions may all be 0, the target positions include one reference weight value which is 1, and the reference weight values of the second neighboring positions monotonically increase from 2 to 8.

Or, the reference weight values of the first neighbouring positions may all be the first reference weight value, and the reference weight values of the second neighbouring positions may decrease monotonously. For example, the reference weight values of the first neighboring positions may all be 8, the target positions include one reference weight value which is 7, and the reference weight values of the second neighboring positions monotonically decrease from 6 to 0.

Or, the reference weight values of the first neighbouring positions are all a second reference weight value, and the reference weight values of the second neighbouring positions are all a third reference weight value, and the second reference weight value is different from the third reference weight value. For example, the reference weight values of the first neighbouring positions are all 0, the target positions include at least two reference weight values which monotonically increase from 1 to 7, and the reference weight values of the second neighboring positions are all 8, the reference weight values of the first neighboring positions are different from the reference weight values of the second neighboring positions.

Optionally, the reference weight values of the first neighbouring positions and the reference weight values of the second neighbouring positions monotonically increase or monotonically decrease at same time. For example, the reference weight values of the first neighbouring positions monotonically increase, and the reference weight values of the second neighbouring positions also monotonically increase. For another example, the reference weight values of the first neighbouring positions monotonically decrease, and the reference weight values of the second neighbouring positions also monotonically decrease. For example, the reference weight values of the first neighbouring positions monotonically increase from 0 to 3, the target positions include one reference weight value which is 4, and the reference weight values of the second neighbouring positions monotonically increase from 5 to 8.

Circumstance 2: the valid number of reference weight values may first include a plurality of third values and then include a plurality of fourth values, or, may first include a plurality of fourth values and then include a plurality of third values. For example, the valid number of reference weight values may be [8 8 . . . 8 8 0 0 . . . 0 0] or [0 0 . . . 0 0 8 8 . . . 8 8]. Illustratively, a plurality of reference weight values may be determined based on the weight transform start position. For example, the weight transform start position represents a s-th reference weight value. Therefore, all reference weight values before the s-th reference weight value (excluding the s-th reference weight value) are the third value (such as 8), and all reference weight values after the s-th reference weight value (including the s-th reference weight value) are the fourth value (such as 0). Or, all reference weight values before the s-th reference weight value are the fourth value, and all reference weight values after the s-th reference weight value are the third value.

After obtaining the valid number of reference weight values, the reference weight values of the surrounding positions outside the current block are configured according to the valid number of reference weight values.

Illustratively, a number of the surrounding positions outside the current block is a valid number and a number of the reference weight values is the valid number, so that the valid number of reference weight values can be configured as the reference weight values of the surrounding positions outside the current block. For example, a first reference weight value may be configured as a reference weight value of a first surrounding position outside the current block, and a second reference weight value may be configured as a reference weight value of a second surrounding position outside the current block and so on.

In summary, the reference weight values have been configured for the surrounding positions outside the current block, that is, each surrounding position has a reference weight value. Therefore, the reference weight value associated with a surrounding matching position, which is a target weight value of the pixel position, can be determined after determining the surrounding matching position which the pixel position points from the surrounding positions outside the current block.

The implementation of the above process is described below in combination with several specific application scenarios. Illustratively, in the following application scenarios, assume that a size of the current block is M*N, where M represents a width of the current block, and N represents a height of the current block. X represents a log 2 logarithmic value of a tangent value of the weighted prediction angle, such as 0 or 1. Y represents an index value of the weighted prediction position, and A, b, c and d represent preset constant values. ValidLength represents a valid number, FirstPos represents a weight transform start position, ReferenceWeights[i] represents a reference weight value of a i-th surrounding position, a function Clip3 is used to limit the reference weight value between a minimum value 0 and a maximum value 8, i represents an index of the surrounding positions outside the current block, and "a" represents an absolute value of the weight transform rate.

Application scenario 1: the valid number (also known as a valid length of a reference weight, i.e., ValidLength) is determined based on the size of the current block and the weighted prediction angle of the current block, and the weight transform start position FirstPos is obtained. For example, ValidLength can be determined by the following formula: ValidLength =(N+(M>>X))<<1. FirstPos can be determined by the following formula: FirstPos=(ValidLength>>1)-A+Y*((ValidLength-1)>>3). Based on this, the reference weight value of each surrounding position of the current block is derived by the following formula: ReferenceWeights[i]=Clip3(0, 8, a*(i-FirstPos)). The value range of i may be 0 to ValidLength-1, or 1 to ValidLength. After obtaining the reference weight value ReferenceWeights[i] of a surrounding position of the current block, the target weight value of a pixel position (x, y) of the current block is derived by the following formula: SampleWeight[x][y]=ReferenceWeights[(y<<1)+((x<<1)>>X)],
where <<refers to arithmetic left shift, and >> refers to arithmetic right shift.

Application scenario 2: ValidLength can be determined by the following formula: ValidLength=(N+(M>>X))<<1. FirstPos can be determined by the following formula: FirstPos=(ValidLength>>1)-b+Y*((ValidLength-1)>>3)-((M<<1)>>X). Based on this, the reference weight value of each surrounding position of the current block is derived by the following formula: ReferenceWeights[i]=Clip3(0, 8, a*(i-FirstPos)). The target weight value of each pixel position (x, y) of the current block can be derived by the following formula: SampleWeight[x][y]=ReferenceWeights[(y<<1)-((x<<1)>>X)].

Application scenario 3: ValidLength can be determined by the following formula: ValidLength=(M+(N>>X))<<1. FirstPos can be determined by the following formula: FirstPos=(ValidLength>>1)-c+Y*((ValidLength-1)>>3)-((N<<1)>>X). Based on this, the reference weight value of each surrounding position of the current block may be derived by the following formula: ReferenceWeights[i]=Clip3(0, 8, a*(i-FirstPos)). The target weight value of each pixel position (x, y) of the current block can be derived by the following formula: SampleWeight[x][y]=ReferenceWeights[(x<<1)-((y<<1)>>X)].

Application scenario 4: ValidLength can be determined by the following formula: ValidLength=(M+(N>>X))<<1. FirstPos can be determined by the following formula: FirstPos=(ValidLength>>1)-d+Y*((ValidLength-1)>>3); based on this, the reference weight values of each surrounding position of the current block can be derived by the following formula: ReferenceWeights[i]=Clip3(0, 8, a*(i-FirstPos)). The target weight value of each pixel position (x, y) of the current block can be derived by the following formula: SampleWeight[x][y]=ReferenceWeights[(x<<1)+((y<<1)>>X)].

Figure 6:
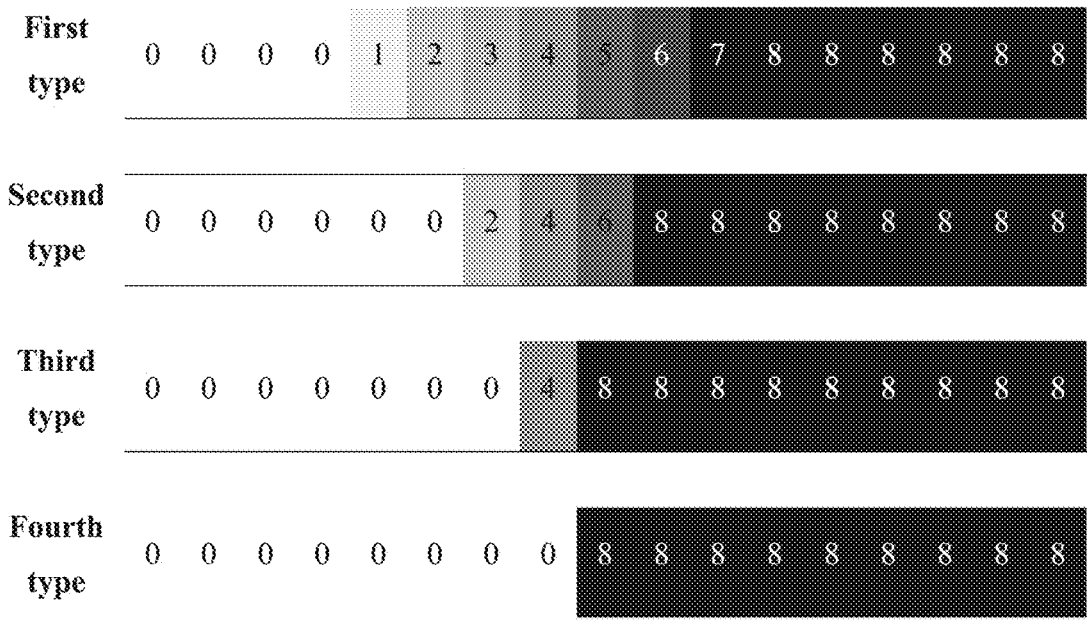
FIG. 6 is a schematic diagram of reference weight values of four weight transform rates according to an embodiment of the present disclosure.

Application scenario 5: referring to FIG. 6, a schematic diagram of reference weight values of four weight transform rates is shown.

When an absolute value of a weight transform rate is 1, that is, the weight transform rate is 1 or the weight transform rate is −1, the reference weight value of each surrounding position of the current block can be derived by the following formula: ReferenceWeights[i]=Clip3(0, 8, 1*(i−FirstPos)), and the above formula can be equated to ReferenceWeights[i]=Clip3(0, 8, i−FirstPos). In this case, refer to the first type shown in FIG. 6, FirstPos may be 4, i.e., the reference weight values of the $1^{st}$ to $4^{th}$ surrounding positions are 0, the reference weight value of the $5^{th}$ surrounding position is 1, the reference weight value of the $6^{th}$ surrounding position is 2, and so on.

When an absolute value of a weight transform rate is 2, that is, the weight transform rate is 2 or −2, the reference weight value of each surrounding position of the current block is derived by the following formula: ReferenceWeights[i]=Clip3(0, 8, 2*(i−FirstPos)), and the above formula can be equated to ReferenceWeight[i]=Clip3(0, 8, (i−FirstPos)<<1). In this case, refer to the second type shown in FIG. 6, FirstPos may be 6, i.e., the reference weight values of the $1^{st}$ to $6^{th}$ surrounding positions are 0, the reference weight value of the $7^{th}$ surrounding position is 2, the reference weight value of the $8^{th}$ surrounding position is 4, and so on.

When an absolute value of a weight transform rate is 4, that is, the weight transform rate is 4 or −4, the reference weight value of each surrounding position of the current block is derived by the following formula: ReferenceWeights[i]=Clip3(0, 8, 4*(i−FirstPos)), and the above formula can be equated to ReferenceWeight[i]=Clip3(0, 8, (i−FirstPos)<<2). In this case, refer to the third type shown in FIG. 6, FirstPos may be 7, i.e., the reference weight values of the $1^{st}$ to $7^{th}$ surrounding positions are 0, the reference weight value of the $8^{th}$ surrounding position is 4, the reference weight values of the $9^{th}$ to $17^{th}$ surrounding positions are 8, and so on.

When an absolute value of a weight transform rate is 8, that is, the weight transform rate is 8 or −8, the reference weight value of each surrounding position of the current block is derived by the following formula: ReferenceWeights[i]=Clip3(0, 8, 8*(i−FirstPos)), and the above formula can be equated to ReferenceWeight[i]=Clip3(0, 8, (i−FirstPos)<<3). In this case, refer to the fourth type shown in FIG. 6, FirstPos may be 8, i.e., the reference weight values of the $1^{st}$ to $8^{th}$ surrounding positions are 0, the reference weight value of the $9^{th}$ surrounding position is 8, the reference weight values of the $10^{th}$ to $17^{th}$ surrounding positions are 8, and so on.

In summary, when the absolute value of the weight transform rate is 1, FirstPos is 4; when the absolute value of the weight transform rate is 2, FirstPos is 6 (i.e., the FirstPos at weight transform rate 1 plus 2); and when the absolute value of the weight transform rate is 4, FirstPos is 7 (i.e., the FirstPos at weight transform rate 1 plus 3). Based on this, the positions with a reference weight value of 4 can be aligned.

Illustratively, for the current block, when weight transform rate switching is supported and the weight transform rate switching is enabled, one of the 4 types for reference weight value distributions of the weight transform rate shown in FIG. 6 can be selected to be switched, so that by switching the weight transform rate for an image or for a part of an image, a problem that fast value changes of image display in some image display scenes are prominent can be alleviated. For example, in some image display scenes, the problem that the fast value changes are prominent is expected to be alleviated, and the weight transform rate switching of AWP mode can alleviate this problem. For example, mixed image content includes a part of screen contents, cartoons, images containing cartoons and the like, weight transform rate switching can be applied to a certain area containing the screen contents, so as to alleviate the problem that the fast value changes are prominent.

In the above process, ValidLength is related to the weighted prediction angle of the current block and the size of the current block. For simplification of scheme, some parameters may be fixed to achieve optimization. For example, the weighted prediction angle of the current block may be set to a fixed parameter value, and the ValidLength is only related to the size of the current block. FirstPos is related to the weighted prediction angle of the current block, the size of the current block, and the weighted prediction position of the current block. For another example, the weighted prediction angle of the current block may be configured as a fixed parameter value, and the FirstPos is only related to the size of the current block and the weighted prediction position of the current block. Optionally, the weighted prediction position of the current block may be configured as a fixed parameter value, and the FirstPos is only related to the size of the current block and the weighted prediction angle of the current block. Optionally, the weighted prediction angle of the current block and the weighted prediction position of the current block may both be configured as fixed parameter values which may be same or different, and the FirstPos is only related to the size of the current block.

Figure 7A:
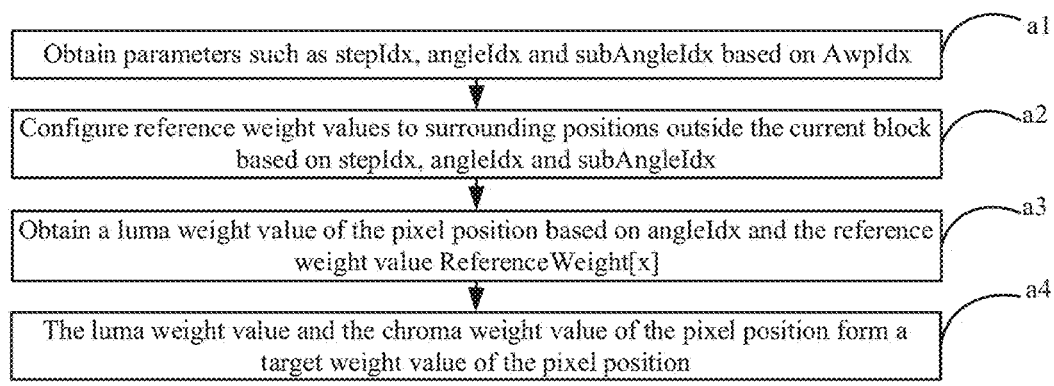
FIG. 7A is a flowchart of deriving a weight array according to an embodiment of the present disclosure.

Embodiment 7. In the embodiments 1 to 3, the coder-side/decoder-side needs to configures reference weight values for surrounding positions outside the current block according to the weight transform rate of the current block and the weight transform start position of the current block. In a possible implementation, M and N represent a width and a height of the current block, respectively. As shown in FIG. 7A, a weight array derivation manner for an angular weighted prediction (AWP) mode may include the followings.

At step a1, parameters such as stepIdx, angleIdx and subAngleIdx are obtained based on AwpIdx.

Illustratively, AwpIdx represents an index value of a weighted prediction angle and a weighted prediction position. If there are 7 weighted prediction positions and 8 weighted prediction angles, a value range of AwpIdx is 0 to 55. If the weighted prediction positions are −3 to 3 (representing a fourth one weighted prediction position is a centre and the fourth one weighted prediction position is 0), and if an index of the weighted prediction angle is 0-7, the weighted prediction positions and the weighted prediction angles corresponding to 56 index values of AwpIdx are shown in Table 1.

TABLE 1

| AwpIdx | Weighted Prediction Position | Weighted Prediction Angle |
|---|---|---|
| 0 | −3 | 0 |
| 1 | −3 | 1 |
| ... | ... | ... |
| 7 | −3 | 7 |
| 8 | −2 | 0 |
| 9 | −2 | 1 |
| ... | ... | ... |
| 55 | 3 | 7 |

Figure 7B:
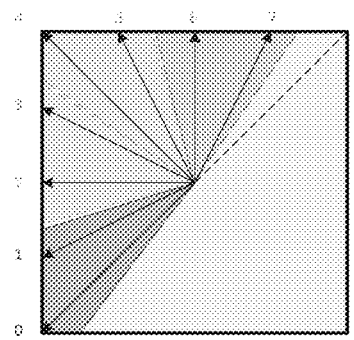
FIGS. 7B to 7D are schematic diagrams of weighted prediction angle and areas according to an embodiment of the present disclosure.

Illustratively, stepIdx represents a weighted prediction position (e.g., an index value of a weighted prediction position) which ranges from −3 to 3. For example, for a first one weighted prediction position, the index value of the weighted prediction position is −3; for a second one weighted prediction position, the index value of the weighted prediction position is −2, and so on; for a seventh one weighted prediction position, the index value of the weighted prediction position is 3.

angleIdx represents a log 2 logarithmic value of an absolute value of a slope of the weighted prediction angle (e.g., 0, or 1, or a larger constant), and subAngleIdx represents an angle area where the weighted prediction angle is located. FIG. 7B shows eight weighted prediction angles, where angleIdx of a weighted prediction angle 0 is a log 2 logarithmic value of an absolute value of a slope of the weighted prediction angle 0, and angleIdx of a weighted prediction angle 1 is a log 2 logarithmic value of an absolute value of a slope of the weighted prediction angle 1, and so on, and angleIdx of a weighted prediction angle 7 is a log 2 logarithmic value of an absolute value of a slope of the weighted prediction angle 7. The weighted prediction angle 0 and the weighted prediction angle 1 are located in an angle area 0, a weighted prediction angle 2 and a weighted prediction angle 3 are located in an angle area 1, a weighted prediction angle 4 and a weighted prediction angle 5 are located in an angle area 2, and a weighted prediction angle 6 and the weighted prediction angle 7 are located in an angle area 3.

Illustratively, stepIdx may be determined in a following formula: stepIdx=(AwpIdx>>3)−3.

Illustratively, modAngNum (angle index) may be firstly determined based on a following formula: modAngNum=AwpIdx % 8; then, angleIdx is determined based on modAngNum in a following manner: if modAngNum is equal to 2, angleIdx=7; if modAngNum is equal to 6, angleIdx=8; otherwise, angleIdx=modAngNum % 2.

Illustratively, subAngleIdx may be determined in a following formula: subAngleIdx =modAngNum>>1.

To sum up, after determining the weighted prediction angle of the current block and the weighted prediction position of the current block, a coder-side may, based on the weighted prediction angle and the weighted prediction position, determine the value of AwpIdx, as shown in Table 1. When the coder-side transmits a coded bit stream to a decoder-side, the coded bit stream may carry the value of AwpIdx. In this way, the decoder-side may obtain the value of AwpIdx and then obtain stepIdx, angleIdx and subAngleIdx based on AwpIdx.

Illustratively, based on angleIdx and subAngleIdx, one weighted prediction angle can be uniquely determined as shown in Table 2. The weighted prediction angle may also be determined in another way, for example, by changing a partition number and so on.

TABLE 2

| Angle Index | Angle Area | Log2 Logarithmic Value of the Absolute |
|---|---|---|
| modAngNum | subAngleIdx | Value of the Slope of the Weighted Prediction Angle angleIdx |
| 0 | 0 | 0 |
| 1 | 0 | 1 |
| 2 | 1 | Horizontal, and thus configure a maximum value to make the value of ((x << 1) >> angleidx) to be 0 |
| 3 | 1 | 1 |
| 4 | 2 | 0 |

TABLE 2-continued

| Angle Index | Angle Area | Log2 Logarithmic Value of the Absolute |
|---|---|---|
| 5 | 2 | 1 |
| 6 | 3 | Vertical, and thus configure a maximum value to make the value of ((y << 1) >> angleidx) to be 0 |
| 7 | 3 | 1 |

At step a2, based on stepIdx, angleIdx and subAngleIdx, reference weight values are configured to surrounding positions outside the current block. The step a2 includes the following circumstances.

Circumstance 1: if subAngleIdx is 0, that is, the weighted prediction angle is in the angle area 0, for example, the weighted prediction angle is the weighted prediction angle 0 or the weighted prediction angle 1, a weight transform start position FirstPos may be determined in a following formula: FirstPos=(ValidLength_H>>1)−6+DeltaPos_H. Then, the reference weight values of the surrounding positions outside the current block may be determined in a following formula: ReferenceWeights[x]=Clip3(0, 8, x−FirstPos). In this formula, descriptions are made with a minimum value of the reference weight values being 0, a maximum value of the reference weight values being 8 and a weight transform rate being 1 as an example, that is, the above formula may be equivalent to ReferenceWeights[x]=Clip3(minimum, maximum, a*(x−FirstPos)), where x may refer to an index of one of the surrounding positions outside the current block, x ranges between 0 and ValidLength_H−1 and "a" represents a weight transform rate.

In the above formula. ValidLength H may represent a number of the surrounding positions outside the current block (e.g., a valid number, also called a valid length). When subAngleIdx is 0, surrounding positions outside the current block pointed by the weighted prediction angle may be surrounding positions at a left one column. Therefore, the valid number is denoted as ValidLength_H. Illustratively, the valid number ValidLength_H may be determined in a following formula: ValidLength_H=(N+(M>>angleIdx))<<1, the shift left by one bit is because the formula adopts ½-pel precision. If 1-pel precision is used, the formula is: ValidLength_H=(N+(M>>angleIdx)). If ¼-pel precision is adopted, the formula is: ValidLength_H=(N+(M>>angleIdx))<<2. If it adopts an accuracy of 2-pel, ValidLength_H =(N+(M>>angleIdx))>>1. Other pixel precision are made in the same way, and no redundant descriptions are made herein. In subsequent formulas, the operations involved >>1 may change for different pixel precision.

In the above formula, DeltaPos_H represents a position variation parameter (e.g., an intermediate parameter). When subAngleIdx is 0, the surrounding positions outside the current block pointed by the weighted prediction angle may be surrounding positions at the left one column outside the current block. Therefore, the position variation parameter is denoted as DeltaPos_H. Illustratively, DeltaPos_H is determined in a following formula: DeltaPos_H=stepIdx*((ValidLength_H>>3)−1).

Circumstance 2: if subAngleIdx is 1, that is, the weighted prediction angle is in the angle area 1, for example, the weighted prediction angle is the weighted prediction angle 2 or the weighted prediction angle 3, a weight transform start position FirstPos may be determined in a following formula: FirstPos=(ValidLength_H>>1)−4+DeltaPos_H−((M<<1)>>angleIdx). Then, the reference weight values of the surrounding positions outside the current block may be determined by a following formula: ReferenceWeights[x]=Clip3(0, 8, a *(x−FirstPos)). In the formula, descriptions are made with a minimum value of the reference weight values being 0, a maximum value of the reference weight values being 8 and a weight transform rate being "a" as an example, x may represent an index of the surrounding positions outside the current block, and x ranges from 0 to ValidLength_H−1.

In the above formula, ValidLength_H and DeltaPos_H can be referred to the circumstance 1 and will not be repeated herein.

Circumstance 3: if subAngleIdx is 2, that is, the weighted prediction angle is in the angle area 2, for example, the weighted prediction angle is the weighted prediction angle 4 or the weighted prediction angle 5, a weight transform start position FirstPos may be determined in a following formula: FirstPos=(ValidLength_W>>1)−4+DeltaPos_W−((N<<1)>>angleIdx). Then, the reference weight values of the surrounding positions outside the current block may be determined by a following formula: ReferenceWeights[x]=Clip3(0, 8, a*(x−FirstPos)). In the formula, descriptions are made with a minimum value of the reference weight values being 0, a maximum value of the reference weight values being 8 and a weight transform rate being "a" as an example, x may represent an index of the surrounding positions outside the current block, and x ranges from 0 to ValidLength_W−1.

In the above formula, ValidLength_W represents a number of the surrounding positions outside the current block (e.g., a valid number, also called a valid length). When subAngleIdx is 2, surrounding positions outside the current block pointed by the weighted prediction angle may be surrounding positions at an upper one row. Therefore, the valid number is denoted as ValidLength_W. Illustratively, the valid number ValidLength_W may be determined in a following formula: ValidLength_W=(M+(N>>angleIdx))<<1.

In the above formula, DeltaPos_W represents a position variation parameter (e.g., an intermediate parameter). When subAngleIdx is 2, the surrounding positions outside the current block pointed by the weighted prediction angle may be surrounding positions at the upper one row outside the current block. Therefore, the position variation parameter is denoted as DeltaPos_W. Illustratively, DeltaPos_W is determined in a following formula: DeltaPos_W=stepIdx*((ValidLength_W>>3)−1).

Circumstance 4: if subAngleIdx is 3, that is, the weighted prediction angle is in the angle area 3, for example, the weighted prediction angle is the weighted prediction angle 6 or the weighted prediction angle 7, a weight transform start position FirstPos may be determined in a following formula: FirstPos=(ValidLength_W>>1)−6+DeltaPos_W. Then, the reference weight values of the surrounding positions outside the current block may be determined in a following formula: ReferenceWeights[x]=Clip3(0, 8, a*(x−FirstPos)). In the formula, descriptions are made with a minimum value of the reference weight values being 0, a maximum value of the reference weight values being 8 and a weight transform rate being "a" as an example, x may represent an index of the surrounding positions outside the current block, and x ranges between 0 and ValidLength_W−1.

In the above formula, ValidLength_W and DeltaPos_W can be referred to the circumstance 3 and will not be repeated herein.

To sum up, which circumstance is to be used may be determined based on subAngleIdx, for example, in the circumstances 1 and 2, ValidLength_H and DeltaPos_H are determined based on angleIdx and stepIdx, and FirstPos is determined based on ValidLength_H and DeltaPos_H, and then, the reference weight values are configured based on FirstPos. In the circumstances 3 and 4, ValidLength_W and DeltaPos_W are determined based on angleIdx and stepIdx, and FirstPos is determined based on ValidLength_W and DeltaPos_W, and then, the reference weight values are configured based on FirstPos.

Figure 7C:
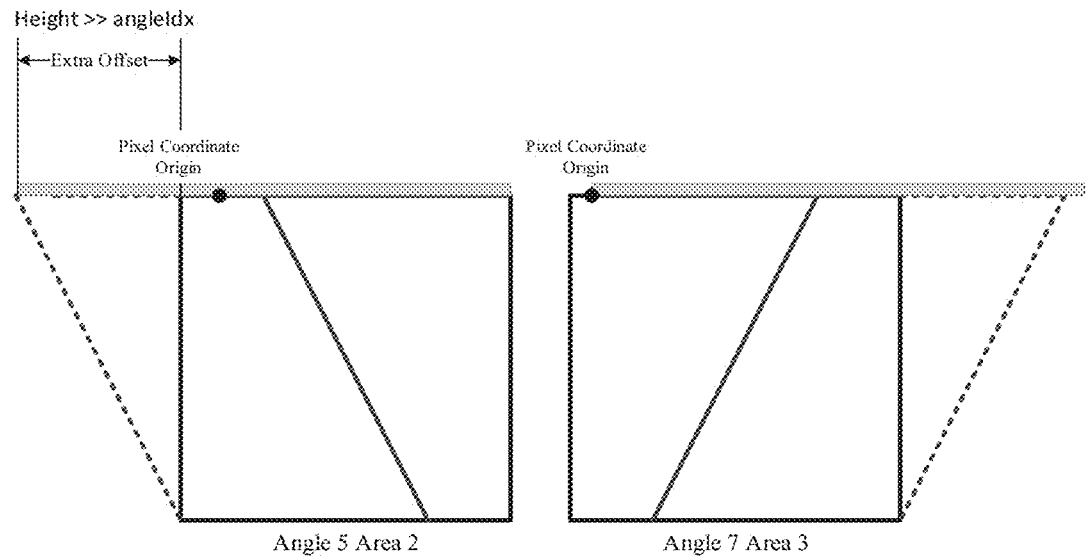

The formulas of the above circumstances differ in that: when an upper left corner of the current block is used as a coordinate origin, a start position of the reference weight value ReferenceWeights[x] changes. For example, as shown in FIG. 7C, examples of the angle area 2 and the angle area 3 are shown. When ½-pel precision is adopted, a start position of the reference weight value ReferenceWeights[x] is (height<<1)>>angleIdx, i.e., the offset in the formula is "−((N<<1)>>angleIdx)". The angle area 0 and the angle area 1 are implemented in a similar way except that the offset in the formula is "−((M<<1)>>angleIdx)", i.e., the height is changed to a width.

At step a3, a luma weight value of the pixel position is obtained based on angleIdx and the reference weight value ReferenceWeight[x].

Circumstance 1: if subAngleIdx is 0, a luma weight value of a pixel position (x, y) may be determined in a following formula: AwpWeightArrayY[x][y]=ReferenceWeights[(y<<1)+((x<<1)>>angleIdx)], where (y<<1)+((x<<1)>>angleIdx) represents a surrounding position pointed by the pixel position (x, y), ReferenceWeights[(y<<1)+((x<<1)>>angleIdx)] represents a reference weight value of the surrounding position. A value range of x is from 0 to M−1 and a value range of y is from 0 to N−1.

Circumstance 2: if subAngleIdx is 1, a luma weight value of the pixel position (x, y) may be determined in a following formula: AwpWeightArrayY[x][y]=ReferenceWeights[(y<<1)−((x<<1)>>angleIdx)], where (y<<1)−((x<<1)>>angleIdx) represents a surrounding position pointed by the pixel position (x, y), ReferenceWeights[(v<<1)−((x<<1)>>angleIdx)] represents a reference weight value of the surrounding position. A value range of x is from 0 to M−1 and a value range of y is from 0 to N−1.

Circumstance 3: if subAngleIdx is 2, a luma weight value of a pixel position (x, y) may be determined in a following formula: AwpWeightArrayY[x][y]=ReferenceWeights[(x<<1)−((y<<1)>>angleIdx)], where (x<<1)−((y<<1)>>angleIdx) represents a surrounding position pointed by the pixel position (x, y), ReferenceWeights[(x<<1)−((y<<1)>>angleIdx)] represents a reference weight value of the surrounding position. A value range of x is from 0 to M−1 and a value range of y is from 0 to N−1.

Circumstance 4: if subAngleIdx is 3, a luma weight value of a pixel position (x, y) may be determined in a following formula: AwpWeightArrayY[x][y]=ReferenceWeights[(x<<1)+((y<<1)>>angleIdx)], where (x<<1)+((y<<1)>>angleIdx) represents a surrounding position pointed by the pixel position (x, y), ReferenceWeights[(x<<1)+((y<<1)>>angleIdx)]represents a reference weight value of the surrounding position. A value range of x is from 0 to M−1 and a value range of y is from 0 to N−1.

The above steps a2 and a3 can be combined as one step. For example, step a2 (configuring the reference weight value for the surrounding positions outside the current block according to stepIdx, angleIdx and subAngleIdx) and step a3 (obtaining the luma weight value according to angleIdx and the reference weight value ReferenceWeight[x]) are combined as follows: obtaining the luma weight value of the pixel position according to stepIdx, angleIdx and subAngleIdx, i.e., determined based on coordinate values of surrounding positions and coordinate values of the weight transform start position.

With the circumstance 1 as an example, if subAngleIdx is 0, that is, the weighted prediction angle is in the angle area 0, for example, the weighted prediction angle is the weighted prediction angle 0 or the weighted prediction angle 1, the weight transform start position FirstPos may be determined in a following formula: FirstPos=(ValidLengthH>>1)
 6+DeltaPos_H. Then, the luma weight value of the pixel position (x, y) is determined in a following formula; AwpWeightArrayY[x][y]=Clip3(0, 8, (v<<1)+((x<<1)>>angleIdx)−FirstPos), where (y<<1)+((x<<1)>>angleIdx) represents a surrounding matching position pointed by the pixel position (x, y). Other circumstances are similar.

At step a4, a chroma weight value of the pixel position is obtained based on the luma weight value of the pixel position, and the luma weight value of the pixel position and the chroma weight value of the pixel position can form a target weight value of the pixel position.

For example, if a format of a chroma resolution is 4:2:0, the chroma weight value of the pixel position (x, y) is determined in a following formula: AwpWeightArrayUV[x][y]=AwpWeightArrayY[x<<1][y<<11. For another example, if the format of the chroma resolution is 4:4:4, the chroma weight value of the pixel position (x, y) is determined in a following formula: AwpWeightArrayUV[x][y]=AwpWeightArrayY[x][y]. A value range of x is from 0 to M/2−1 and a value range of y is from 0 to N/2−1.

The step a4 can be implemented in another manner: instead of obtaining the chroma weight value based on the luma weight value, the chroma weight value of the pixel position is obtained based on angleIdx and the reference weight value ReferenceWeight[x]. For example, if the format of the chroma resolution is 4:2:0, the chroma weight value of the pixel position may be obtained based on angleIdx and the reference weight value ReferenceWeight [x].

For example, if subAngleIdx is 0, the chroma weight value of the pixel position (x, y) is determined in a following formula: AwpWeightArrayUV[x][y]=ReferenceWeights [(y<<2) +((x<<2)>>angleIdx)].

For example, if subAngleIdx is 1, the chroma weight value of the pixel position (x, y) is determined in a following formula: AwpWeightArrayUV [x][y]=ReferenceWeights [(y<<2) ((x<<2)>>angleIdx)].

For example, if subAngleIdx is 2, the chroma weight value of the pixel position (x, y) is determined in a following formula: AwpWeightArrayUV [x][y]=ReferenceWeights [(x<<2) (y<<2)>>angleIdx)].

For example, if subAngleIdx is 3, the chroma weight value of the pixel position (x, y) is determined in a following formula: AwpWeightArrayUV[x][y]=ReferenceWeights [(x<<2) +((y<<2)>>angleIdx)].

In the above formulas, a value range of x is from 0 to M−1 and a value range of y is from 0 to N−1.

Figure 7D:
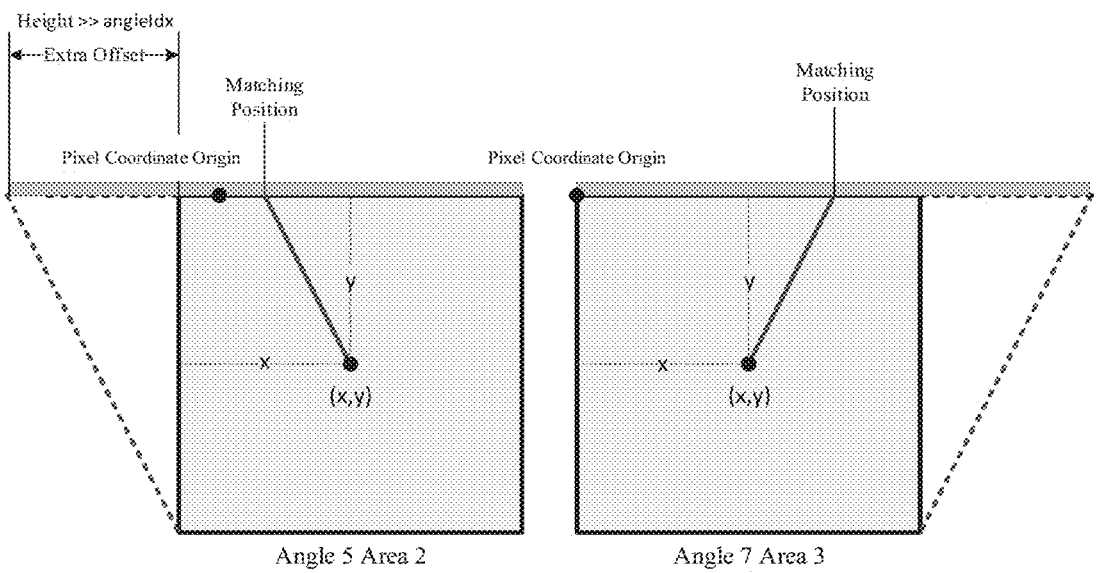

In the steps a3 and a4, the formulas of the circumstances differ in the following. As shown in FIG. 7D, examples of the angle area 2 and the angle area 3 are shown. When the upper left corner of the current block is taken as the coordinate origin, a calculation formula of a matching position of (x, y) in the angle area 2 may be x−y>>angleIdx, and the calculation formula of the matching position of (x, y) in the angle area 3 may be x+y>>angleIdx. When the ½-pel precision is adopted, the calculation formula of the matching position of (x, y) in the angle area 2 may be (x<<1)−(y<<1)>>angleIdx, and the calculation formula of the matching position of (x, y) in the angle area 3 may be (x<<1)+(y<<1)>>angleIdx. The angle area 0 and the angle area 1 can be implemented in a similar way except that the positions of (x, y) are exchanged.

Embodiment 8. In Embodiments 1 to 3, the coder-side/decoder-side expects to obtain a weight transform rate of the current block. If the current block supports a weight transform rate switching mode, the weight transform rate of the current block is obtained in the following manner: obtaining first weight transform rate indication information on the current block, and determining the weight transform rate of the current block based on the first weight transform rate indication information. Illustratively, if the first weight transform rate indication information is first indication information, the weight transform rate of the current block is a first weight transformation rate; and if the first weight transformation rate indication information is second indication information, the weight transform rate of the current block is a second weight transform rate. If the current block does not support the weight transform rate switching mode, a preset weight transform rate is determined as the weight transform rate of the current block. The first weight transform rate indication information can be obtained from an LCU, a slice, a picture, a sequence or the like where the current block is located. Illustratively, the first weight transform rate indication information may be picture level indication information, such as PPS level, PH level indication information.

In summary, if the current block supports the weight transform rate switching mode, the weight transform rate of the current block may be either the first weight transform rate or the second weight transform rate, and the first weight transform rate is different from the second weight transform rate. In this way, the weight transform rate of the current block is variable, so that the weight transform rate can be switched adaptively instead of using a uniform weight transform rate.

Illustratively, if switching control information allows the current block to enable the weight transform rate switching mode, the current block supports the weight transform rate switching mode, and if the switching control information does not allow the current block to enable the weight transform rate switching mode, the current block does not support the weight transform rate switching mode. The switching control information may include, but is not limited to, sequence level switching control information, picture level switching control information. Slice level switching control information, Tile level switching control information, Patch level switching control information, CTU level switching control information, LCU level switching control information, block level switching control information. CU level switching control information, PU level switching control information, and so on.

The coder-side can be informed of the switching control information and whether the switching control information allows the current block to enable the weight transform rate switching mode, and then determines whether the current block supports the weight transform rate switching mode. The coder-side can encode the switching control information into a bit stream. Thus, the decoder-side can parse the switching control information from the bit stream, be informed whether the switching control information allows the current block to enable the weight transform rate switching mode, and then determine whether the current block supports the weight transform rate switching mode. Instead of encoding the switching control information into the bit stream by the coder-side, the decoder-side can implicitly derive the switching control information to know whether the switching control information allows the current block to enable the weight transform rate switching mode, and then determine whether the current block supports the weight transform rate switching mode.

Take sequence level switching control information as an example, the sequence level switching control information can be awp_adptive_flag (an inter-frame angle weighted prediction adaptation flag bit). If awp_adptive_flag is a first amount, it means that the sequence level switching control information allows the current sequence to enable the weight transform rate switching mode, thus allowing the current block to enable the weight transform rate switching mode. If awp_adptive_flag is a second amount, it means that the sequence level switching control information does not allow the current sequence to enable the weight transform rate switching mode, and thus does not allow the current block to enable the weight transform rate switching mode. Illustratively, the first amount is 1 and the second amount is 0, or, the first amount is 0 and the second amount is 1. The above are just examples of the first amount and the second amount, and there are no limitations on these. For other types of switching control information, the implementation processes are similar to that of the sequence level switching control information and will not be repeated here.

In a possible implementation, the first weight transform rate indication information on the current block may be SCC (Screen Content Coding) identification corresponding to the current block, the first indication information is for indicating that the current block belongs to the Screen Content Coding. and the second indication information is for indicating that the current block belongs to the non-Screen Content Coding. On this basis, SCC identification corresponding to the current block can be obtained, and the weight transform rate of the current block can be determined based on the SCC identification. For example, if the SCC identification is for indicating that the current block belongs to the SCC, the weight transform rate of the current block is the first weight transform rate; and if the SCC identification is for indicating that the current block belongs to the non-SCC, the weight transform rate of the current block is the second weight transform rate.

Illustratively, an absolute value of the first weight transform rate may be greater than an absolute value of the second weight transform rate. For example, the absolute value of the first weight transform rate may be 4 and the absolute value of the second weight transform rate may be 1 or 2. For another example, the absolute value of the first weight transform rate may be 2 and the absolute value of the second weight transform rate may be 1. For another example, the absolute value of the first weight transform rate may be 8 and the absolute value of the second weight transform rate may be 1 or 2 or 4. For another example, the absolute value of the first weight transform rate may be 8 or 4, and the absolute value of the second weight transform rate may be 1 or 2. The above are only examples and there is no limitation on this, as long as the absolute value of the first weight transform rate is greater than the absolute value of the second weight transform rate.

Illustratively, SCC identification may include but not limited to: sequence level SCC identification, picture level SCC identification, Slice level SCC identification, Tile level SCC identification, Patch level SCC identification, CTU level SCC identification, LCU level SCC identification, block level SCC identification, CU level SCC identification, PU level SCC identification, and so on, for which there is no limitation. For example, the sequence level SCC identification corresponding to the current block can be determined as the SCC identification corresponding to the current block, or, the picture level SCC identification corresponding to the current block can be determined as the SCC identification corresponding to the current block, and so on, as long as the SCC identification corresponding to the current block can be obtained.

Illustratively, the coder-side can determine whether the current block belongs to the SCC or to the non-SCC. If the current block belongs to the SCC, the coder-side determines the weight transform rate of the current block as the first weight transform rate. If the current block belongs to the non-SCC, the coder-side determines the weight transform rate of the current block as the second weight transform rate. Optionally, for the coder-side, the SCC identification corresponding to the current block may be obtained, and if the SCC identification is for indicating that the current block belongs to the SCC, the coder-side determines the weight transform rate of the current block as the first weight transform rate. If the SCC identification is for indicating that the current block belongs to the non-SCC, the coder-side determines the weight transform rate of the current block as the second weight transform rate.

The coder-side can encode the SCC identification (e.g., sequence level SCC identification, picture level SCC identification, Slice level SCC identification, and so on) into a bit stream. Thus, the decoder-side can parse the SCC identification from the bit stream and determine the SCC identification as the SCC identification corresponding to the current block, for example, the sequence level SCC identification corresponding to the current block can be determined as the SCC identification corresponding to the current block. To sum up, the decoder-side can be informed of the SCC identification corresponding to the current block. If the SCC identification is for indicating that the current block belongs to the SCC, the decoder-side determines the weight transform rate of the current block as the first weight transform rate. If the SCC identification is for indicating that the current block belongs to the non-SCC, the decoder-side determines the weight transform rate of the current block as the second weight transform rate. For example, if the SCC identification is a first amount, it is for indicating that the current block belongs to the SCC, and if the SCC identification is a second amount, it is for indicating that the current block belongs to the non-SCC. The first amount is 1 and the second amount is 0, or, the first amount is 0 and the second amount is 1. The above are just examples of the first amount and the second amount, and there are no limitations on these.

Instead of encoding the SCC identification into the bit stream, the coder-side can implicitly derive the SCC identification using same information as the decoder-side. In this way, the decoder-side can also implicitly derive the SCC identification and determine the SCC identification as the SCC identification corresponding to the current block. For example, if multiple consecutive pictures all are used the SCC, a current picture using the SCC can be derived, so the decoder-side implicitly derives the picture level SCC identification and determines the SCC identification as the SCC identification corresponding to the current block, and the SCC identification is for indicating that the current block belongs to the SCC. For example, if multiple consecutive pictures all are used the non-SCC, a current picture is the non-SCC can be derived, so the decoder-side implicitly derives the picture level SCC identification and the SCC identification is for indicating that the current block belongs to the non-SCC. For example, if an IBC mode share of all selected modes in the current picture is less than a certain percentage, a next picture is determined to be the non-SCC, otherwise, the next picture is determined to be the SCC. The above methods are only examples of implicitly deriving the SCC identification, and there is no limitation on the implicit derivation methods. To sum up, the decoder-side can obtain the SCC identification corresponding to the current block. If the SCC identification is for indicating that the current block belongs to the Screen Content Coding, the decoder-side determines the weight transform rate of the current block as the first weight transform rate. If the SCC identification is for indicating that the current block belongs to the non-Screen Content Coding, the decoder-side determines the weight transform rate of the current block as the second weight transform rate. For example, if the SCC identification is a first amount, it is for indicating that the current block belongs to the SCC, and if the SCC identification is a second amount, it is for indicating that the current block belongs to the non-SCC.

In summary, the weight transform rate of the current block may be the first weight transform rate or the second weight transform rate. That is, the weight transform rate of the current block may be switched, and the switching of the weight transform rate depends on explicit SCC identification or the implicit SCC identification of a certain level. The explicit SCC identification means that the scc_flag (SCC identification) is coded into the bit stream, so that the decoder-side parses the SCC identification from the bit stream, and the implicit SCC identification means that the decoder-side adaptively derives the SCC identification based on information that is available to the decoder-side.

The SCC identification of a certain level includes: sequence level SCC identification for indicating a current sequence, which is used as the SCC identification of all blocks belonging to the current sequence; picture level SCC identification for indicating a current picture, which is used as the SCC identification of all blocks belonging to the current picture; Slice level SCC identification for indicating a current Slice, which is used as the SCC identification of all blocks belonging to the current Slice; Tile level SCC identification for indicating a current Tile, which is used as the SCC identification of all blocks belonging to the current Tile; Patch level SCC identification for indicating a current Patch, which is used as the SCC identification of all blocks belonging to the current Patch; CTU level SCC identification for indicating a current CTU, which is used as the SCC identification of all blocks belonging to the current CTU; LCU level SCC identification for indicating a current LCU, which is used as the SCC identification of all blocks belonging to the current LCU; block level SCC identification for indicating a current block, which is used as the SCC identification of all blocks belonging to the current block; CU level SCC identification for indicating a current CU, which is used as the SCC identification belonging to the current CU; and PU level SCC identification for indicating a current PU, which is used as the SCC identification belonging to the current PU.

Illustratively, the second weight transform rate may be used as a default weight transform rate, and there is no need to switch the weight transform rate when the SCC identification is for indicating that the current block belongs to the non-SCC, that is, the weight transform rate of the current block is determined to be the second weight transform rate. When the SCC identification is for indicating that the current block belongs to the SCC, the weight transform rate is expected to be switched, that is, the weight transform rate of the current block is determined to be the first weight transform rate. Optionally, the first weight transform rate may be used as the default weight transform rate, and the weight transform rate is expected to be switched when the SCC identification is for indicating that the current block belongs to the non-SCC, that is, the weight transform rate of the current block is determined to be the second weight transform rate. When the SCC identification is for indicating that the current block belongs to the SCC, there is no need to switch the weight transform rate, that is, the weight transform rate of the current block is determined to be the first weight transform rate.

Figure 8A:
FIG. 8A and FIG. 8B are schematic diagrams of SCC sequence and natural sequence.
Figure 8B:
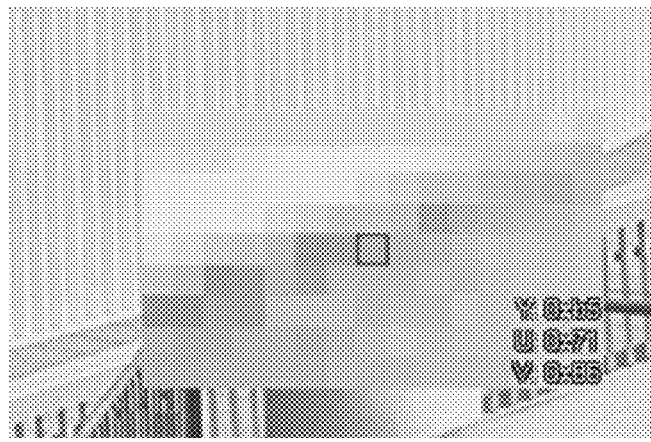

Illustratively, as shown in FIG. 8A, a schematic diagram of a SCC sequence (e.g., a sequence belonging to the SCC) is illustrated. As shown in FIG. 8B, a schematic diagram of a natural sequence (e.g., a sequence belonging to the non-SCC) is illustrated. For SCC sequences, a color change is completed after one pixel, while for natural sequences, the color change takes a transition of several pixels. To sum up, it can be seen that SCC sequences usually have features such as consistent color in large areas and fast color change, and a weighted prediction for the SCC sequences should also adapt to such features. Therefore, a weight value of the AWP mode should reduce features of smooth transition, that is, the weight transform rate should be increased to adapt to the features of the SCC sequences. In summary, when the current block belongs to the SCC, the weight transform rate of the current block is the first weight transform rate, and when the current block belongs to the non-SCC, the weight transform rate of the current block is the second weight transform rate, where the absolute value of the first weight transform rate is greater than the absolute value of the second weight transform rate. For example, the absolute value of the first weight transform rate is 4 and the absolute value of the second weight transform rate is 1. In this way, it increases the absolute value of the weight transform rate of the current block belonging to the SCC sequence, that is, it increases a transform speed. For example, a performance gain (e.g., BD-rate performance gain) of an actual test for a SCC sequence is shown in Table 3, where the performance gain when the weight transform rate is switched from 1 to 4 is represented. As shown in Table 3, for a Y channel component of a SCC sequence 1, a −1.83% BD-rate performance gain can be obtained when the weight transform rate is switched from 1 to 4, which is equivalent to, under same objective quality conditions, a code rate can be reduced by 1.83% when the weight transform rate is switched. For a U channel component of the SCC sequence 1, the code rate can be reduced by 1.19% when the weight transform rate is switched from 1 to 4, and for a V channel component of the SCC sequence 1, the code rate can be reduced by 1.05% when the weight transform rate is switched from 1 to 4. When the weight transform rate is switched from 1 to 4, coding complexity of the coder-side remains unchanged and decoding complexity of the decoder-side increases to 101%. For other SCC sequences, the code rate can also be reduced when the weight transform rate is switched from 1 to 4. In summary, the performance gain can be increased.

TABLE 3

| | CHANGE_RATIO (BD-rate performance gain) | | | Time (Complexity) | |
|---|---|---|---|---|---|
| | Y channel component | U channel component | V channel component | Coding Complexity | Decoding Complexity |
| SCC Sequence 1 | −1.83% | −1.19% | −1.05% | 100% | 101% |
| SCC Sequence 2 | −5.12% | −5.27% | −5.18% | 98% | 97% |
| SCC Sequence 3 | −3.32% | −2.73% | −2.74% | 99% | 100% |
| SCC Sequence 4 | −1.23% | −0.91% | −0.70% | 100% | 100% |
| SCC Sequence 5 | −0.52% | −0.50% | −0.60% | 100% | 100% |
| SCC Sequence 6 | −1.57% | −1.50% | −1.33% | 99% | 101% |
| SCC Sequence 7 | −0.69% | −0.32% | −0.21% | 100% | 99% |

In another possible implementation, the first weight transform rate indication information on the current block may be weight transform rate switching identification corresponding to the current block, where the first indication information is for indicating that the current block does not require a weight transform rate switching, and the second indication information is for indicating that the current block requires the weight transform rate switching. On this basis, the weight transform rate switching identification corresponding to the current block can be obtained, and the weight transform rate of the current block can be determined according to the weight transform rate switching identification. For example, if the weight transform rate switching identification is for indicating that the current block does not require the weight transform rate switching, the weight transform rate of the current block may be the first weight transform rate. If the weight transform rate switching identification is for indicating that the current block requires the weight transform rate switching, the weight transform rate of the current block may be the second weight transform rate. The absolute value of the first weight transform rate is not equal to the absolute value of the second weight transform rate. For example, the absolute value of the first weight transform rate may be greater than the absolute value of the second weight transform rate. For example, the absolute value of the first weight transform rate may be 4 and the absolute value of the second weight transform rate may be 1 or 2. Or, the absolute value of the first weight transform rate may be 2 and the absolute value of the second weight transform rate is 1. Or, the absolute value of the first weight transform rate may be 8 and the absolute value of the second weight transform rate may be 1 or 2 or 4. For another example, the absolute value of the first weight transform rate may be smaller than the absolute value of the second weight transform rate. For example, the absolute value of the first weight transform rate may be 1 and the absolute value of the second weight transform rate may be 2 or 4 or 8. Or, the absolute value of the first weight transform rate may be 2 and the absolute value of the second weight transform rate may be 4 or 8. Or, the absolute value of the first weight transform rate may be 4 and the absolute value of the second weight transform rate may be 8. The above are only examples and there is no limitation on this, as long as the absolute value of the first weight transform rate is not equal to the absolute value of the second weight transform rate.

Illustratively, the weight transform rate switching identification may include, but is not limited to, sequence level weight transform rate switching identification, picture level weight transform rate switching identification, Slice level weight transform rate switching identification, Tile level weight transform rate switching identification. Patch level weight transform rate switching identification. CTU level weight transform rate switching identification, LCU level weight transform rate switching identification, block level weight transform rate switching identification, CU level weight transform rate switching identification, PU level weight transform rate switching identification, and so on, which are not limited.

For example, the sequence level weight transform rate switching identification corresponding to the current block can be determined as the weight transform rate switching identification corresponding to the current block, or, the picture level weight transform rate switching identification corresponding to the current block can be determined as the weight transform rate switching identification corresponding to the current block, and so on, as long as the weight transform rate switching identification corresponding to the current block can be obtained.

Illustratively, the first weight transform rate can be used as a default weight transform rate, and the coder-side can be informed whether the current block requires the weight transform rate switching. If the current block does not require the weight transform rate switching, the coder-side determines the weight transform rate of the current block as the first weight transform rate. If the current block requires the weight transform rate switching, the coder-side determines the weight transform rate of the current block as the second weight transform rate. Optionally, for the coder-side, the weight transform rate switching identification corresponding to the current block may be informed, and if the weight transform rate switching identification is for indicating that the current block does not require the weight transform rate switching, the coder-side may determine that the weight transform rate of the current block is the first weight transform rate. If the weight transform rate switching identification is for indicating that the current block requires the weight transform rate switching, the coder-side determines that the weight transform rate of the current block is the second weight transform rate.

For example, the coder-side determines an RDO cost value 1 corresponding to the first weight transform rate and an RDO cost value 2 corresponding to the second weight transform rate. If the RDO cost value 1 is less than the RDO cost value 2, the coder-side determines the current block not requiring the weight transform rate switching, and if the RDO cost value 2 is less than the RDO cost value 1, the coder-side determines the current block requiring the weight transform rate switching.

The coder-side can encode the weight transform rate switching identification (e.g., sequence level weight transform rate switching identification, and so on) into a bit stream, causing the decoder-side to parse the weight transform rate switching identification from the bit stream and determine this weight transform rate switching identification as the weight transform rate switching identification corresponding to the current block. In summary, the decoder-side can be informed of the weight transform rate switching identification corresponding to the current block. If this weight transform rate switching identification is for indicating that the current block does not require the weight transform rate switching, the decoder-side determines the weight transform rate of the current block as the first weight transform rate. If the weight transform rate switching identification is for indicating that the current block requires the weight transform rate switching, the decoder-side determines that the weight transform rate of the current block is the second weight transform rate. For example, if the weight transform rate switching identification is a first amount, it indicates that the current block does not require the weight transform rate switching, and if the weight transform rate switching identification is a second amount, it indicates that the current block requires the weight transform rate switching. The first amount is 1 and the second amount is 0, or, the first amount is 0 and the second amount is 1. The above are just examples of the first amount and the second amount, and there are no limitations on this.

Instead of encoding the weight transform rate switching identification into the bit stream by the coder-side, the decoder-side may implicitly derive the weight transform rate switching identification and determine this weight transform rate switching identification as the weight transform rate switching identification corresponding to the current block. For example, if multiple consecutive blocks all require the weight transform rate switching, the current block may also require the weight transform rate switching. Thus, the decoder-side implicitly derives the weight transform rate switching identification, and determines the weight transform rate switching identification as the weight transform rate switching identification corresponding to the current block, and the weight transform rate switching identification indicates that the current block requires the weight transform rate switching. If multiple consecutive blocks all do not require the weight transform rate switching, the current block also may not require the weight transform rate switching. Thus, the decoder-side implicitly derives the weight transform rate switching identification, and the weight transform rate switching identification indicates that the current block does not require the weight transform rate switching. The above methods are only examples of implicitly deriving the weight transform rate switching identification, and there is no limitation on the derivation methods. In summary, the decoder-side can be informed of the weight transform rate switching identification corresponding to the current block. If the weight transform rate switching identification indicates that the current block does not require the weight transform rate switching, the weight transform rate of the current block is determined as the first weight transform rate. If the weight transform rate switching identification indicates that the current block requires the weight transform rate switching, the weight transform rate of the current block is determined to be the second weight transform rate.

In summary, the weight transform rate of the current block may be the first weight transform rate or the second weight transform rate, that is, the weight transform rate of the current block can be switched, and the switching of the weight transform rate depends on weight transform rate switching identification (refine_flag) of a certain level. The refine_flag can be explicit identification or implicit identification. The explicit identification means that the refine_flag is coded into the bit stream, causing the decoder-side to parse the refine_flag from the bit stream, and the implicit identification means that the coder-side and the decoder-side adaptively derive the refine_flag based on information that can be obtained.

Illustratively, the refine_flag of a certain level includes: a sequence level refine_flag for indicating a current sequence, which is used as a refine_flag of all blocks belonging to the current sequence; a picture level refine_flag for indicating a current picture, which is used as a refine_flag of all blocks belonging to the current picture; a Slice level refine_flag for indicating a current Slice, which is used as a refine_flag of all blocks belonging to the current Slice; a Tile level refine_flag for indicating a current Tile, which is used as the refine_flag of all blocks belonging to the current Tile; a Patch level refine_flag for indicating a current Patch, which is used as a refine_flag of all blocks belonging to the current Patch; a CTU level refine_flag for indicating a current CTU, which is used as a refine_flag of all blocks belonging to the current CTU; a LCU level refine_flag for indicating a current LCU, which is used as the refine_flag of all blocks belonging to the current LCU; a block level refine_flag for indicating a current block, which is used as the refine_flag of all blocks belonging to the current block; a CU level refine_flag for indicating a current CU, which is used as the refine_flag belonging to the current CU; and a PU level refine_flag for indicating a current PU, which is used as the refine_flag belonging to the current PU. The above are just examples and there is no limitation on this.

Illustratively, the first weight transform rate may be used as a default weight transform rate. When the weight transform rate switching identification is for indicating that the current block does not require a weight transform rate switching, the weight transform rate switching is not performed for the current block, that is, the weight transform rate of the current block is determined as the first weight transform rate. When the weight transform rate switching identification is for indicating that the current block requires a weight transform rate switching, the weight transform rate is switched, that is, the weight transform rate of the current block is determined as the second weight transform rate.

Embodiment 9. In Embodiments 1 to 3, the coder-side/decoder-side expects to obtain a weighted prediction angle and a weighted prediction position of a current block, and in Embodiment 8, a weight transform rate, such as a first weight transform rate or a second weight transform rate, may be obtained. Based on this, the weighted prediction angle and the weighted prediction position of the current block are obtained in the following manners.

In a first manner, the coder-side and the decoder-side agree to take a same weighted prediction angle as the weighted prediction angle of the current block, and agree to take a same weighted prediction position as the weighted prediction position of the current block. For example, the coder-side and the decoder-side both take a weighted prediction angle A as the weighted prediction angle of the current block, and both take a weighted prediction position 4 as the weighted prediction position of the current block.

In a second manner, the coder-side constructs a weighted prediction angle list which may include at least one weighted prediction angle, for example, the weighted prediction angle list may include the weighted prediction angle A and a weighted prediction angle B. The coder-side constructs a weighted prediction position list which may include at least one weighted prediction position, for example, the weighted prediction position list may include the weighted prediction positions 0 to 6. The coder-side traverses each weighted prediction angle in the weighted prediction angle list in sequence and traverses each weighted prediction position in the weighted prediction position list in sequence, that is, traverses a combination of each weighted prediction angle and each weighted prediction position. For each combination of the weighted prediction angle(s) and the weighted prediction position(s), a weighted prediction angle and a weighted prediction position in the combination may be taken as the weighted prediction angle and the weighted prediction position of the current block obtained at step 401, and the steps 402 to 408 are performed based on the weighted prediction angle, the weighted prediction position and a weight transform rate (obtained in Embodiment 8) to obtain a weighted prediction value of the current block.

For example, when the coder-side traverses to the weighted prediction angle A and the weighted prediction position 0, the coder-side performs the steps 402 to 408 based on the weighted prediction angle A and the weighted prediction position 0 to obtain a weighted prediction value A–0 of the current block. When the coder-side traverses to the weighted prediction angle A and the weighted prediction position 1, the steps 402 to 408 are performed based on the weighted prediction angle A and the weighted prediction position 1 to obtain a weighted prediction value A–1 of the current block. When the coder-side traverses to the weighted prediction angle B and the weighted prediction position 0, the steps 402 to 408 are performed based on the weighted prediction angle B and the weighted prediction position 0 to obtain a weighted prediction value B–0 of the current block and so on. The coder-side can obtain a corresponding weighted prediction value based on each combination (each combination of a weighted prediction angle and a weighted prediction position).

After obtaining all weighted prediction values based on the combination of the weighted prediction angle(s) and the weighted prediction position(s), the coder-side may determine a corresponding RDO cost value based on each weighted prediction value in any unlimited manner. The coder-side may obtain the RDO cost value of each combination and select a minimum RDO cost value from all the RDO cost values.

Next, the coder-side takes a weighted prediction angle and a weighted prediction position in the combination corresponding to the minimum RDO cost value as a target weighted prediction angle and a target weighted prediction position respectively, and finally codes an index value of the target weighted prediction angle in the weighted prediction angle list and an index value of the target weighted prediction position in the weighted prediction position list into a bit stream.

The above manners are only illustrative and are not limited herein as long as the weighted prediction angle and the weighted prediction position of the current block can be obtained. For example, one weighted prediction angle may be selected randomly from the weighted prediction angle list as the weighted prediction angle of the current block and one weighted prediction position may be selected randomly from the weighted prediction position list as the weighted prediction position of the current block.

For the decoder-side, the decoder-side constructs a weighted prediction angle list, which is identical to the weighted prediction angle list of the coder-side and includes at least one weighted prediction angle, such as weighted prediction angle A and weighted prediction angle B. The decoder-side constructs a weighted prediction position list, which is identical to the weighted prediction position list of the coder-side and includes at least one weighted prediction position, such as weighted prediction position 0 to weighted prediction position 6. After receiving a coded bit stream of the current block, the decoder-side parses indication information from the coded bit stream, selects a weighted prediction angle from the weighted prediction angle list as the weighted prediction angle of the current block according to the indication information, and selects a weighted prediction position from the weighted prediction position list as the weighted prediction position of the current block according to the indication information.

Application scenario 1: when the coder-side transmits the coded bit stream to the decoder-side, the coded bit stream may include indication information 1 used to indicate both the weighted prediction angle of the current block (i.e., a target weighted prediction angle) and the weighted prediction position of the current block (i.e., a target weighted prediction position). For example, when the indication information 1 is 0, the indication information 1 may indicate a first weighted prediction angle in the weighted prediction angle list and a first weighted prediction position in the weighted prediction position list, when the indication information 1 is 1, the indication information 1 may indicate the first weighted prediction angle in the weighted prediction angle list and a second weighted prediction position in the weighted prediction position list, and so on, there is no limitation on a value of the indication information 1 that is used to indicate which weighted prediction angle and which weighted prediction position, as long as the coder-side and the decoder-side agree on it.

After receiving the coded bit stream, the decoder-side decodes the indication information 1 from the coded bit stream. Based on the indication information 1, the decoder-side may select a weighted prediction angle corresponding to the indication information 1 from the weighted prediction angle list and take the weighted prediction angle as the weighted prediction angle of the current block. Based on the indication information 1, the decoder-side may select a weighted prediction position corresponding to the indication information 1 from the weighted prediction position list and take the weighted prediction position as the weighted prediction position of the current block.

Application scenario 2: when the coder-side transmits a coded bit stream to the decoder-side, the coded bit stream may include indication information 2 and indication information 3. The indication information 2 is for indicating a target weighted prediction angle of the current block, for example, an index value 1 of the target weighted prediction angle in the weighted prediction angle list, where the index value 1 indicates which weighted prediction angle in the weighted prediction angle list is the target weighted prediction angle. The indication information 3 is for indicating the target weighted prediction position of the current block, for example, an index value 2 of the target weighted prediction position in the weighted prediction position list, where the index value 2 indicates which weighted prediction position in the weighted prediction position list is the target weighted prediction position. After receiving the coded bit stream, the decoder-side parses the indication information 2 and the indication information 3 from the coded bit stream. Based on the indication information 2, the decoder-side may select a weighted prediction angle corresponding to the index value 1 from the weighted prediction angle list and take the weighted prediction angle as the weighted prediction angle of the current block. Based on the indication information 3, the decoder-side may select a weighted prediction position corresponding to the index value 2 from the weighted prediction position list and take the weighted prediction position as the weighted prediction position of the current block.

Application scenario 3: the coder-side and the decoder-side may agree on a preferred configuration combination. The preferred configuration combination can be configured according to practical experience, which is not limited herein. For example, they may agree on a preferred configuration combination 1 including a weighted prediction angle A and a weighted prediction position 4, a preferred configuration combination 2 including a weighted prediction angle B and a weighted prediction position 4, or the like.

After determining the target weighted prediction angle and the target weighted prediction position of the current block, the coder-side determines whether the combination of the target weighted prediction angle and the target weighted prediction position belongs to the preferred configuration combination. If the combination is the preferred configuration combination, when the coder-side transmits a coded bit stream to the decoder-side, the coded bit stream may include indication information 4 and indication information 5. The indication information 4 is for indicating whether the preferred configuration combination is used for the current block. For example, when the indication information 4 is a first amount (e.g., 0), the indication information 4 indicates that the preferred configuration combination is used for the current block. The indication information 5 indicates which preferred configuration combination is used for the current block. For example, when a value of the indication information 5 is 0, the indication information 5 may indicate that a preferred configuration combination 1 is used for the current block, and when the value of the indication information 5 is 1, the indication information 5 may indicate that a preferred configuration combination 2 is used for the current block.

After receiving the coded bit stream, the decoder-side may parse the indication information 4 and the indication information 5 from the coded bit stream. Based on the indication information 4, the decoder-side may determine whether the preferred configuration combination is used for the current block. If the indication information 4 is the first amount, the decoder-side determines that the preferred configuration combination is used for the current block. When the preferred configuration combination is used for the current block, the decoder-side may determine which preferred configuration combination is used for the current block based on the indication information 5. For example, when the value of the indication information 5 is 0, the decoder-side may determine that the preferred configuration combination 1 is used for the current block, such as the weighted prediction angle of the current block is the weighted prediction angle A, and the weighted prediction position of the current block is the weighted prediction position 4. For another example, when the value of the indication information 5 is 1, the decoder-side may determine that the preferred configuration combination 2 is used for the current block, such as the weighted prediction angle of the current block is the weighted prediction angle B and the weighted prediction position of the current block is the weighted prediction position 4.

Illustratively, if the coder-side and the decoder-side only agree on one preferred configuration combination, for example, the preferred configuration combination including the weighted prediction angle A and the weighted prediction position 4, the coded bit stream may only include the indication information 4 without the indication information 5, where the indication information 4 is for indicating the preferred configuration combination is used for the current block. After the decoder-side parses the indication information 4 from the coded bit stream, if the indication information 4 is the first amount, the decoder-side determines that the preferred configuration combination is used for the current block. Based on this preferred combination, the decoder-side determines that the weighted prediction angle of the current block is the weighted prediction angle A and the weighted prediction position of the current block is the weighted prediction position 4.

Application scenario 4: the coder-side and the decoder-side may agree on a preferred configuration combination.

After determining the target weighted prediction angle and the target weighted prediction position of the current block, the coder-side may determine whether the combination of the target weighted prediction angle and the target weighted prediction position belongs to the preferred configuration combination. If it does not belong to the preferred configuration combination, when the coder-side transmits a coded bit stream to the decoder-side, the coded bit stream may include the indication information 4 and indication information 6. The indication information 4 is for indicating whether the preferred configuration combination is used for the current block. If the indication information 4 is a second value (e.g., 1), the indication information 4 may indicate that the preferred configuration combination is not used for the current block. The indication information 6 is for indicating both the target weighted prediction angle of the current block and the target weighted prediction position of the current block. For example, when a value of the indication information 6 is 0, the indication information 6 is used to indicate the first weighted prediction angle in the weighted prediction angle list and the first weighted prediction position in the weighted prediction position list, and so on.

After receiving the coded bit stream, the decoder-side may parse the indication information 4 and the indication information 6 from the coded bit stream. Based on the indication information 4, the decoder-side may determine whether the preferred configuration combination is used for the current block. If the indication information 4 is the second value, the decoder-side determines that the preferred configuration combination is not used for the current block. When the preferred configuration combination is not used for the current block, the decoder-side may, based on the indication information 6, select a weighted prediction angle corresponding to the indication information 6 from the weighted prediction angle list and take the weighted prediction angle as the weighted prediction angle of the current block; and based on the indication information 6, the decoder-side may select a weighted prediction position corresponding to the indication information 6 from the weighted prediction position list and take the weighted prediction position as the weighted prediction position of the current block.

Application scenario 5: the coder-side and the decoder-side may agree on a preferred configuration combination. After determining the target weighted prediction angle and the target weighted prediction position of the current block, the coder-side may determine whether the combination of the target weighted prediction angle and the target weighted prediction position belongs to the preferred configuration combination. If the combination does not belong the preferred configuration combination, when the coder-side transmits a coded bit stream to the decoder-side, the coded bit stream may include the indication information 4, indication information 7 and indication information 8. Illustratively, the indication information 4 is for indicating whether the preferred configuration combination is used for the current block. If the indication information 4 is a second value, the indication information 4 may indicate that the preferred configuration combination is not used for the current block. The indication information 7 is for indicating a target weighted prediction angle of the current block, for example, an index value 1 of the target weighted prediction angle in the weighted prediction angle list, where the index value 1 indicates which weighted prediction angle in the weighted prediction angle list is the target weighted prediction angle. The indication information 8 is for indicating the target weighted prediction position of the current block, for example, an index value 2 of the target weighted prediction position in the weighted prediction position list, where the index value 2 indicates which weighted prediction position in the weighted prediction position list is the target weighted prediction position.

After receiving the coded bit stream, the decoder-side may parse the indication information 4, the indication information 7 and the indication information 8 from the coded bit stream. Based on the indication information 4, the decoder-side may determine whether the preferred configuration combination is used for the current block. If the indication information 4 is the second value, the decoder-side determines that the preferred configuration combination is not used for the current block. When the preferred configuration combination is not used for the current block, the decoder-side may, based on the indication information 7, select a weighted prediction angle corresponding to the index value 1 from the weighted prediction angle list and take the weighted prediction angle as the weighted prediction angle of the current block. Based on the indication information 8, the decoder-side may select a weighted prediction position corresponding to the index value 2 from the weighted prediction position list and take the weighted prediction position as the weighted prediction position of the current block.

Embodiment 10. In Embodiments 1 to 3, the coder-side/decoder-side expects to obtain a weight transform rate of the current block. If the current block supports a weight transform rate switching mode, the weight transform rate of the current block is obtained in the following manner: obtaining second weight transform rate indication information on the current block, and selecting a weight transform rate corresponding to the second weight transform rate indication information from a preset lookup table; where the preset lookup table includes at least two weight transform rates. The selected weight transform rate is determined as the weight transform rate of the current block.

Since the preset lookup table includes at least two weight transform rates, if the current block supports the weight transform rate switching mode, the weight transform rate of the current block can be selected from the at least two weight transform rates. That is, the weight transform rate of the current block is variable, so that the weight transform rate can be switched adaptively instead of using a uniform weight transform rate.

Illustratively, if switching control information allows the current block to enable the weight transform rate switching mode, the current block supports the weight transform rate switching mode, and if the switching control information does not allow the current block to enable the weight transform rate switching mode, the current block does not support the weight transform rate switching mode. See Embodiment 8 for contents about whether the current block supports the weight transform rate switching mode.

In a possible implementation, the preset lookup table may include at least two weight transform rates, and the second weight transform rate indication information may include weight transform rate index information (for indicating a certain weight transform rate among all weight transform rates in the lookup table). Based on this, a weight transformation rate corresponding to the weight transform rate index information can be selected from the lookup table.

For the coder-side, if there is only one lookup table, for each weight transform rate in the lookup table, the coder-side can determine an RDO cost value corresponding to the weight transform rate, and take a weight transform rate corresponding to a minimum RDO cost value as the target weight transform rate of the current block. Then the coder-side determines the index information on the target weight transform rate from the lookup table, e.g., the weight transform rate index information, where the weight transform rate index information represents the target weight transform rate is which one in the lookup table.

For the decoder-side, if there is only one lookup table, when the coder-side transmits the coded bit stream of the current block to the decoder-side, the coded bit stream may carry the weight transform rate index information, which is for indicating the index information on the target weight transform rate in the lookup table. The decoder-side selects the weight transform rate corresponding to the weight transform rate index information from the lookup table to be the target weight transform rate of the current block.

In another possible implementation, the preset lookup table may include at least two lookup tables, and each lookup table may include at least one weight transform rate. The second weight transform rate indication information may include lookup table index information (for indicating a certain lookup table in all lookup tables) and weight transform rate index information (for indicating a certain weight transform rate in all weight transform rates in a lookup table). Based on this, a target lookup table corresponding to the lookup table index information can be selected from the at least two lookup tables, and a weight transform rate corresponding to the weight transform rate index information can be selected from the target lookup table.

Illustratively, the preset lookup table may include a first lookup table and a second lookup table, and a maximum value of absolute values of the weight transform rates included in the second lookup table is greater than a maximum value of absolute values of the weight transform rates included in the first lookup table. For example, the absolute values of the weight transform rates included in the second lookup table are 4 and 8, and the absolute values of the weight transform rates included in the first lookup table are 5 and 7. The maximum value of the absolute values of the weight transform rates included in the second lookup table is 8, and the maximum value of the absolute values of the weight transform rates included in the first lookup table is 7. The absolute values of the weight transform rates included in the second lookup table are not identical to the absolute values of the weight transform rates included in the first lookup table. For example, the absolute values of the weight transform rates included in the second lookup table are 4 and 8, and the absolute values of the weight transform rates included in the first lookup table are 1, 2, and 4, where the absolute values of the weight transform rates included in the two lookup tables are not identical. Optionally, the absolute values of the weight transform rates included in the second lookup table are completely different from the absolute values of the weight transform rates included in the first lookup table. For example, the absolute values of the weight transform rates included in the second lookup table are 4 and 8, and the absolute values of the weight transform rates included in the first lookup table are 1 and 2, where the absolute values of the weight transform rates included in the two lookup tables are completely different.

Illustratively, the second weight transform rate indication information includes the lookup table index information and the weight transform rate index information. The lookup table index information may be SCC identification corresponding to the current block, and the SCC identification is for indicating that the current block belongs to Screen Content Coding, or, the SCC identification is for indicating that the current block belongs to non-Screen Content Coding. If the SCC identification is for indicating that the current block belongs to the non-Screen Content Coding, a target lookup table corresponding to the SCC identification may be the first lookup table. If the SCC identification is for indicating that the current block belongs to the Screen Content Coding, the target lookup table corresponding to the SCC identification may be the second lookup table.

In summary, the SCC identification (e.g., the lookup table index information) and the weight transform rate index information corresponding to the current block can be obtained. If the SCC identification is for indicating that the current block belongs to the non-Screen Content Coding, the target lookup table is determined to be the first lookup table, a weight transform rate corresponding to the weight transform rate index information is selected from the first lookup table, and the selected weight transform rate is determined to be the weight transform rate of the current block. If the SCC identification is for indicating that the current block belongs to the Screen Content Coding, the target lookup table is determined to be the second lookup table, and a weight transform rate corresponding to the weight transform rate index information is selected from the second lookup table, and the selected weight transform rate is determined to be the weight transform rate of the current block. In this way, the weight transform rate of the current block can be obtained.

The process of the coder-side to obtain the SCC identification can be referred to Embodiment 8 and will not be repeated here.

If the SCC identification is for indicating that the current block belongs to the non-Screen Content Coding, the target lookup table may be the first lookup table. For each weight transform rate in the first lookup table, the coder-side determines a RDO cost value corresponding to the weight transform rate, and takes a weight transform rate corresponding to a minimum RDO cost value as the target weight transform rate of the current block. The coder-side determines the index information on the target weight transform rate from the first lookup table, that is, the weight transform rate index information. If the SCC identification is for indicating that the current block belongs to the Screen Content Coding, the target lookup table may be the second lookup table. For each weight transform rate in the second lookup table, the coder-side determines the RDO cost value corresponding to the weight transform rate, and takes the weight transform rate corresponding to a minimum RDO cost value is as the target weight transform rate of the current block. The coder-side determines the index information on the target weight transform rate from the second lookup table, that is, the weight transform rate index information, and the weight transform rate index information indicates the determined weight transform rate is which one in the second lookup table.

The process of the decoder-side to obtain the SCC identification can be seen in Embodiment 8 and will not be repeated here.

When the coder-side transmits the coded bit stream of the current block to the decoder-side, the coded bit stream may carry the weight transform rate index information, which is for indicating the index information on the target weight transform rate in the first lookup table or in the second lookup table. If the SCC identification is for indicating that the current block belongs to the non-Screen Content Coding, the target lookup table may be the first lookup table. The decoder-side selects the weight transform rate corresponding to the weight transform rate index information (the weight transform rate index information indicates the weight transform rate is which one in the first lookup table) from the first lookup table, which is taken as the weight transform rate of the current block. If the SCC identification is for indicating that the current block belongs to the Screen Content Coding, the target lookup table may be the second lookup table. The decoder-side selects the weight transform rate corresponding to the weight transform rate index information (the weight transform rate index information indicates the weight transform rate is which one in the second lookup table) from the second lookup table, which is taken as the weight transform rate of the current block.

Embodiment 11. In Embodiments 1 to 3, the coder-side/decoder-side expects to obtain a weighted prediction angle, a weighted prediction position and a weight transform rate of a current block, and in Embodiment 10, the weight transform rate may be obtained. Based on this, the weighted prediction angle and the weighted prediction position of the current block are obtained in the following manners.

In a first manner, the coder-side and the decoder-side agree to take a same weighted prediction angle as the weighted prediction angle of the current block, and agree to take a same weighted prediction position as the weighted prediction position of the current block. For example, the coder-side and the decoder-side both take a weighted prediction angle A as the weighted prediction angle of the current block, and both take a weighted prediction position 4 as the weighted prediction position of the current block.

In a second manner, the coder-side constructs a weighted prediction angle list which may include at least one weighted prediction angle, for example, the weighted prediction angle list may include the weighted prediction angle A and a weighted prediction angle B. The coder-side constructs a weighted prediction position list which may include at least one weighted prediction position, for example, the weighted prediction position list may include the weighted prediction positions 0 to 6. The coder-side constructs at least two lookup tables, taking a first lookup table and a second lookup table as an example, where the first lookup table includes at least one weight transform rate and the second lookup table includes at least one weight transform rate. The coder-side determines a target lookup table, see Embodiment 10 for the manner of determining the target lookup table. Taking the target lookup table is the first lookup table as an example. The coder-side traverses each weighted prediction angle in the weighted prediction angle list, traverses each weighted prediction position in the weighted prediction position list, and traverses each weight transform rate in the target lookup table in sequence. That is, traverses a combination of each weighted prediction angle, each weighted prediction position, and each weight transform rate. For each combination of the weighted prediction angle(s), the weighted prediction position(s) and the weight transform rate(s), a weighted prediction angle, a weighted prediction position and a weight transform rate in the combination may be taken as the weighted prediction angle, the weighted prediction position and the weight transform rate of the current block obtained at step 401, and the steps 402 to 408 are performed based on the weighted prediction angle, the weighted prediction position and the weight transform rate to obtain weighted prediction values of the current block.

In summary, the coder-side can obtain a group of weighted prediction values corresponding to the current block based on each combination (a combination includes a weighted prediction angle, a weighted prediction position and a weight transform rate). After obtaining each group of weighted prediction values of the current block, the coder-side can determine a corresponding RDO cost value based on each group of weighted prediction values of the current block. The manner of determining the RDO cost value is not limited. The coder-side can obtain the RDO cost value of each combination and select a minimum RDO cost value from all RDO cost values.

Next, the coder-side takes a weighted prediction angle, a weighted prediction position and a weight transform rate corresponding to the minimum RDO cost value as a target weighted prediction angle, a target weighted prediction position and a target weight transform rate, respectively, and finally codes an index value of the target weighted prediction angle in the weighted prediction angle list, an index value of the target weighted prediction position in the weighted prediction position list, and an index value of the target weight transform rate in the target lookup table into a bit stream of the current block.

For the decoder-side, the decoder-side constructs a weighted prediction angle list, which is identical to the weighted prediction angle list of the coder-side, the decoder-side constructs a weighted prediction position list, which is identical to the weighted prediction position list of the coder-side, and the decoder-side constructs a lookup table, which is identical to the lookup table of the coder-side. After receiving a coded bit stream of the current block, the decoder-side decodes indication information from the coded bit stream, selects a weighted prediction angle from the weighted prediction angle list as the weighted prediction angle of the current block according to the indication information, and selects a weighted prediction position from the weighted prediction position list as the weighted prediction position of the current block according to the indication information. See Embodiment 9 for the manner of obtaining the weighted prediction angle and the weighted prediction position, which will not be repeated here. After receiving the coded bit stream of the current block, the decoder-side can determine a target lookup table (e.g., the first lookup table or the second lookup table) and select a weight transform rate from the target lookup table as the weight transform rate of the current block based on the weight transform rate index information, see Embodiment 10 for the manner of obtaining the weight transform rate, which will not be repeated here.

Embodiment 12. In the embodiments 1 to 3, a first prediction value of a pixel position is determined based on a first prediction mode and a second prediction value of the pixel position is determined based on a second prediction mode.

In this embodiment, descriptions are made with the first prediction mode being an inter prediction mode and the second prediction mode being an inter prediction mode as an example.

Circumstance 1. The first prediction mode is the inter prediction mode, the second prediction mode is the inter prediction mode, and a motion compensation candidate list is obtained, where the motion compensation candidate list includes at least two pieces of candidate motion information. One piece of candidate motion information is selected from the motion compensation candidate list as first target motion information of the current block, and another piece of candidate motion information is selected from the motion compensation candidate list as second target motion information of the current block. For each pixel position of the current block, a first prediction value of the pixel position is determined based on the first target motion information and a second prediction value of the pixel position is determined based on the second target motion information.

Illustratively, the coder-side and the decoder-side both can obtain a motion compensation candidate list, and the motion compensation candidate list of the coder-side may be identical to the motion compensation candidate list of the decoder-side, which is not limited here.

Illustratively, all pieces of the candidate motion information in the motion compensation candidate list are single-hypothesis motion information, for example, the candidate motion information in the motion compensation candidate list is unidirectional motion information rather than bidirectional motion information. Since all pieces of candidate motion information are single-hypothesis motion information, the motion compensation candidate list may be a unidirectional motion compensation candidate list.

The process of obtaining the motion compensation candidate list can be seen in the subsequent embodiments and will not be repeated here.

The coder-side may, based on RDO, select one piece of candidate motion information from the motion compensation candidate list as the first target motion information of the current block, and select another piece of candidate motion information from the motion compensation candidate list as the second target motion information of the current block, where the first target motion information is different from the second target motion information, which is not limited here.

In a possible implementation, when the coder-side transmits a coded bit stream to the decoder-side, the coded bit stream may carry indication information a and indication information b. The indication information a indicates an index value 1 of the first target motion information of the current block and the index value 1 represents which candidate motion information in the motion compensation candidate list is the first target motion information. The indication information b indicates an index value 2 of the second target motion information of the current block and the index value 2 represents which candidate motion information in the motion compensation candidate list is the second target motion information. Illustratively, the index value 1 and the index value 2 may be different.

After receiving the coded bit stream, the decoder-side may parse the indication information a and the indication information b from the coded bit stream. Based on the indication information a, the decoder-side selects candidate motion information corresponding to the index value 1 from the motion compensation candidate list as the first target motion information of the current block. Based on the indication information b, the decoder-side selects candidate motion information corresponding to the index value 2 from the motion compensation candidate list as the second target motion information of the current block.

In another possible implementation, when the coder-side transmits the coded bit stream to the decoder-side, the coded bit stream may carry indication information a and indication information c. The indication information a indicates an index value 1 of the first target motion information of the current block and the index value 1 represents which candidate motion information in the motion compensation candidate list is the first target motion information. The indication information c may be used for indicating a difference between the index value 1 and an index value 2, where the index value 2 represents which candidate motion information in the motion compensation candidate list is the second target motion information. Illustratively, the index value 1 and the index value 2 may be different.

After receiving the coded bit stream, the decoder-side may parse the indication information a and the indication information c from the coded bit stream. Based on the indication information a, the decoder-side selects candidate motion information corresponding to the index value 1 from the motion compensation candidate list as the first target motion information of the current block. Based on the indication information c, the decoder-side obtains a difference between the index value 2 and the index value 1, and determines the index value 2 based on the difference and the index value 1, then the decoder-side may select candidate motion information corresponding to the index value 2 from the motion compensation candidate list as the second target motion information of the current block.

A process in which the coder-side/decoder-side determines the first prediction value of the pixel position based on the first target motion information and determines the second prediction value of the pixel position based on the second target motion information can be referred to the inter prediction process and will not be repeated here.

Illustratively, when the first prediction value of the pixel position is determined based on the first target motion information, the first prediction value of the pixel position may be obtained by using an inter weighted prediction mode. For example, an initial prediction value of the pixel position is determined based on the first target motion information, and then the initial prediction value is multiplied by a preset factor to obtain an adjustment prediction value. If the adjustment prediction value is greater than a maximum prediction value, the maximum prediction value is taken as the first prediction value of the current block, if the adjustment prediction value is less than a minimum prediction value, the minimum prediction value is taken as the first prediction value of the current block; and if the adjustment prediction value is not less than the minimum prediction value or not greater than the maximum prediction value, the adjustment prediction value is taken as the first prediction value of the current block. The above manner is only illustrative and will not be limited here.

Similarly, when the second prediction value of the pixel position is determined based on the second target motion information, the second prediction value of the pixel position may be obtained by using the inter weighted prediction mode. The specific implementation can be referred to the above example and will not be repeated herein.

Circumstance 2. The first prediction mode is the inter prediction mode, the second prediction mode is the inter prediction mode. A first motion compensation candidate list and a second motion compensation candidate list are obtained, where the first motion compensation candidate list includes at least one piece of candidate motion information and the second motion compensation candidate list includes at least one piece of candidate motion information. One piece of candidate motion information is selected from the first motion compensation candidate list as the first target motion information of the current block, and one piece of candidate motion information is selected from the second motion compensation candidate list as the second target motion information of the current block. For each pixel position of the current block, a first prediction value of the pixel position is determined based on the first target motion information; and a second prediction value of the pixel position is determined based on the second target motion information.

Illustratively, the coder-side and the decoder-side both can obtain a first motion compensation candidate list and a second motion compensation candidate list, and the first motion compensation candidate list in the coder-side may be identical to the first motion compensation candidate list in the decoder-side, the second motion compensation candidate list in the coder-side may be identical to the second motion compensation candidate list in the decoder-side.

All pieces of the candidate motion information in the first motion compensation candidate list are single-hypothesis motion information, that is, the candidate motion information in the first motion compensation candidate list is unidirectional motion information rather than bidirectional motion information. Since all pieces of candidate motion information are single-hypothesis motion information, the first motion compensation candidate list may be a unidirectional motion compensation candidate list.

All pieces of the candidate motion information in the second motion compensation candidate list are single-hypothesis motion information, that is, the candidate motion information in the second motion compensation candidate list is unidirectional motion information rather than bidirectional motion information. Since all pieces of candidate motion information are single-hypothesis motion information, the second motion compensation candidate list may be a unidirectional motion compensation candidate list.

The process of obtaining the first motion compensation candidate list and the second motion compensation candidate list can be seen in the subsequent embodiments.

The coder-side may, based on RDO, select one piece of candidate motion information from the first motion compensation candidate list as the first target motion information of the current block, and select one piece of candidate motion information from the second motion compensation candidate list as the second target motion information of the current block, where the first target motion information is different from the second target motion information, which is not limited here.

When the coder-side transmits a coded bit stream to the decoder-side, the coded bit stream carries indication information a and indication information b. The indication information a indicates an index value 1 of the first target motion information of the current block, and the index value 1 represents which candidate motion information in the first motion compensation candidate list is the first target motion information. The indication information b indicates an index value 2 of the second target motion information of the current block, and the index value 2 represents which candidate motion information in the second motion compensation candidate list is the second target motion information. After receiving the coded bit stream, the decoder-side parses the indication information a and the indication information b from the coded bit stream. Based on the indication information a, the decoder-side selects candidate motion information corresponding to the index value 1 from the first motion compensation candidate list as the first target motion information of the current block. Based on the indication information b, the decoder-side selects candidate motion information corresponding to the index value 2 from the second motion compensation candidate list as the second target motion information of the current block.

In the above circumstances, indication information on the prediction information on the first prediction mode and indication information on the prediction information on the second prediction mode may be interchangeable as long as the coder-side and the decoder-side are consistent. An interchange of the indication information does not affect a parsing process, that is, there is no parsing dependence. In a case of using a same prediction mode candidate list, the indication information on the prediction information on the first prediction mode cannot be equal to the indication information on the prediction information on the second prediction mode. It is assumed that two indexes are coded, where an index value a is 1 and an index value b is 3, when the index value a is firstly coded, the index value b may be coded as 2 (i.e., 3-1); and when the index value b is firstly coded, the index value b is to be coded as 3. In a word, coding indication information with a smaller index value first can reduce a coding overhead for coding a larger index value. Under a construction manner of the prediction mode candidate list, the first prediction mode highly probably comes from a left side, and based on this prior experience, adjustment can be made to the coder-side and the decoder-side, where indication information on the prediction information in an area adjacent to the left side can be firstly coded.

The following description is combined with Circumstance 1, and other circumstances are similar to Circumstance 1. In Circumstance 1, the prediction mode candidate list may be a motion compensation candidate list, the prediction information of the first prediction mode may be the first target motion information, and the prediction information of the second prediction mode may be the second target motion information. In the coded bit stream, the indication information on the first target motion information, such as the index value a, is coded first, and then the indication information on the second target motion information, such as the index value b, is coded. Optionally, the indication information on the second target motion information, such as the index value b, is first coded, and then the indication information on the first target motion information, such as the index value a, is coded. For example, if the index value a is 1 and the index value b is 3, the index value a is coded before the index value b. For another example, if the index value b is 1 and the index value a is 3, the index value b is coded before the index value a.

Embodiment 13. In the embodiments 1 to 3, a first prediction value of a pixel position is determined based on a first prediction mode and a second prediction value of the pixel position is determined based on a second prediction mode. Illustratively, the first prediction mode may be any one of: an intra block copy prediction mode, an intra prediction mode, an inter prediction mode and a palette mode; and the second prediction mode may be any one of: the intra block copy prediction mode, the intra prediction mode, the inter prediction mode and the palette mode.

In this embodiment, descriptions are made with the first prediction mode being an inter prediction mode and the second prediction mode being an inter prediction mode as an example. Since the first prediction mode is the inter prediction mode, based on this, determining the first prediction value of the pixel position based on the first prediction mode of the current block may include: obtaining a motion compensation candidate list including at least one piece of candidate motion information; selecting one piece of candidate motion information from the motion compensation candidate list as original motion information of the current block; determining target motion information of the current block based on the original motion information; and determining the first prediction value of the pixel position based on the target motion information.

Circumstance 1. The first prediction mode is the inter prediction mode, the second prediction mode is the inter prediction mode, and a motion compensation candidate list is obtained, where the motion compensation candidate list may include at least two pieces of candidate motion information. One piece of candidate motion information is selected from the motion compensation candidate list as first original motion information of the current block, and another piece of candidate motion information is selected from the motion compensation candidate list as second original motion information of the current block. The first original motion information is different from the second original motion information. Then, based on the first origin motion information, first target motion information of the current block is determined, and based on the second origin motion information, second target motion information of the current block is determined. For each pixel position of the current block, a first prediction value of the pixel position is determined based on the first target motion information and a second prediction value of the pixel position is determined based on the second target motion information.

The process of obtaining the motion compensation candidate list can be seen in the subsequent embodiments and will not be repeated here. A process of determining the first prediction value based on the first target motion information and determining the second prediction value based on the second target motion information can be seen in Embodiment 12 and will not be repeated here. Different from Embodiment 12, in Embodiment 13, the candidate motion information selected from the motion compensation candidate list is used as the original motion information instead of as the target motion information. After obtaining the original motion information, the target motion information can be obtained based on the original motion information, see subsequent Embodiments for the specific obtaining process.

Circumstance 2. The first prediction mode is the inter prediction mode, the second prediction mode is the inter prediction mode, a first motion compensation candidate list and a second motion compensation candidate list are obtained, where the first motion compensation candidate list includes at least one piece of candidate motion information and the second motion compensation candidate list includes at least one piece of candidate motion information. One piece of candidate motion information is selected from the first motion compensation candidate list as the first original motion information of the current block, and based on the first original motion information, the first target motion information of the current block is determined. One piece of candidate motion information is selected from the second motion compensation candidate list as the second original motion information of the current block, and based on the second original motion information, the second target motion information of the current block is determined. For each pixel position of the current block, a first prediction value of the pixel position is determined based on the first target motion information, and a second prediction value of the pixel position is determined based on the second target motion information. Different from Embodiment 12, in Embodiment 13, the candidate motion information selected from the motion compensation candidate list is used as the original motion information instead of as the target motion information. After obtaining the original motion information, the target motion information can also be obtained based on the original motion information, see subsequent Embodiments for the specific obtaining process.

To sum up, for the above circumstances, when the prediction mode is the inter prediction mode, a motion compensation candidate list may be obtained, where the motion compensation candidate list includes at least one piece of candidate motion information. Next, candidate motion information is selected from the motion compensation candidate list as the origin motion information of the current block. The first target motion information is determined based on the first origin motion information and the second target motion information is determined based on the second origin motion information. Then, the prediction value of the pixel position is determined based on the target motion information.

For how to determine the target motion information based on the origin motion information, the embodiments provide schemes of superimposing unidirectional motion information on a motion vector difference (or called Motion Vector Refinement). For example, the origin motion information includes an origin motion vector and the target motion information includes a target motion vector. To determine a target motion vector of the current block based on the origin motion vector, a motion vector difference (MVD) corresponding to the origin motion vector may be obtained, and the target motion vector is determined based on the motion vector difference and the origin motion vector. That is, a sum of the motion vector difference and the origin motion vector is taken as the target motion vector.

Embodiment 14. On a basis of Embodiment 13, direction information and amplitude information on the motion vector difference are agreed on. If the direction information indicates that a direction is rightward and the amplitude information indicates that an amplitude is Ar, the motion vector difference is (Ar, 0). If the direction information indicates that the direction is downward and the amplitude information indicates that the amplitude is Ad, the motion vector difference is (0, −Ad). If the direction information indicates that the direction is leftward and the amplitude information indicates that the amplitude is Al, the motion vector difference is (−Al, 0). If the direction information indicates that the direction is upward and the amplitude information indicates that the amplitude is Au, the motion vector difference is (0, Au). If the direction information indicates that the direction is right-upward and the amplitude information indicates that the amplitude is Aru, the motion vector difference is (Aru, Aru). If the direction information indicates that the direction is left-upward and the amplitude information indicates that the amplitude is Alu, the motion vector difference is (−Alu, Alu). If the direction information indicates that the direction is left-downward and the amplitude information indicates that the amplitude is Ald, the motion vector difference is (−Ald, −Ald). If the direction information indicates that the direction is right-downward and the amplitude information indicates that the amplitude is Ard, the motion vector difference is (Ard, −Ard).

It is noted that the above amplitudes Ar, Ad, Al, Au, Aru, Alu, Ald, and Ard respectively indicate one set of values, and the values in the amplitude sets of different directions may be completely same or partially same, or completely different.

Illustratively, the motion vector difference may support all or part of the above direction information, a value range of the amplitude supported by the motion vector difference may be configured based on experience, and the amplitude A may include at least one value, which is not limited here.

For example, the motion vector difference supports four directions such as upward, downward, leftward and rightward or the like, and the motion vector difference supports following five step length configurations: ¼-pel, ½-pel, 1-pel, 2-pel and 4-pel, that is, the value of the amplitude may be 1, 2, 4, 8 and 16. To sum up, when the direction is upward, the motion vector difference may be (0, 1), (0, 2), (0, 4), (0, 8), and (0, 16). When the direction is downward, the motion vector difference may be (0, −1), (0, −2), (0, −4), (0, −8), and (0, −16). When the direction is leftward, the motion vector difference may be (−1, 0), (−2, 0), (−4, 0), (−8, 0), and (−16, 0). When the direction is rightward, the motion vector difference may be (1, 0), (2, 0), (4, 0), (8, 0), and (16, 0).

For another example, the motion vector difference supports four directions such as upward, downward, leftward and rightward or the like, and the motion vector difference supports following six step length configurations: ¼-pel, ½-pel, 1-pel, 2-pel, 3-pel and 4-pel, that is, the value of the amplitude may be 1, 2, 4, 8 and 16. To sum up, when the direction is upward, the motion vector difference may be (0, 1), (0, 2), (0, 4), (0, 8), (0, 12) and (0, 16). The motion vector differences of other directions may be implemented in a same way as in the "upward" direction and will not be repeated here.

For another example, the motion vector difference supports eight directions such as upward, downward, leftward, rightward, left-upward, left-downward, right-upward, and right-downward or the like, and the motion vector difference supports following three step length configurations: ¼-pel, ½-pel and 1-pel, that is, the value of the amplitude may be 1, 2 and 4. To sum up, when the direction is left-upward, the motion vector difference may be (−1, 1), (−2, 2), and (−4, 4). When the direction is right-upward, the motion vector difference may be (1, 1), (2, 2), and (4, 4). The motion vector differences of other directions may be implemented in a same way as in the "left upward and right upward" directions, and the values of the motion vector differences can be referred to the above agreement and will not be repeated here.

For another example, the motion vector difference supports four directions such as upward, downward, leftward and rightward or the like, and the motion vector difference supports following four step length configurations: ¼-pel, ½-pel, 1-pel, and 2-pel, that is, the value of the amplitude may be 1, 2, 4, and 8.

The above examples are only illustrative and no limitation is made here. For example, the direction supported by the motion vector difference may be selected arbitrarily, for example, may be selected as six directions such as upward, downward, leftward, rightward, left-upward and left-downward or the like, or as two directions such as upward and downward or the like. For another example, the step length configuration supported by the motion vector difference may be changeable, and can be configured flexibly. For another example, the step length configuration may be adaptively configured based on coding parameters such as a QP (Quantization Parameter) and the like. For example, 1-pel, 2-pel, 4-pel and 8-pel may be adopted for a larger QP, and ¼-pel, ½-pel, 1-pel and 2-pel may be adopted for a smaller QP. For another example, an appropriate step length configuration may be configured at a sequence level, a picture level, a frame level, a Slice level, a tile level, a patch level, a CTU level and the like, and the decoder-side performs a decoding operation according to the step length configurations parsed at the sequence level, the picture level, the frame level, the Slice level, the tile level, the patch level, the CTU level and the like.

For ease of descriptions, in subsequent embodiments, the motion vector difference supports directions such as the upward and downward or the like, and supports the step length configurations such as 1-pel and 2-pel, in a case of ¼-pel precision, the motion vector difference may be (0, 4), (0, 8), (0, −4), (0, −8), that is, (0, 1<<2), (0, 1<<3), (0, −1<<2) and (0, −1<<3).

After obtaining the motion compensation candidate list, the coder-side may sequentially traverse each candidate motion vector in the motion compensation candidate list. When a candidate motion vector 1 is traversed, a sum of the candidate motion vector 1 and the motion vector difference (0, 4) is taken as a candidate motion vector 1-1, and an RDO cost value 1-1 corresponding to the candidate motion vector 1-1 is determined. The above determination process is not limited here. A sum of the candidate motion vector 1 and the motion vector difference (0, 8) is taken as a candidate motion vector 1-2, and an RDO cost value 1-2 corresponding to the candidate motion vector 1-2 is determined. A sum of the candidate motion vector 1 and the motion vector difference (0, −4) is taken as a candidate motion vector 1-3, and an RDO cost value 1-3 corresponding to the candidate motion vector 1-3 is determined. A sum of the candidate motion vector 1 and the motion vector difference (0, −8) is taken as a candidate motion vector 1-4, and an RDO cost value 1-4 corresponding to the candidate motion vector 1-4 is determined.

By analogy, for each of the candidate motion vectors traversed, an RDO cost value can be obtained by processing in the above manner. After completing traversals of all candidate motion vectors, a minimum RDO cost value is selected from all RDO cost values. If an RDO cost value 1-1 is minimum, the coder-side may code following contents in a coded bit stream: an index value of the candidate motion vector 1 in the motion compensation candidate list, direction information and amplitude information on the motion vector difference (0, 4), where the direction information is used to indicate a direction of the motion vector difference (0, 4) is upward, and the amplitude information is used to indicate an amplitude of the motion vector difference (0, 4) is 4. For example, indication information on the direction information may be 0, which indicates a first direction in a direction list (upward and downward), and indication information on the amplitude information may be 4 which indicates a first step length configuration in a step length configuration list (1-pel, 2-pel). The above process is a simplified example, which is not limited herein as long as the direction information and the amplitude information can be indicated.

For example, when the motion vector difference supports four directions such as upward, downward, leftward and rightward or the like, and the motion vector difference supports five step length configurations such as ¼-pel, ½-pel, 1-pel, 2-pel and 4-pel or the like, the direction information on the motion vector difference may be coded by using 2bin fixed-length code (four values in total), where the four values of the 2bin fixed-length code respectively represent four directions such as upward, downward, leftward and rightward or the like. The amplitude information on the motion vector difference may be coded by using the truncated unary, that is, the five step length configurations are indicated by the truncated unary.

For another example, when the motion vector difference supports four directions such as upward, downward, leftward and rightward or the like, and the motion vector difference supports six step length configurations such as ¼-pel, ½-pel, 1-pel, 2-pel, 3-pel and 4-pel or the like, the direction information on the motion vector difference may be coded by using 2bin fixed-length code (four values in total), and the amplitude information on the motion vector difference may be coded by using the truncated unary.

For another example, when the motion vector difference supports eight directions such as upward, downward, leftward, rightward, left-upward, left-downward, right-upward and right-downward or the like, and the motion vector difference supports three step length configurations such as ¼-pel, ½-pel and 1-pel or the like, the direction information on the motion vector difference may be coded by using 3bin fixed-length code (eight values in total), and the amplitude information on the motion vector difference may by coded by using the truncated unary.

For another example, when the motion vector difference supports four directions such as upward, downward, leftward, rightward or the like, and the motion vector difference supports four step length configurations such as ¼-pel, ½-pel, 1-pel, and 2-pel or the like, in this way, the direction information on the motion vector difference may be coded by using truncated unary, and the amplitude information on the motion vector difference may be coded by using 2bin fixed-length code (four values in total).

The above coding manners are only examples and not limited here.

To sum up, the coder-side may search an optimal motion vector within a certain area and then take a difference between the optimal motion vector and a candidate motion vector as a motion vector difference, and code the amplitude information and the direction information on the motion vector difference and an index value of the candidate motion vector in the motion compensation candidate list into a bit stream. When the coder-side searches for the optimal motion vector within a certain area, the direction and the amplitude of the motion vector difference are expected to be agreed on, that is, the optimal motion vector is searched within limited ranges of the motion vector difference, such as (Ar, 0), (0, −Ad), (−Al, 0), (0, Au), (Aru, Aru), (−Aru, Alu), (−Ald, −Ald), and (Ard, −Ard) and the like, rather than the optimal motion vector is searched within any range of the motion vector difference.

After receiving the coded bit stream of the current block, the decoder-side may parse the index value of the candidate motion vector in the motion compensation candidate list from the coded bit stream, and select a candidate motion vector corresponding to the index value in the motion compensation candidate list, and take the candidate motion vector as an origin motion vector of the current block. The decoder-side may also parse the direction information and the amplitude information on the motion vector difference from the coded bit stream and determine the motion vector difference based on the direction information and the amplitude information.

Next, the decoder-side may determine a target motion vector of the current block based on the motion vector difference and the origin motion vector, for example, a sum of the motion vector difference and the origin motion vector can be taken as the target motion vector of the current block.

Referring to the embodiments above, when determining the motion vector difference based on the direction information and the amplitude information, if the direction information indicates that a direction is rightward and the amplitude information indicates that an amplitude is Ar, the motion vector difference is (Ar, 0), if the direction information indicates that the direction is downward and the amplitude information indicates that the amplitude is Ad, the motion vector difference is (0, −Ad), if the direction information indicates that the direction is leftward and the amplitude information indicates that the amplitude is Al, the motion vector difference is (−Al, 0), if the direction information indicates that the direction is upward and the amplitude information indicates that the amplitude is Au, the motion vector difference is (0, Au), if the direction information indicates that the direction is right-upward and the amplitude information indicates that the amplitude is Aru, the motion vector difference is (Aru, Aru), if the direction information indicates that the direction is left-upward and the amplitude information indicates that the amplitude is Alu, the motion vector difference is (−Alu, Alu), if the direction information indicates that the direction is left-downward and the amplitude information indicates that the amplitude is Ald, the motion vector difference is (−Ald, −Ald), if the direction information indicates that the direction is right-downward and the amplitude information indicates that the amplitude is Ard, the motion vector difference is (Ard, −Ard).

Referring to the above embodiment, when coding direction information on the motion vector difference, the coder-side may use a fixed-length code or a truncated unary or the like. Therefore, the decoder-side may use the fixed-length code or the truncated unary or the like to decode the direction information on the motion vector difference so as to obtain the direction information on the motion vector difference, such as upward, downward, leftward, rightward, left-upward, left-downward, right-upward, and right-downward and so on.

Referring to the above embodiment, when coding amplitude information on the motion vector difference, the coder-side may use a fixed-length code or a truncated unary or the like. Therefore, the decoder-side may use the fixed-length code or the truncated unary or the like to decode the amplitude information on the motion vector difference so as to obtain the amplitude information on the motion vector difference, such as step length configurations: ¼-pel, ½-pel, 1-pel, 2-pel and the like, and then determine a value of the amplitude of the motion vector difference based on the step length configuration, such as ¼-pel, ½-pel, 1-pel and 2-pel.

To sum up, the decoder-side may parse the direction information and the amplitude information on the motion vector difference from the coded bit stream, and then determine the motion vector difference based on the direction information and the amplitude information.

In a possible implementation, the coder-side may further code flag information in the coded bit stream, where the flag information indicates superimposing a motion vector difference on an origin motion vector, or not superimposing the motion vector difference on the origin motion vector. The flag information may be a sub-mode flag of an Enhanced Angular Weighted Prediction mode. Further, the Enhanced Angular Weighted Prediction mode may also be called AWP with Motion Vector Refinement (AWP-MVR) mode. After receiving the coded bit stream of the current block, the decoder-side firstly parses the flag information from the coded bit stream of the current block. If the flag information indicates superimposing the motion vector difference on the origin motion vector, the decoder-side parses the direction information and the amplitude information on the motion vector difference from the coded bit stream of the current block, and determines the motion vector difference based on the direction information and the amplitude information, and determines the target motion vector of the current block based on the origin motion vector and the motion vector difference. If the flag information indicates not superimposing the motion vector difference on the origin motion vector, the decoder-side does not parse the direction information or the amplitude information on the motion vector difference, but directly takes the origin motion vector as the target motion vector of the current block.

Illustratively, when the sub-mode flag of the Enhanced Angular Weighted Prediction mode is a first sub-mode value, it indicates superimposing the motion vector difference on the origin motion vector, when the sub-mode flag of the EAWP mode is a second sub-mode value, it indicates not superimposing the motion vector difference on the origin motion vector. The first sub-mode value and the second sub-mode value may be configured based on experience, for example, the first sub-mode value may be 1 and the second sub-mode value may be 0, or, for example, the first sub-mode value may be 0 and the second sub-mode value may be 1. Above are only two examples and no limitation is made here.

In a possible implementation, for the circumstances 1 or 2 of Embodiment 13, the first origin motion information includes a first origin motion vector, the first target motion information includes a first target motion vector, the second origin motion information includes a second origin motion vector and the second target motion information includes a second target motion vector. Based on the above, a first motion vector difference corresponding to the first origin motion vector may be obtained, and the first target motion vector is determined based on the first motion vector difference and the first origin motion vector, that is, a sum of the first motion vector difference and the first origin motion vector is taken as the first target motion vector. A second motion vector difference corresponding to the second origin motion vector may be obtained, and the second target motion vector is determined based on the second motion vector difference and the second origin motion vector, that is, a sum of the second motion vector difference and the second origin motion vector is taken as the second target motion vector.

The coder-side may use the RDO to determine the first motion vector difference corresponding to the first origin motion vector and determine the second motion vector difference corresponding to the second origin motion vector, which is not limited herein.

When the coder-side transmits the coded bit stream of the current block to the decoder-side, the coded bit stream may carry direction information and amplitude information on the first motion vector difference and direction information and amplitude information on the second motion vector difference.

The decoder-side, after receiving the coded bit stream of the current block, may parse the direction information and the amplitude information on the first motion vector difference from the coded bit stream, and determine the first motion vector difference based on the direction information and the amplitude information on the first motion vector difference, and may parse the direction information and the amplitude information on the second motion vector difference from the coded bit stream and determine the second motion vector difference based on the direction information and the amplitude information on the second motion vector difference. Next, the decoder-side may determine the first target motion vector of the current block based on the first motion vector difference and the first origin motion vector, and determine the second target motion vector of the current block based on the second motion vector difference and the second origin motion vector.

In a possible implementation, the coder-side may also code a first sub-mode flag and a second sub-mode flag of an Enhanced Angular Weighted Prediction mode in a coded bit stream, where the first sub-mode flag indicates superimposing a motion vector difference on a first origin motion vector, or not superimposing the motion vector difference on the first origin motion vector, and the second sub-mode flag indicates superimposing motion vector difference on a second origin motion vector, or not superimposing the motion vector difference on the second origin motion vector.

In a possible implementation, the above first sub-mode flag may also be a first flag bit in the coded bit stream, and the above second sub-mode flag may also be a second flag bit in the coded bit stream.

The decoder-side, after receiving the coded bit stream of the current block, may firstly parse the first sub-mode flag and the second sub-mode flag of the Enhanced Angular Weighted Prediction mode from the coded bit stream of the current block. If the first sub-mode flag indicates superimposing a motion vector difference on a first origin motion vector, the decoder-side parses direction information and amplitude information on the first motion vector difference from the coded bit stream, and determines the first motion vector difference based on the direction information and the amplitude information on the first motion vector difference, and then determines the first target motion vector of the current block based on the first origin motion vector and the first motion vector difference. If the first sub-mode flag indicates not superimposing the motion vector difference on the first origin motion vector, the decoder-side does not parse the direction information or the amplitude information on the first motion vector difference, but directly takes the first origin motion vector as the first target motion vector of the current block. If the second sub-mode flag indicates superimposing the motion vector difference on a second origin motion vector, the decoder-side parses direction information and amplitude information on the second motion vector difference from the coded bit stream, and determines the second motion vector difference based on the direction information and the amplitude information on the second motion vector difference, and then determines the second target motion vector of the current block based on the second origin motion vector and the second motion vector difference. If the second sub-mode flag indicates not superimposing the motion vector difference on the second origin motion vector, the decoder-side does not parse the direction information or the amplitude information on the second motion vector difference, but directly takes the second origin motion vector as the second target motion vector of the current block.

Embodiment 15. On the basis of Embodiments 13 and 14, for the circumstance of two motion vector differences, relevant syntax for superimposing a motion vector difference on unidirectional motion information is described below in combination with several specific application scenarios.

Application scenario 1: Table 4 shows an example of relevant syntax, where SkipFlag represents whether a current block is in a Skip mode, DirectFlag represents whether the current block is in a Direct mode, and AwpFlag represents whether the current block is in an AWP mode.

awp_idx (an index of an angular weighted prediction mode) is an index value of the angular weighted prediction mode under the skip mode or the direct mode, and a value of AwpIdx may be equal to a value of awp_idx. If there is no awp_idx in a bit stream, the value of AwpIdx is equal to 0.

awp_cand_idx0 (a first motion information index of the angular weighted prediction mode) is a first motion information index value of the angular weighted prediction mode under the skip mode or the direct mode. A value of Awp-CandIdx0 is equal to the value of awp_cand_idx0. If there is no awp_cand_idx0 in the bit stream, the value of Awp-CandIdx0 is equal to 0.

awp_cand_idx1 (a second motion information index of the angular weighted prediction mode) is a second motion information index value of the angular weighted prediction mode under the skip mode or the direct mode. A value of AwpCandIdx1 is equal to the value of awp_cand_idx1. If there is no awp_cand_idx1 in the bit stream, the value of AwpCandIdx1 is equal to 0.

awp_mvd_flag (a flag of an enhanced angular weighted prediction mode) is a binary variable. When awp_mvd_flag is a first amount (e.g., 1), it indicates that the current block is in the enhanced angular weighted prediction mode; when awp_mvd_flag is a second value (e.g., 0), it indicates that the current block is in a non-enhanced angular weighted prediction mode. Illustratively, a value of AwpMvdFlag may be equal to the value of awp_mvd_flag. If there is no awp_mvd_flag in the bit stream, the value of AwpMvdFlag is equal to 0.

awp_mvd_sub_flag0 (a first sub-mode flag of the enhanced angular weighted prediction mode) is a binary variable. When awp_mvd_sub_flag0 is a first amount, it indicates that the first motion information of the angular weighted prediction mode is to be superimposed with a motion information difference; when awp_mvd_sub_flag0 is a second value, it indicates that the first motion information of the angular weighted prediction mode is not to be superimposed with the motion information difference. Illustratively, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) is a binary variable. When awp_mvd_sub_flag1 is a first amount, it indicates that the second motion information of the angular weighted prediction mode is to be superimposed with a motion information difference; when awp_mvd_sub_flag1 is a second value, it indicates that the second motion information of the angular weighted prediction mode is not to be superimposed with the motion information difference. Illustratively, a value of AwpMvdSubFlag1 may be equal to a value of awp_mvd_sub_flag1. If there is no awp_mvd_sub_flag1 in the bit stream, there may be the following case: if AwpMvdFlag is equal to 1, the value of AwpMvdSubFlag1 is equal to 1, otherwise, the value of AwpMvdSubFlag1 may be 0.

awp_mvd_dir0 (a direction index value of the motion vector difference of the first motion information) is a direction index value of the motion vector difference of the first motion information under the angular weighted prediction mode. Illustratively, a value of AwpMvdDir0 may be equal to a value of awp_mvd_dir0. If there is no awp_mvd_dir0 in the bit stream, the value of AwpMvdDir may be equal to 0.

awp_mvd_step0 (a step length index value of the motion vector difference of the first motion information) is a step length index value of the motion vector difference of the first motion information under the angular weighted prediction mode. Illustratively, a value of AwpMvdStep0 may be equal to a value of awp_mvd_step0. If there is no awp_mvd_step0 in the bit stream, the value of AwpMvdStep0 may be equal to 0.

awp_mvd_dir1 (a direction index value of the motion vector difference of the second motion information) is a direction index value of the motion vector difference of the second motion information under the angular weighted prediction mode. Illustratively, a value of AwpMvdDir1 may be equal to a value of awp_mvd_dir1. If there is no awp_mvd_dir1 in the bit stream, the value of AwpMvdDir1 may be equal to 0.

awp_mvd_step1 (a step length index value of the motion vector difference of the second motion information) is a step length index value of the motion vector difference of the second motion information under the angular weighted prediction mode. Illustratively, a value of AwpMvdStep1 may be equal to a value of awp_mvd_step1. If there is no awp_mvd_step1 in the bit stream, the value of AwpMvdStep1 may be equal to 0.

TABLE 4

| Definition of a coding unit | Descriptor |
|---|---|
| ... | |
| if ((SkipFlag \|\| DirectFlag) && AwpFlag) { | |
|   awp_idx | ae(v) |
|   awp_cand_idx0 | ae(v) |
|   awp_cand_idx1 | ae(v) |
|   awp_mvd_flag | ae(v) |
|   if (AwpMvdFlag) { | |
|     awp_mvd_sub_flag0 | ae(v) |
|     if (AwpMvdSubFlag0) { | |
|       awp_mvd_dir0 | ae(v) |
|       awp_mvd_step0 | ae(v) |
|       awp_mvd_sub_flag1 | ae(v) |
|     } | |
|     if (AwpMvdSubFlag1) { | |
|       awp_mvd_dir1 | ae(v) |
|       awp_mvd_step1 | ae(v) |
|     } | |
|   } | |
| } | |
| ... | |

Application scenario 2: Table 5 shows an example of relevant syntax, where SkipFlag represents whether a current block is in a Skip mode, DirectFlag represents whether the current block is in a Direct mode, and AwpFlag represents whether the current block is in an AWP mode.

For awp_idx, awp_cand_idx0 and awp_cand_idx1, reference may be made to the application scenario 1, and no redundant descriptions are made here.

awp_mvd_sub_flag0 (a first sub-mode flag of the enhanced angular weighted prediction mode) is a binary variable. When awp_mvd_sub_flag0 is a first amount, it indicates that the first motion information of the angular weighted prediction mode is to be superimposed with a motion information difference-; when awp_mvd_sub_flag0 is a second value, it indicates that the first motion information of the angular weighted prediction mode is not to be superimposed with the motion information difference. Illustratively, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) is a binary variable. When awp_mvbd_sub_flag1 is a first amount, it indicates that the second motion information of the angular weighted prediction mode is to be superimposed with a motion information difference, when awp_mvd_sub_flag1 is a second value, it indicates that the second motion information of the angular weighted prediction mode is not to be superimposed with the motion information difference. Illustratively, a value of AwpMvdSubFlag1 may be equal to a value of awp_mvd_sub_flag1. If there is no awp_mvd_sub_flag1 in the bit stream, the value of AwpMvdSubFlag1 may be equal to 0.

For awp_mvd_dir0, awp_myd_step0, awp_mvd_dir1 and awp_mvd_step1, reference may be made to the application scenario 1.

TABLE 5

| Definition of a coding unit | Descriptor |
|---|---|
| ... | |
| if ((SkipFlag \|\| DirectFlag) && AwpFlag) { | |
|   awp_idx | ae(v) |
|   awp_cand_idx0 | ae(v) |
|   awp_cand_idx1 | ae(v) |
|   awp_mvd_sub_flag0 | ae(v) |
|   if (AwpMvdSubFlag0) { | |
|     awp_mvd_dir0 | ae(v) |
|     awp_mvd_step0 | ae(v) |
|   } | |
|   awp_mvd_sub_flag1 | ae(v) |
|   if (AwpMvdSubFlag1) { | |
|     awp_mvd_dir1 | ae(v) |
|     awp_mvd_step1 | ae(v) |
|   } | |
| } | |
| ... | |

Illustratively, the application scenario 1 and the application scenario 2 are different in followings: in the application scenario 1, syntax awp_mvd_flag is present, but in the application scenario 2, syntax awp_mvd_flag is not present. In the application scenario 1, the enhanced angular weighted prediction mode is controlled through awp_mvd_flag, that is, the enhanced angular weighted prediction mode is controlled by a master switch.

Application scenario 3: the above application scenario 1 and application scenario 2 can be extended to fully integrate the AWP and AWP-MVR modes, that is, adding 0 span to the span, thus there is no requirement to encode a flag bit for whether to enable or not. For example, the motion vector difference supports four directions such as upward, downward, leftward, and rightward or the like, and the motion vector difference supports following 6 step length configurations: 0-pel, ¼-pel, ½-pel, 1-pel, 2-pel, and 4-pel, that is, a step configuration 0-pel is added. On this basis, Table 4/Table 5 can be updated to Table 6. Meanings of the relevant syntax in Table 6 can be found in Table 4 and will not be repeated here.

TABLE 6

| Definition of a coding unit | Descriptor |
|---|---|
| ... | |
| if ((SkipFlag \|\| DirectFlag) && AwpFlag) { | |
|   awp_idx | ae(v) |
|   awp_cand_idx0 | ae(v) |
|   awp_cand_idx1 | ae(v) |
|   awp_mvd_step0 | ae(v) |
|   if (AwpMvdStep0 != 0) | |
|     awp_mvd_dir0 | ae(v) |
|   awp_mvd_step1 | ae(v) |
|   if (AwpMvdStep1 != 0) | |
|     awp_mvd_dir1 | ae(v) |
| } | |
| ... | |

Illustratively, in the above embodiments, target motion information may be obtained based on origin motion information. After the target motion information is obtained, the target motion information of the current block may be stored in a manner which is not limited here.

Embodiment 16: in Embodiments 12 and 13, a motion compensation candidate list is expected to be obtained, and in the process of obtaining the motion compensation candidate list, at least one piece of available motion information to be added to the motion compensation candidate list can be obtained; based on the at least one piece of available motion information, the motion compensation candidate list is obtained. For example, for the available motion information currently to be added to the motion compensation candidate list, if the available motion information is unidirectional motion information and the unidirectional motion information is not duplicated with the candidate motion information already existing in the motion compensation candidate list, the unidirectional motion information is added into the motion compensation candidate list. If the available motion information is bidirectional motion information, and first unidirectional motion information in the bidirectional motion information is not duplicated with the candidate motion information already existing in the motion compensation candidate list, the first unidirectional motion information is added to the motion compensation candidate list. If the available motion information is bidirectional motion information, the first unidirectional motion information in the bidirectional motion information is duplicated with the candidate motion information already existing in the motion compensation candidate list, and second unidirectional motion information in the bidirectional motion information is not duplicated with the candidate motion information already existing in the motion compensation candidate list, then the second unidirectional motion information is added to the motion compensation candidate list.

Illustratively, the first unidirectional motion information is unidirectional motion information pointing to a reference picture in a first reference picture list, and the second unidirectional motion information is unidirectional motion information pointing to a reference picture in a second reference picture list.

In a possible implementation, if a total number of candidate motion information already existing in the motion compensation candidate list (e.g., a total number of candidate motion information already existing for the current block) is an even number, the first reference picture list is a reference picture list List0 and the second reference picture list is the reference picture list List1; if the total number of candidate motion information already existing in the motion compensation candidate list is an odd number, the first reference picture list is the reference picture list List0 and the second reference picture list is the reference picture list List1. Or, if a total number of candidate motion information already existing in the motion compensation candidate list is an odd number, the first reference picture list is a reference picture list List) and the second reference picture list is the reference picture list List1; if the total number of candidate motion information already existing in the motion compensation candidate list is an even number, the first reference picture list is the reference picture list List0 and the second reference picture list is the reference picture list List1.

In another possible implementation, the first reference picture list is the reference picture list List0 and the second reference picture list is the reference picture list List1; or, the first reference picture list is the reference picture list List1 and the second reference picture list is the reference picture list List0.

In the above embodiments, the at least one piece of available motion information to be added to the motion compensation candidate list may include, but is not limited to, at least one of the following motion information: spatial motion information; temporal motion information; HMVP (History-based Motion Vector Prediction) motion information; or preset motion information.

Figure 9:
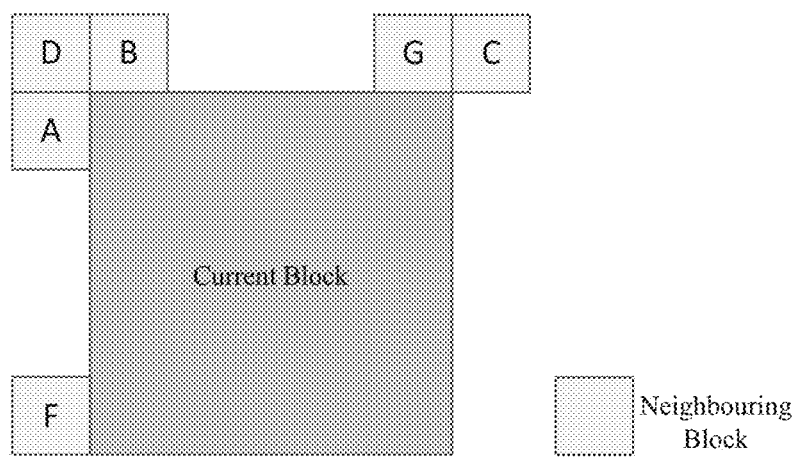
FIG. 9 is a schematic diagram illustrating neighbouring blocks of a current block according to an embodiment of the present disclosure.

Illustratively, the above motion compensation candidate list may be a unidirectional motion compensation candidate list, as shown in FIG. 9, which is a schematic diagram of the current block and neighbouring blocks. For a process of obtaining the motion compensation candidate list, based on an order of F, G, C, A, B, D, unidirectional spatial motion information is added to the motion compensation candidate list and a duplicate check is performed, and unidirectional temporal motion information is added to the motion compensation candidate list and the duplicate check is performed, and finally, if the motion compensation candidate list is not full, a repetition filling operation is performed. The order of F, G, C, A, B, D is only an example, and other orders can be used, which are not limited.

Performing the duplicate check is to compare the motion information to be added to the motion compensation candidate list with each of the existing candidate motion information in the motion compensation candidate list, if it is not duplicated with all the existing candidate motion information in the motion compensation candidate list, it is considered not to be duplicated; if it is duplicated with any of the existing candidate motion information in the motion compensation candidate list, it is considered to be duplicated.

A process of obtaining the motion compensation candidate list is described below with several specific application scenarios.

Application Scenario 1: spatial motion information and temporal motion information are added to the motion compensation candidate list together.

The first step, as shown in FIGS. 9, F, G, C, A, B. and D are neighbouring prediction blocks of the current block E, availability of F, G, C, A, B, and D is determined. Illustratively, if F is present and an inter prediction mode is adopted, motion information of F may be determined to be available motion information; otherwise, the motion information of F is determined to be unavailable. If G is present and an inter prediction mode is adopted, motion information of G may be determined to be available motion information; otherwise, the motion information of G is determined to be unavailable. If C is present and an inter prediction mode is adopted, motion information of C may be determined to be available motion information; otherwise, the motion information of C is determined to be unavailable. If A is present and an inter prediction mode is adopted, motion information of A may be determined to be available motion information; otherwise, the motion information of A is determined to be unavailable. If B is present and an inter prediction mode is adopted, motion information of B may be determined to be available motion information; otherwise, the motion information of B is determined to be unavailable. If D is present and an inter prediction mode is adopted, motion information of D may be determined to be available motion information; otherwise, the motion information of D is determined to be unavailable.

The second step, the available motion information is added to a motion compensation candidate list AwpUniArray based on the order of available motion information of F, G, C, A, B, and D (this order is variable and only includes available motion information) and the order of the temporal motion information (including available motion information), until a length of AwpUniArray is X or a traversal ends.

Circumstance 1, for the available motion information to be added to the motion compensation candidate list, if the available motion information is bidirectional motion information (e.g., including unidirectional motion information pointing to the reference picture list List0 and unidirectional motion information pointing to the reference picture list List1), based on parity of a total number of existing candidate motion information in the motion compensation candidate list (i.e., a current length of the motion compensation candidate list AwpUniArray), how to add the available motion information to the motion compensation candidate list AwpUniArray is determined. For simplicity, the available motion information can be called first available motion information.

Manner 1. If the total number of the existing candidate motion information in the motion compensation candidate list AwpUniArray is an even number, performing a duplicate check between the unidirectional motion information pointing to the reference picture list List0 in the first available motion information and the unidirectional motion information in the motion compensation candidate list AwpUniArray. If not duplicated, the unidirectional motion information pointing to the reference picture list List0 is added to the motion compensation candidate list AwpUniArray. If duplicated, a duplicate check between the unidirectional motion information pointing to the reference picture list List1 in the first available motion information and the unidirectional motion information in the motion compensation candidate list AwpUniArray is performed. If not duplicated, the unidirectional motion information pointing to the reference picture list List1 is added to the motion compensation candidate list AwpUniArray.

Or, if the total number of the existing candidate motion information in the motion compensation candidate list AwpUniArray is an odd number, performing a duplicate check between the unidirectional motion information pointing to the reference picture list List1 in the first available motion information and the unidirectional motion information in the motion compensation candidate list AwpUniArray. If not duplicated, the unidirectional motion information pointing to the reference picture list List1 is added to the motion compensation candidate list AwpUniArray. If duplicated, a duplicate check between the unidirectional motion information pointing to the reference picture list List0 in the first available motion information and the unidirectional motion information in the motion compensation candidate list AwpUniArray is performed. If not duplicated, the unidirectional motion information pointing to the reference picture list List0 is added to the motion compensation candidate list AwpUniArray.

Manner 2. If the total number of the existing candidate motion information in the motion compensation candidate list AwpUniArray is an odd number, performing a duplicate check between the unidirectional motion information pointing to the reference picture list List0 in the first available motion information and the unidirectional motion information in the motion compensation candidate list AwpUniArray. If not duplicated, the unidirectional motion information pointing to the reference picture list List0 is added to the motion compensation candidate list AwpUniArray. If duplicated, a duplicate check between the unidirectional motion information pointing to the reference picture list List1 in the first available motion information and the unidirectional motion information in the motion compensation candidate list AwpUniArray is performed. If not duplicated, the unidirectional motion information pointing to the reference picture list List1 is added to the motion compensation candidate list AwpUniArray.

Or, if the total number of the existing candidate motion information in the motion compensation candidate list AwpUniArray is an even number, performing a duplicate check between the unidirectional motion information pointing to the reference picture list List1 in the first available motion information and the unidirectional motion information in the motion compensation candidate list AwpUniArray. If not duplicated, the unidirectional motion information pointing to the reference picture list List1 is added to the motion compensation candidate list AwpUniArray. If duplicated, a duplicate check between the unidirectional motion information pointing to the reference picture list List0 in the first available motion information and the unidirectional motion information in the motion compensation candidate list AwpUniArray is performed. If not duplicated, the unidirectional motion information pointing to the reference picture list List0 is added to the motion compensation candidate list AwpUniArray.

Circumstance 2. For the available motion information to be added to the motion compensation candidate list, if the available motion information is unidirectional motion information, performing a duplicate check between the unidirectional motion information and the unidirectional motion information in the motion compensation candidate list AwpUniArray. If not duplicated, the unidirectional motion information is added to the motion compensation candidate list AwpUniArray.

The third step, if the length of the motion compensation candidate list AwpUniArray is less than X, a last piece of unidirectional motion information in the motion compensation candidate list AwpUniArray is repeatedly filled until the list length is X.

Illustratively, in application scenario 1, the temporal motion information may be unidirectional motion information or bidirectional motion information. For example, in a P slice, the temporal motion information is unidirectional motion information, and in a B slice, the temporal motion information is bidirectional motion information.

Application Scenario 2: after adding the spatial motion information into the motion compensation candidate list. Y positions are reserved for the temporal motion information, and the temporal motion information is bidirectional motion information, that is, the motion compensation candidate list includes Y temporal motion information.

The first step, the "availability" of the motion information of F, G, C, A, B, and D is determined, which can refer to Application Scenario 1.

The second step, the available motion information (each spatial available motion information) is added to the motion compensation candidate list AwpUniArray based on the order of available motion information of F, G, C, A, B and D (this order is variable and only includes the available motion information) until the length of the motion compensation candidate list AwpUniArray is X-Y, or, a traversal of available motion information is finished.

The second step of Application Scenario 2 can be seen in the second step of Application Scenario 1 and will not be repeated here.

The third step, for the temporal motion information currently to be added to the motion compensation candidate list (e.g., bidirectional temporal motion information and is available motion information), the temporal motion information is added to the motion compensation candidate list AwpUniArray according to the parity of the total number of candidate motion information already existing in the motion compensation candidate list (i.e., the current length of the motion compensation candidate list).

Manner 1. If the total number of the existing candidate motion information in the motion compensation candidate list AwpUniArray is an even number, performing a duplicate check between the unidirectional motion information pointing to the reference picture list List0 in the temporal motion information and the unidirectional motion information in the motion compensation candidate list AwpUniArray. If not duplicated, the unidirectional motion information pointing to the reference picture list List0 is added to the motion compensation candidate list AwpUniArray. If duplicated, a duplicate check between the unidirectional motion information pointing to the reference picture list List1 in the temporal motion information and the unidirectional motion information in the motion compensation candidate list AwpUniArray is performed. If not duplicated, the unidirectional motion information pointing to the reference picture list List1 is added to the motion compensation candidate list AwpUniArray.

Or, if the total number of the existing candidate motion information in the motion compensation candidate list AwpUniArray is an odd number, performing a duplicate check between the unidirectional motion information pointing to the reference picture list List1 in the temporal motion information and the unidirectional motion information in the motion compensation candidate list AwpUniArray. If not duplicated, the unidirectional motion information pointing to the reference picture list List1 is added to the motion compensation candidate list AwpUniArray. If duplicated, a duplicate check between the unidirectional motion information pointing to the reference picture list List0 in the temporal motion information and the unidirectional motion information in the motion compensation candidate list AwpUniArray is performed. If not duplicated, the unidirectional motion information pointing to the reference picture list List0 is added to the motion compensation candidate list AwpUniArray.

Manner 2. If the total number of the existing candidate motion information in the motion compensation candidate list AwpUniArray is an odd number, performing a duplicate check between the unidirectional motion information pointing to the reference picture list List0 in the temporal motion information and the unidirectional motion information in the motion compensation candidate list AwpUniArray. If not duplicated, the unidirectional motion information pointing to the reference picture list List0 is added to the motion compensation candidate list AwpUniArray. If duplicated, a duplicate check between the unidirectional motion information pointing to the reference picture list List1 in the temporal motion information and the unidirectional motion information in the motion compensation candidate list AwpUniArray is performed. If not duplicated, the unidirectional motion information pointing to the reference picture list List1 is added to the motion compensation candidate list AwpUniArray.

Or, if the total number of the existing candidate motion information in the motion compensation candidate list AwpUniArray is an even number, performing a duplicate check between the unidirectional motion information pointing to the reference picture list List1 in the temporal motion information and the unidirectional motion information in the motion compensation candidate list AwpUniArray. If not duplicated, the unidirectional motion information pointing to the reference picture list List1 is added to the motion compensation candidate list AwpUniArray. If duplicated, a duplicate check between the unidirectional motion information pointing to the reference picture list List0 in the temporal motion information and the unidirectional motion information in the motion compensation candidate list AwpUniArray is performed. If not duplicated, the unidirectional motion information pointing to the reference picture list List0 is added to the motion compensation candidate list AwpUniArray.

The fourth step, if the length of the motion compensation candidate list AwpUniArray is less than X, the last piece of unidirectional motion information in the motion compensation candidate list AwpUniArray is repeatedly filled until the list length is X.

Application Scenario 3: after adding the spatial motion information into the motion compensation candidate list, Y positions are reserved for the temporal motion information, and the temporal motion information is unidirectional motion information, that is, the motion compensation candidate list includes Y temporal motion information.

The first step, the "availability" of the motion information of F, G, C, A, B, and D is determined, which can refer to Application Scenario 1.

The second step, the available motion information (each spatial available motion information) is added to the motion compensation candidate list AwpUniArray based on the order of available motion information of F, G, C, A, B and D (this order is variable and only includes the available motion information) until the length of the motion compensation candidate list AwpUniArray is X-Y, or, a traversal of available motion information is finished.

The second step of Application Scenario 3 can be seen in the second step of Application Scenario 1 and will not be repeated here.

The third step, for the temporal motion information currently to be added to the motion compensation candidate list (e.g., unidirectional temporal motion information and is available motion information), a duplicate check between the temporal motion information and the unidirectional motion information in the motion compensation candidate list AwpUniArray is performed. If not duplicated, the temporal motion information is added to the motion compensation candidate list AwpUniArray.

The fourth step, if the length of the motion compensation candidate list AwpUniArray is less than X, the last piece of unidirectional motion information in the motion compensation candidate list AwpUniArray is repeatedly filled until the list length is X.

Application Scenario 4: spatial motion information and temporal motion information are added to the motion compensation candidate list together.

The first step, the "availability" of the motion information of F, G, C, A, B, and D is determined, which can refer to Application Scenario 1.

The second step, the available motion information is added to a motion compensation candidate list AwpUniArray based on the order of available motion information of F, G, C, A, B, and D (this order is variable and only includes available motion information) and the order of the temporal motion information (including available motion information), until a length of AwpUniArray is X or a traversal ends:

circumstance 1, for the available motion information currently to be added into the motion compensation candidate list, if the available motion information is bidirectional motion information (e.g., including unidirectional motion information pointing to the reference picture list List0 and unidirectional motion information pointing to the reference picture list List1), the available motion information is added to the motion compensation candidate list AwpUniArray. For simplicity, the available motion information can be called second available motion information.

Manner 1, a duplicate check between the unidirectional motion information pointing to the reference picture list List0 in the second available motion information and the unidirectional motion information in the motion compensation candidate list AwpUniArray is performed. If not duplicated, the unidirectional motion information pointing to the reference picture list List0 is added to the motion compensation candidate list AwpUniArray. If duplicated, a duplicate check between the unidirectional motion information pointing to the reference picture list List1 in the second available motion information and the unidirectional motion information in the motion compensation candidate list AwpUniArray is performed. If not duplicated, the unidirectional motion information pointing to the reference picture list List1 is added to the motion compensation candidate list AwpUniArray.

Manner 2, a duplicate check between the unidirectional motion information pointing to the reference picture list List1 in the second available motion information and the unidirectional motion information in the motion compensation candidate list AwpUniArray is performed. If not duplicated, the unidirectional motion information pointing to the reference picture list List1 is added to the motion compensation candidate list AwpUniArray. If duplicated, a duplicate check between the unidirectional motion information pointing to the reference picture list List0 in the second available motion information and the unidirectional motion information in the motion compensation candidate list AwpUniArray is performed. If not duplicated, the unidirectional motion information pointing to the reference picture list List0 is added to the motion compensation candidate list AwpUniArray.

Circumstance 2. For the available motion information to be added to the motion compensation candidate list, if the available motion information is unidirectional motion information, performing a duplicate check between the unidirectional motion information and the unidirectional motion information in the motion compensation candidate list AwpUniArray. If not duplicated, the unidirectional motion information is added to the motion compensation candidate list AwpUniArray.

The third step, if the length of the motion compensation candidate list AwpUniArray is less than X, a last piece of unidirectional motion information in the motion compensation candidate list AwpUniArray is repeatedly filled until the list length is X.

Illustratively, in application scenario 4, the temporal motion information may be unidirectional motion information or bidirectional motion information. For example, in a P slice, the temporal motion information is unidirectional motion information, and in a B slice, the temporal motion information is bidirectional motion information.

Application Scenario 5: after adding the spatial motion information into the motion compensation candidate list, Y positions are reserved for the temporal motion information, and the temporal motion information is bidirectional motion information, that is, the motion compensation candidate list includes Y temporal motion information.

The first step, the "availability" of the motion information of F, G, C, A, B, and D is determined, which can refer to Application Scenario 1.

The second step, the available motion information (e.g., each spatial available motion information) is added to the motion compensation candidate list AwpUniArray based on the order of available motion information of F, G, C, A, B and D (this order is variable and only includes the available motion information) until the length of the motion compensation candidate list AwpUniArray is X-Y, or, the traversal of available motion information is finished.

The second step of Application Scenario 5 can be seen in the second step of Application Scenario 1 and will not be repeated here.

The third step, for the temporal motion information currently to be added to the motion compensation candidate list (e.g., bidirectional temporal motion information and is available motion information), the temporal motion information is added into the motion compensation candidate list AwpUniArray.

Manner 1, a duplicate check between the unidirectional motion information pointing to the reference picture list List0 in the temporal motion information and the unidirectional motion information in the motion compensation candidate list AwpUniArray is performed. If not duplicated, the unidirectional motion information pointing to the reference picture list List0 is added to the motion compensation candidate list AwpUniArray. If duplicated, a duplicate check between the unidirectional motion information pointing to the reference picture list List1 in the temporal motion information and the unidirectional motion information in the motion compensation candidate list AwpUniArray is performed. If not duplicated, the unidirectional motion information pointing to the reference picture list List1 is added to the motion compensation candidate list AwpUniArray.

Manner 2, a duplicate check between the unidirectional motion information pointing to the reference picture list List1 in the temporal motion information and the unidirectional motion information in the motion compensation candidate list AwpUniArray is performed. If not duplicated, the unidirectional motion information pointing to the reference picture list List1 is added to the motion compensation candidate list AwpUniArray. If duplicated, a duplicate check between the unidirectional motion information pointing to the reference picture list List0 in the temporal motion information and the unidirectional motion information in the motion compensation candidate list AwpUniArray is performed. If not duplicated, the unidirectional motion information pointing to the reference picture list List0 is added to the motion compensation candidate list AwpUniArray.

The fourth step, if the length of the motion compensation candidate list AwpUniArray is less than X, the last piece of unidirectional motion information in the motion compensation candidate list AwpUniArray is repeatedly filled until the list length is X.

After adding the spatial motion information into the motion compensation candidate list, Y positions are reserved for the temporal motion information, and the temporal motion information is unidirectional motion information, that is, the motion compensation candidate list includes Y temporal motion information.

The first step, the "availability" of the motion information of F, G, C, A, B, and D is determined, which can refer to Application Scenario 1.

The second step can be seen in the second step of Application Scenario 4 and will not be repeated here.

The third step, for the temporal motion information currently to be added to the motion compensation candidate list (e.g., unidirectional temporal motion information and is available motion information), a duplicate check between the temporal motion information and the unidirectional motion information in the motion compensation candidate list AwpUniArray is performed. If not duplicated, the temporal motion information is added to the motion compensation candidate list AwpUniArray.

The fourth step, if the length of the motion compensation candidate list AwpUniArray is less than X, the last piece of unidirectional motion information in the motion compensation candidate list AwpUniArray is repeatedly filled until the list length is X.

In the above application scenarios. X may be any positive integer, for example, X may be 4 or 5 or the like.

In the above application scenarios, if the length of the motion compensation candidate list AwpUniArray is less than X, the last piece of unidirectional motion information in the motion compensation candidate list AwpUniArray is repeatedly filled until the list length is X. In practice, prior to performing the repetition filling operation of the last piece of unidirectional motion information, valid motion information can be increased by motion information derivation. For example, with any one piece of valid motion information (x, y, ref_idx, ListX) in the motion compensation candidate list as a basis, ref_idx and ListX represent a reference picture index and a reference picture list respectively, which are collectively called reference picture information, and at least one piece of motion information as followings can be added: (x+a, y+b, ref_idx, ListX), where a and b may be any integer, (k1*x, k1*y, ref_idx_new1, ListX), where k1 is any non-zero positive integer, that is a scaling operation is performed for a motion vector; (k2*x, k2*y, ref_idx_new2, ListY), where k2 is any non-zero positive integer, that is, a scaling operation is performed for the motion vector. Furthermore, adding zero motion vectors may also be performed, that is, motion information may be (0, 0, ref_idx3, ListZ). For above motion information, when the motion information is added to the motion compensation candidate list, the duplicate check may be performed or not performed. If the length of the motion compensation candidate list AwpUniArray is still less than X, a repetition filling operation can be performed as above.

In the above application scenarios, in addition to the spatial motion information and the temporal motion information, HMVP motion information can also be added into the motion compensation candidate list AwpUniArray, and a process of adding the HMVP motion information is not limited.

In the above application scenarios, a motion compensation candidate list AwpUniArray can be constructed, and the motion information in AwpUniArray can be called candidate motion information, and then the candidate motion information can be selected from AwpUniArray as the target motion information of the current block, and then a prediction value of a pixel position can be determined based on the target motion information.

In a possible implementation, two pieces of candidate motion information are selected from AwpUniArray as first target motion information and second target motion information of the current block. On this basis, the decoder-side may parse AwpCandIdx0 and AwpCandIdx1 from a coded bit stream and assign the (AwpCandIdx0+1)-th motion information in AwpUniArray to mvAwp0L0, mvAwp0L1. RefIdxAwp0L0 and RefIdxAwp0L1, and assign the (AwpCandIdx1+1)-th motion information in AwpUniArray to mvAwp1L0, mvAwp1L1, RefIdxAwp1L0 and RefIdxAwp1L1. The (AwpCandIdx0+1)-th motion information in AwpUniArray may also be assigned to mvAwp1L0, mvAwp1L1, RefIdxAwp1L0, and RefIdxAwp1L1, and the (AwpCandIdx1+1)-th motion information in AwpUniArray may be assigned to mvAwp0L0, mvAwp0L1, RefIdxAwp0L0 and RefIdxAwp0L1, which is not limited here.

Illustratively, AwpCandIdx0 represents an index value of first target motion information. Therefore, the (AwpCandIdx0+1)-th motion information in AwpUniArray may be assigned to the first target motion information. For example, if AwpCandIdx0 is 0, the first motion information in AwpUniArray is assigned to the first target motion information, if AwpCandIdx0 is 1, the second motion information in the AwpUniArray is assigned to the first target motion information and so on.

mvAwp0aL0, mvAwp0L1, RefIdxAwp0L0 and RefIdxAwp0L1 are combined as the first target motion information, that is, the first target motion information includes unidirectional motion information pointing to List0 and unidirectional motion information pointing to List1.

If the (AwpCandIdx0+1)-th motion information in AwpUniArray is the unidirectional motion information pointing to List0, the first target motion information includes the unidirectional motion information pointing to List0, and the unidirectional motion information pointing to List1 is null.

If the (AwpCandIdx0+1)-th motion information in AwpUniArray is the unidirectional motion information pointing to List1, the first target motion information includes the unidirectional motion information pointing to List1, and the unidirectional motion information pointing to List0 is null.

Illustratively, mvAwp0L0 and RefIdxAwp0L0 represent unidirectional motion information pointing to List0 in first target motion information, and mvAwp0L1 and RefIdxAwp0L1 represent unidirectional motion information pointing to List1 in the first target motion information.

If RefIdxAwp0L0 is valid, which indicates the unidirectional motion information pointing to List0 is valid. Thus, a prediction mode of the first target motion information is PRED_List0, that is, a prediction value of the pixel position of the unidirectional motion information pointing to List0 may be adopted.

If RefIdxAwp0L1 is valid, which indicates the unidirectional motion information pointing to List1 is valid. Thus, a prediction mode of the first target motion information is PRED_List1, that is, a prediction value of the pixel position of the unidirectional motion information pointing to List1 may be adopted.

Illustratively, AwpCandIdx1 represents an index value of the second target motion information. Therefore, the (AwpCandIdx1+1)-th motion information in AwpUniArray may be assigned to the second target motion information. For example, if AwpCandIdx1 is 0, the first motion information in AwpUniArray is assigned to the second target motion information; if AwpCandIdx1 is 1, the second motion information in the AwpUniArray is assigned to the second target motion information and so on.

mvAwp1L0, mvAwp1L1, RefIdxAwp1L0 and RefIdxAwp1L1 are combined as the second target motion information, that is, the second target motion information includes unidirectional motion information pointing to List0 and unidirectional motion information pointing to List1.

If the (AwpCandIdx1+1)-th motion information in AwpUniArray is the unidirectional motion information pointing to List0, the second target motion information includes the unidirectional motion information pointing to List0, and the unidirectional motion information pointing to List1 is null.

If the (AwpCandIdx1+1)-th motion information in AwpUniArray is the unidirectional motion information pointing to List1, the second target motion information includes the unidirectional motion information pointing to List1, and the unidirectional motion information pointing to List0 is null.

Illustratively, mvAwp1L0 and RefIdxAwp1L0 represent unidirectional motion information pointing to List0 in second target motion information, and mvAwp1L1 and RefIdxAwp1L1 represent unidirectional motion information pointing to List1 in the second target motion information.

If RefIdxAwp1L0 is valid, which indicates the unidirectional motion information pointing to List0 is valid. Thus, a prediction mode of the second target motion information is PRED_List0, that is, a prediction value of the pixel position of the unidirectional motion information pointing to List0 may be adopted.

If RefIdxAwp1L1 is valid, which indicates the unidirectional motion information pointing to List1 is valid. Thus, a prediction mode of the second target motion information is PRED_List1, that is, a prediction value of the pixel position of the unidirectional motion information pointing to List1 may be adopted.

In another possible implementation, one piece of candidate motion information can be selected from AwpUniArray as the target motion information of the current block. The decoder-side can parse AwpCandIdx from the coded bit stream and assign the (AwpCandIdx+1)-th motion information in AwpUniArray to mvAwpL0, mvAwpL1, RefIdxAwpL0 and RefIdxAwpL1. AwpCandIdx represents an index value of the target motion information, mvAwpL0, mvAwpL1, RefIdxAwpL0 and RefIdxAwpL1 together as the target motion information. mvAwpL0 and RefIdxAwpL0 represent the unidirectional motion information pointing to List0 in the target motion information, and mvAwpL1 and RefIdxAwpL1 represent the unidirectional motion information pointing to List1 in the target motion information.

Illustratively, Embodiment 1 to Embodiment 16 can be implemented individually or in combination. For example, Embodiment 1 is implemented in combination with Embodiment 2; Embodiment 1 is implemented in combination with Embodiment 3; Embodiment 1, Embodiment 2, and Embodiment 3 may be implemented in combination; Embodiment 4 may be implemented in combination with one or more of Embodiments 1 to 3; Embodiment 5 may be implemented in combination with one or more of Embodiments 1 to 3; Embodiment 6 may be implemented in combination with one or more of Embodiments 1 to 3; Embodiment 7 can be implemented in combination with one or more of Embodiments 1 to 3; Embodiment 8 can be implemented in combination with one or more of Embodiments 1 to 3; Embodiment 9 can be implemented in combination with one or more of Embodiments 1 to 3; Embodiment 10 can be implemented in combination with one or more of Embodiments 1 to 3; Embodiment 11 can be implemented in combination with one or more of Embodiments 1 to 3; Embodiment 12 can be implemented in combination with one or more of Embodiments 1 to 3; Embodiment 13 can be implemented in combination with one or more of Embodiments 1 to 3; Embodiment 14 can be implemented in combination with one or more of Embodiments 1 to 3; Embodiment 15 can be implemented in combination with one or more of Embodiments 1 to 3; Embodiment 16 can be implemented in combination with one or more of Embodiments 1 to 3; the above are only a few examples, and there is no limitation on how the embodiments can be combined with each other.

It should be noted that in the above embodiments, the method used by the coder-side and the method used by the decoder-side can be referenced to each other.

Figure 10A:
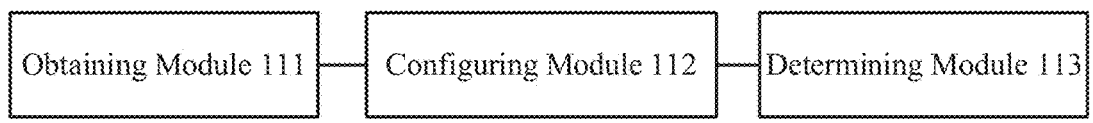
FIG. 10A is a structural schematic diagram illustrating a coding and decoding apparatus according to an embodiment of the present disclosure.

Embodiment 17: Based on a same application idea as the above method, the embodiments of the present application also provide a coding and decoding apparatus, the apparatus is applied to the coder-side or the decoder-side, see FIG. 10A for a structural diagram of the apparatus, including an obtaining module 111, a configuring module 112 and a determining module 113.

The obtaining module 111 is for obtaining, when determining to enable a weighted prediction for a current block, a weighted prediction angle and weight configuration parameters of the current block, where the weight configuration parameters include a weight transform rate and a weight transform start position.

The configuring module 112 is for configuring reference weight values for surrounding positions outside the current block based on the weight configuration parameters of the current block.

The determining module 113 is for determining, for each pixel position of the current block, a surrounding matching position which the pixel position points from the surrounding positions outside the current block based on the weighted prediction angle; determining a target weight value of the pixel position based on the reference weight value associated with the surrounding matching position, determining an association weight value of the pixel position based on the target weight value of the pixel position; determining a first prediction value of the pixel position based on a first prediction mode of the current block, determining a second prediction value of the pixel position based on a second prediction mode of the current block; determining a weighted prediction value of the pixel position based on the first prediction value, the target weight value, the second prediction value and the association weight value; determining the weighted prediction value of the current block based on the weighted prediction values of all pixel positions in the current block.

If the current block supports a weight transform rate switching mode, the obtaining module 111 obtains a weight transform rate of the current block in the following manner: obtaining first weight transform rate indication information on the current block; determining a weight transform rate of the current block based on the first weight transform rate indication information. If the first weight transform rate indication information is first indication information, the weight transform rate of the current block is a first weight transform rate, and if the first weight transform rate indication information is second indication information, the weight transform rate of the current block is a second weight transform rate.

The first weight transform rate indication information is image level indication information, the first weight transform rate indication information on the current block represents weight transform rate switching identification corresponding to the current block, the first indication information is for indicating that the current block does not require weight transform rate switching, and the second indication information is for indicating that the current block requires weight transform rate switching. The absolute value of the first weight transform rate is not equal to the absolute value of the second weight transform rate.

If the current block supports the weight transform rate switching mode, the obtaining module 111 obtains the weight transform rate of the current block in the following manner: obtaining the second weight transform rate indication information on the current block; selecting a weight transform rate corresponding to the second weight transform rate indication information from a preset lookup table; where the preset lookup table includes at least two weight transform rates; and determining the selected weight transform rate as the weight transform rate of the current block.

Illustratively, when configuring reference weight values for surrounding positions outside the current block according to the weight configuration parameters, the configuring module 112 is specifically used for: for each surrounding position outside the current block, configuring the reference weight value of the surrounding position according to a coordinate value of the surrounding position, a coordinate value of the weight transform start position and the weight transform rate.

Illustratively, the weight transform start position is determined by at least one of the following parameters: the weighted prediction angle, the weighted prediction position of the current block or a size of the current block. A number of the surrounding positions outside the current block is determined based on the size of the current block and/or the weighted prediction angle of the current block. The reference weight values of the surrounding positions outside the current block are monotonically increasing. The surrounding positions outside the current block include at least one of the following: one or more integer pixel positions or one or more sub-pixel positions. The surrounding positions outside the current block include at least one of: surrounding positions at one row on the upper outside of the current block, or surrounding positions at one column on the left outside of the current block.

The reference weight values of the surrounding positions outside the current block include one or more reference weight values of target positions, one or more reference weight values of first neighbouring positions of the target positions and one or more reference weight values of second neighbouring positions of the target positions. The reference weight values of the first neighbouring positions are all a second reference weight value, and the reference weight values of the second neighbouring positions are all a third reference weight value, where the second reference weight value is different from the third reference weight value. The target positions include one reference weight value or at least two reference weight values, if the target positions include the at least two reference weight values, the at least two reference weight values of the target positions increase monotonically.

The weighted prediction angle is a horizontal angle; or, the weighted prediction angle is a vertical angle; or, an absolute value of a slope of the weighted prediction angle is n-th power of 2, where n is an integer.

Illustratively, the determining module 113 is further for: if the surrounding matching position is an integer pixel position and the integer pixel position has been configured with a reference weight value, determining a target weight value of the pixel position based on the reference weight value of the integer pixel position; or, if the surrounding matching position is a sub-pixel position and the sub-pixel position has been configured with a reference weight value, determining the target weight value of the pixel position based on the reference weight value of the sub-pixel position.

If the first prediction mode is the inter prediction mode, the determining module 113 is further for: obtaining a motion compensation candidate list including at least one piece of candidate motion information; selecting one piece of candidate motion information from the motion compensation candidate list as original motion information of the current block; determining target motion information of the current block based on the original motion information; and determining the first prediction value of the pixel position based on the target motion information.

The original motion information includes an original motion vector, the target motion information includes a target motion vector, and the determining module 113 is further for: obtaining a motion vector difference corresponding to the original motion vector; and determining the target motion vector based on the motion vector difference and the original motion vector.

At the decoder-side, the determining module 113 is further for: parsing direction information and amplitude information on the motion vector difference from the coded bit stream of the current block; determining the motion vector difference based on the direction information and the amplitude information on the motion vector difference.

If the direction information indicates that a direction is rightward and the amplitude information indicates that an amplitude is Ar, the motion vector difference is (Ar, 0), if the direction information indicates that the direction is downward and the amplitude information indicates that the amplitude is Ad, the motion vector difference is (0, −Ad), if the direction information indicates that the direction is leftward and the amplitude information indicates that the amplitude is Al, the motion vector difference is (−Al, 0), if the direction information indicates that the direction is upward and the amplitude information indicates that the amplitude is Au, the motion vector difference is (0, Au).

At the decoder-side, the determining module 113 is further for: parsing flag information from the coded bit stream of the current block; if the flag information indicates superimposing the motion vector difference on the original motion vector, parsing the direction information and the amplitude information on the motion vector difference from the coded bit stream of the current block.

The determining module 113 is further for: obtaining at least one piece of available motion information to be added to a motion compensation candidate list; and constructing the motion compensation candidate list based on the at least one piece of available motion information.

The at least one piece of available motion information includes at least one of the following motion information: spatial motion information; temporal motion information; or preset motion information.

As for the apparatus embodiment, since it basically corresponds to the method embodiment, the relevant part may refer to the description of the method embodiment. The device embodiments described above are merely illustrative, where the units described as separate components may or may not be physically separated, and the components displayed as units may or may not be physical units, that is, may be located in one place or distributed to multiple units in a network. Some or all of the modules can be selected according to practical needs to achieve the purpose of solutions of the present embodiment. Those of ordinary skill in the art can understand and implement the solutions without any creative efforts.

Figure 10B:
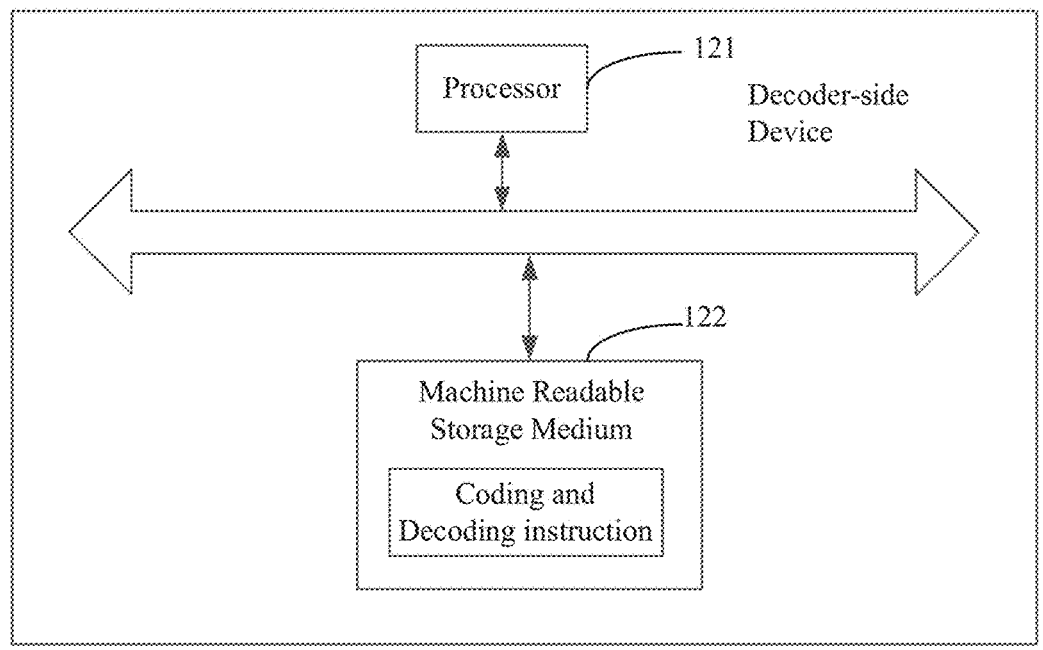
FIG. 10B is a hardware structure diagram of a decoder-side device according to an embodiment of the present disclosure.

Based on the application idea as the above methods, embodiments of the present disclosure provide a decoder-side device (also called a video decoder). In terms of hardware, the hardware architecture is shown in FIG. 10B. The decoder-side device includes one or more processors 121 and a machine readable storage medium 122, where the machine readable storage medium 122 stores machine executable instructions executable by the processor 121. The processor 121 is configured to execute the machine executable instructions to perform the methods disclosed as above. For example, the processor 121 is configured to execute the machine executable instructions to perform following steps: when determining to enable a weighted prediction for a current block, obtaining a weighted prediction angle and weight configuration parameters of the current block; where the weight configuration parameters include a weight transform rate and a weight transform start position; configuring reference weight values for surrounding positions outside the current block according to the weight configuration parameters; for each pixel position of the current block, a surrounding matching position which the pixel position points from the surrounding positions outside the current block based on the weighted prediction angle; determining a target weight value of the pixel position based on the reference weight value associated with the surrounding matching position, determining an association weight value of the pixel position based on the target weight value of the pixel position; determining a first prediction value of the pixel position based on a first prediction mode of the current block, determining a second prediction value of the pixel position based on a second prediction mode of the current block; determining a weighted prediction value of the pixel position based on the first prediction value, the target weight value, the second prediction value and the association weight value; determining the weighted prediction value of the current block based on the weighted prediction values of all pixel positions in the current block.

Figure 10C:
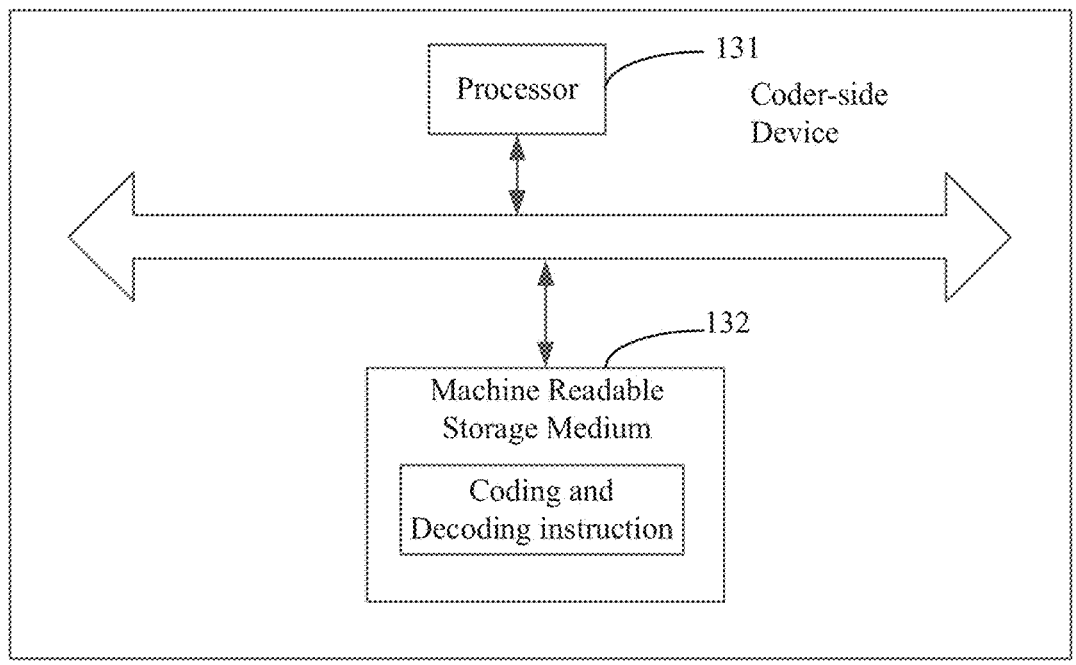
FIG. 10C is a hardware structure diagram of a coder-side device according to an embodiment of the present disclosure.

Based on the application idea as the above methods, embodiments of the present disclosure provide a coder-side device (also called a video coder). In terms of hardware, the hardware architecture is shown in FIG. 10C. The decoder-side device includes one or more processors 131 and a machine readable storage medium 132, where the machine readable storage medium 132 stores machine executable instructions executable by the processor 131. The processor 131 is configured to execute the machine executable instructions to perform the methods disclosed as above. For example, the processor 131 is configured to execute the machine executable instructions to perform following steps: when determining to enable a weighted prediction for a current block, obtaining a weighted prediction angle and weight configuration parameters of the current block; where the weight configuration parameters include a weight transform rate and a weight transform start position; configuring reference weight values for surrounding positions outside the current block according to the weight configuration parameters; for each pixel position of the current block, a surrounding matching position which the pixel position points from the surrounding positions outside the current block based on the weighted prediction angle; determining a target weight value of the pixel position based on the reference weight value associated with the surrounding matching position, determining an association weight value of the pixel position based on the target weight value of the pixel position; determining a first prediction value of the pixel position based on a first prediction mode of the current block, determining a second prediction value of the pixel position based on a second prediction mode of the current block; determining a weighted prediction value of the pixel position based on the first prediction value, the target weight value, the second prediction value and the association weight value; determining the weighted prediction value of the current block based on the weighted prediction values of all pixel positions in the current block.

Based on a same application idea as the above methods, embodiments of the present disclosure further provide a camera device, which can include the coding and decoding apparatus in any one of the above embodiments. The camera device may adopt above processes.

Based on a same application idea as the above methods, embodiments of the present disclosure provide a machine readable storage medium storing several computer instructions, where the computer instructions are executed by a processor to perform the methods disclosed in the above embodiments of the present disclosure, for example, the coding and decoding methods in the above embodiments.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a game console, a tablet computer, wearable equipment, or combinations of any several devices of these devices. For the convenience of description, the above-mentioned apparatuses, when described, is divided into various units by function for descriptions. When the present disclosure is implemented, the functions of different units may be implemented in software and/or hardware.

Those skilled in the art should understand that the embodiments of the present disclosure may be provided as methods, systems, or computer program products. Therefore, the present disclosure may take the form of a pure hardware embodiment, a pure software embodiment, or an embodiment combining both software and hardware. Furthermore, the embodiments of the present disclosure may take the form of a computer program product implemented on one or more computer available storage mediums (including but not limited to disk memories, CD-ROM, optical memories, etc.) containing computer available program codes.

The above descriptions are only some examples of the present disclosure, and are not used to limit the present disclosure. For those skilled in the art, the present disclosure may have various changes and modifications. Any modifications, equivalent replacements, improvements and the like made in the spirit and principle of this present disclosure shall fall within the scope of claims of the present disclosure.

What is claimed is:

1. A method, comprising:
when determining to enable a weighted prediction for a current block, obtaining a weighted prediction angle of the current block and weight configuration parameters of the current block, wherein the weight configuration parameters comprise a weight transform rate and a weight transform start position;
configuring one or more reference weight values for surrounding positions outside the current block based on the weight configuration parameters;
for each pixel position of the current block,
determining a surrounding matching position to which the pixel position points from the surrounding positions outside the current block based on the weighted prediction angle;
determining a target weight value of the pixel position based on a reference weight value associated with the surrounding matching position;
determining an association weight value of the pixel position based on the target weight value of the pixel position;
determining a first prediction value of the pixel position based on a first prediction mode of the current block;
determining a second prediction value of the pixel position based on a second prediction mode of the current block; and
determining, based on the first prediction value, the target weight value, the second prediction value and the association weight value, a weighted prediction value of the pixel position; and
determining weighted prediction values of the current block based on the weighted prediction values of all pixel positions in the current block.

2. The method of claim 1, wherein in response to determining that the current block supports a weight transform rate switching mode, obtaining the weight transform rate of the current block comprises:
obtaining first weight transform rate indication information on the current block; and
determining the weight transform rate of the current block based on the first weight transform rate indication information, wherein in response to determining that the first weight transform rate indication information is first indication information, the weight transform rate of the current block is a first weight transform rate, and in response to determining that the first weight transform rate indication information is second indication information, the weight transform rate of the current block is a second weight transform rate.

3. The method of claim 2, wherein the first weight transform rate indication information comprises picture level indication information, the first weight transform rate indication information on the current block represents weight transform rate switching identification corresponding to the current block, the first indication information is for indicating the current block does not require a weight transform rate switching, and the second indication information is for indicating the current block requires the weight transform rate switching.

4. The method of claim 1, wherein in response to determining that the current block supports a weight transform rate switching mode, obtaining the weight transform rate of the current block comprises:
obtaining second weight transform rate indication information on the current block;
selecting a weight transform rate corresponding to the second weight transform rate indication information from a preset lookup table, wherein the preset lookup table comprises at least two weight transform rates; and
determining the selected weight transform rate as the weight transform rate of the current block.

5. The method of claim 1, wherein configuring one or more reference weight values for the surrounding positions outside the current block based on the weight configuration parameters comprises:
for each of the surrounding positions outside the current block, configuring a reference weight value of the surrounding position based on a coordinate value of the surrounding position, a coordinate value of the weight transform start position and the weight transform rate.

6. The method of claim 1, wherein the weight transform start position is determined by at least one of following parameters:
the weighted prediction angle,
a weighted prediction position of the current block, or
a size of the current block.

7. The method of claim 1, wherein
a number of the surrounding positions outside the current block is determined based on at least one of: a size of the current block, or the weighted prediction angle of the current block;
the reference weight values of the surrounding positions outside the current block monotonically increase;
the surrounding positions outside the current block comprise at least one of the following: one or more integer pixel positions, or one or more sub-pixel positions; and the surrounding positions outside the current block comprise at least one of: surrounding positions neighbouring an upper side of the current block, or surrounding positions neighbouring a left side of the current block.

8. The method of claim 1, wherein
the one or more reference weight values of the surrounding positions outside the current block comprise one or more reference weight values of target positions, one or more reference weight values of first neighbouring positions of the target positions, and one or more reference weight values of second neighbouring positions of the target positions,
wherein the one or more reference weight values of the first neighbouring positions are all a second reference weight value, and the one or more reference weight values of the second neighbouring positions are all a third reference weight value, and the second reference weight value is different from the third reference weight value.

9. The method of claim 8, wherein
the target positions comprise one reference weight value or at least two reference weight values, in response to determining that the target positions comprise the at least two reference weight values, the at least two reference weight values of the target positions increase monotonically.

10. The method of claim 1, wherein
the weighted prediction angle is a horizontal angle; or
the weighted prediction angle is a vertical angle; or
an absolute value of a slope of the weighted prediction angle is n-th power of 2, wherein n is an integer.

11. The method of claim 1, wherein determining the target weight value of the pixel position based on the reference weight value associated with the surrounding matching position comprises:
in response to determining that the surrounding matching position is an integer pixel position and the integer pixel position is configured with a reference weight value, determining the target weight value of the pixel position based on the reference weight value of the integer pixel position; and
in response to determining that the surrounding matching position is a sub-pixel position and the sub-pixel position is configured with a reference weight value, determining the target weight value of the pixel position based on the reference weight value of the sub-pixel position.

12. The method of claim 1, wherein in response to determining that the first prediction mode is an inter prediction mode, determining the first prediction value of the pixel position based on the first prediction mode of the current block comprises:
obtaining a motion compensation candidate list, wherein the motion compensation candidate list comprises at least one piece of candidate motion information;
selecting one piece of candidate motion information from the motion compensation candidate list as original motion information of the current block;
determining target motion information on the current block based on the original motion information; and
determining the first predicted value of the pixel position based on the target motion information.

13. The method of claim 12, wherein the original motion information comprises an original motion vector, the target motion information comprises a target motion vector, determining the target motion information of the current block based on the original motion information comprises:

obtaining a motion vector difference corresponding to the original motion vector; and
determining the target motion vector based on the motion vector difference and the original motion vector.

14. The method of claim 13, wherein in response to determining that the method is applied to a decoder-side, obtaining the motion vector difference corresponding to the original motion vector comprises:
parsing directional information on the motion vector difference and amplitude information on the motion vector difference from a coded bit stream of the current block; and
determining the motion vector difference based on the direction information on the motion vector difference and the amplitude information on the motion vector difference.

15. The method of claim 14, wherein
in response to determining that the direction information indicates a direction being rightward and the amplitude information indicates an amplitude being Ar, the motion vector difference is (Ar, 0);
in response to determining that the direction information indicates the direction being downward and the amplitude information indicates the amplitude being Ad, the motion vector difference is (0, −Ad);
in response to determining that the direction information indicates the direction being leftward and the amplitude information indicates the amplitude being Al, the motion vector difference is (−Al, 0); and
in response to determining that the direction information indicates the direction being upward and the amplitude information indicates the amplitude being Au, the motion vector difference is (0, Au).

16. The method of claim 14, wherein parsing the direction information on the motion vector difference and the amplitude information on the motion vector difference from the coded bit stream of the current block comprises:
parsing flag information from the coded bit stream of the current block; and
in response to determining that the flag information indicates superimposing the motion vector difference on the origin motion vector, parsing the direction information on the motion vector difference and the amplitude information on the motion vector difference from the coded bit stream of the current block.

17. The method of claim 12, wherein constructing the motion compensation candidate list comprises:
obtaining at least one piece of available motion information to be added to the motion compensation candidate list; and
constructing the motion compensation candidate list based on the at least one piece of available motion information,
wherein the at least one piece of available motion information comprises at least one of following motion information:
spatial motion information;
temporal motion information; or
preset motion information.

18. A decoder-side device, comprising:
a processor, and
a machine-readable storage medium,
wherein the machine-readable storage medium stores machine executable instructions executable by the processor, and the processor is configured to execute the machine executable instructions to perform:

when determining to enable a weighted prediction for a current block, obtaining a weighted prediction angle of the current block and weight configuration parameters of the current block, wherein the weight configuration parameters comprise a weight transform rate and a weight transform start position;

configuring one or more reference weight values for surrounding positions outside the current block based on the weight configuration parameters;

for each pixel position of the current block,
- determining a surrounding matching position to which the pixel position points from the surrounding positions outside the current block based on the weighted prediction angle;
- determining a target weight value of the pixel position based on a reference weight value associated with the surrounding matching position;
- determining an association weight value of the pixel position based on the target weight value of the pixel position;
- determining a first prediction value of the pixel position based on a first prediction mode of the current block;
- determining a second prediction value of the pixel position based on a second prediction mode of the current block; and
- determining, based on the first prediction value, the target weight value, the second prediction value and the association weight value, a weighted prediction value of the pixel position; and determining weighted prediction values of the current block based on the weighted prediction values of all pixel positions in the current block.

19. A coder-side device, comprising:
a processor, and
a machine-readable storage medium,
wherein the machine-readable storage medium stores machine executable instructions executable by the processor, and the processor is configured to execute the machine executable instructions to perform:

when determining to enable a weighted prediction for a current block, obtaining a weighted prediction angle of the current block and weight configuration parameters of the current block, wherein the weight configuration parameters comprise a weight transform rate and a weight transform start position;

configuring one or more reference weight values for surrounding positions outside the current block based on the weight configuration parameters;

for each pixel position of the current block,
- determining a surrounding matching position to which the pixel position points from the surrounding positions outside the current block based on the weighted prediction angle;
- determining a target weight value of the pixel position based on a reference weight value associated with the surrounding matching position;
- determining an association weight value of the pixel position based on the target weight value of the pixel position;
- determining a first prediction value of the pixel position based on a first prediction mode of the current block;
- determining a second prediction value of the pixel position based on a second prediction mode of the current block; and
- determining, based on the first prediction value, the target weight value, the second prediction value and the association weight value, a weighted prediction value of the pixel position; and determining weighted prediction values of the current block based on the weighted prediction values of all pixel positions in the current block.

20. A non-transitory computer readable storage medium, storing machine-executable instructions, wherein the machine-executable instructions are executed by at least one processor to perform the method according to claim 1.

* * * * *